(12) United States Patent
Nakazawa et al.

(10) Patent No.: US 11,424,482 B2
(45) Date of Patent: *Aug. 23, 2022

(54) NONAQUEOUS ELECTROLYTE SOLUTION AND NONAQUEOUS ELECTROLYTE BATTERY USING SAME

(71) Applicants: MITSUBISHI CHEMICAL CORPORATION, Tokyo (JP); MU IONIC SOLUTIONS CORPORATION, Tokyo (JP)

(72) Inventors: Eiji Nakazawa, Ibaraki (JP); Yoichi Oohashi, Ibaraki (JP); Minoru Kotato, Ibaraki (JP); Takamichi Mitsui, Ibaraki (JP); Takayuki Aoshima, Kanagawa (JP); Takeshi Nakamura, Kanagawa (JP)

(73) Assignees: MITSUBISHI CHEMICAL CORPORATION, Tokyo (JP); MU IONIC SOLUTIONS CORPORATION, Tokyo (JP)

( * ) Notice: Subject to any disclaimer, the term of this patent is extended or adjusted under 35 U.S.C. 154(b) by 180 days.

This patent is subject to a terminal disclaimer.

(21) Appl. No.: 16/460,514

(22) Filed: Jul. 2, 2019

(65) Prior Publication Data

US 2019/0334208 A1    Oct. 31, 2019

Related U.S. Application Data

(60) Division of application No. 14/835,815, filed on Aug. 26, 2015, now abandoned, which is a continuation of
(Continued)

(30) Foreign Application Priority Data

Feb. 27, 2013  (JP) ................................ 2013-037724
Mar. 27, 2013  (JP) ................................ 2013-067186

(51) Int. Cl.
*H01M 10/0567* (2010.01)
*H01M 4/38* (2006.01)
(Continued)

(52) U.S. Cl.
CPC ....... *H01M 10/0567* (2013.01); *H01M 4/364* (2013.01); *H01M 4/386* (2013.01);
(Continued)

(58) Field of Classification Search
None
See application file for complete search history.

(56) References Cited

U.S. PATENT DOCUMENTS 10,615,455 B2 *  4/2020  Nakazawa ........ H01M 10/0567
2009/0253045 A1  10/2009  Kotato et al.
(Continued)

FOREIGN PATENT DOCUMENTS

CN   101454938 A   6/2009
CN   101622751 A   1/2010
(Continued)

OTHER PUBLICATIONS

Office Action dated Jun. 13, 2019 in Chinese Patent Application No. 201480008654.7 (with English translation).
(Continued)

*Primary Examiner* — Laura Weiner
(74) *Attorney, Agent, or Firm* — Oblon, McClelland, Maier & Neustadt, L.L.P.

(57) ABSTRACT

Disclosed herein is a nonaqueous electrolyte solution containing an electrolyte and a nonaqueous solvent, the nonaqueous electrolyte solution including a compound represented by formula (A) and: (1) at least one compound selected from a nitrile compound, an isocyanate compound, a difluorophosphate, a fluorosulfonate, a lithium bis(fluorosulfonyl)imide and a compound represented by the formula (B) below, or (2) a cyclic carbonate compound having a fluorine atom in an amount of 0.01% by mass to 50.0% by mass based on a total amount of the nonaqueous electrolyte solution. In formula (A), $R_1$ to $R_3$ represent optionally substituted organic groups having 1 to 20 carbon atoms, and in formula (B), $R_4$, $R_5$ and $R_6$ independently represent an alkyl group, alkenyl group or alkynyl group having 1 to 12 carbon atoms that may be substituted with a halogen atom, and n represents an integer of 0 to 6.

(A)

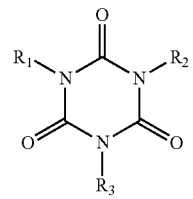

(B)

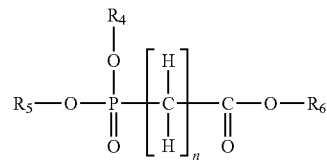

7 Claims, No Drawings

Related U.S. Application Data application No. PCT/JP2014/054965, filed on Feb. 27, 2014.

(51) Int. Cl.
*H01M 4/587* (2010.01)
*H01M 10/052* (2010.01)
*H01M 4/36* (2006.01)
*H01M 4/583* (2010.01)
*H01M 10/0525* (2010.01)

(52) U.S. Cl.
CPC ........... *H01M 4/387* (2013.01); *H01M 4/583* (2013.01); *H01M 4/587* (2013.01); *H01M 10/052* (2013.01); *H01M 10/0525* (2013.01); *H01M 2220/30* (2013.01); *H01M 2300/0025* (2013.01)

(56) References Cited

U.S. PATENT DOCUMENTS

| | | |
|---|---|---|
| 2010/0035147 A1 | 2/2010 | Kotato et al. |
| 2011/0159377 A1 | 6/2011 | Lee et al. |
| 2012/0088160 A1 | 4/2012 | Zhang et al. |
| 2012/0115042 A1 | 5/2012 | Kotato et al. |
| 2012/0156557 A1 | 6/2012 | Kotato et al. |
| 2012/0264011 A1 | 10/2012 | Kotato et al. |
| 2013/0033061 A1 | 12/2013 | Shigematsu et al. |
| 2013/0330609 A1 | 12/2013 | Sawa et al. |
| 2014/0272606 A1 | 9/2014 | Chu et al. |
| 2015/0147645 A1 | 5/2015 | Lee et al. |
| 2016/0164143 A1 | 6/2016 | Sawa et al. |

FOREIGN PATENT DOCUMENTS

| | | |
|---|---|---|
| CN | 103199302 | 7/2013 |
| JP | 7-176322 A | 7/1995 |
| JP | 7-192757 A | 7/1995 |
| JP | 11-67270 A | 3/1999 |
| JP | 2000-268859 A | 9/2000 |
| JP | 2000-348765 | 12/2000 |
| JP | 2000-348765 A | 12/2000 |
| JP | 2001-57234 A | 2/2001 |
| JP | 2001-57235 A | 2/2001 |
| JP | 2002-358999 A | 12/2002 |
| JP | 2010-529633 A | 8/2010 |
| JP | 2010-282906 A | 12/2010 |
| JP | 2011-187440 A | 9/2011 |
| JP | 2012-104439 A | 5/2012 |
| JP | 2012-182130 A | 9/2012 |
| JP | 2012-182132 A | 9/2012 |
| WO | 2008-050599 A1 | 5/2008 |
| WO | WO 2012/014998 A1 | 2/2012 |
| WO | WO 2012/108505 A1 | 8/2012 |

OTHER PUBLICATIONS

Office Action dated Jan. 29, 2020 in corresponding Korean Patent Application No. 10-2015-7021521 (with English Translation), 12 pages.
International Search Report dated May 20, 2014 issued in PCT/JP2014/054965.
Chinese Patent Application No. 201480008654.7 (with English translation).
Office Action dated Sep. 19, 2017 in Japanese Patent Application No. 2014-037217 (with unedited computer generated English translation).
Office Action dated Sep. 19, 2017 in Japanese Patent Application No. 2014-066837 (with unedited computer generated English translation).
Combined Office Action and Search Report dated Oct. 18, 2017 in Chinese Patent Application No. 201480008654.7 (with unedited computer generated English translation and English translation of categories of cited documents).
Office Action dated Nov. 12, 2018 in Chinese Patent Application No. 201480008654.7 (with English translation), filed Feb. 27, 2014.
Office Action dated Apr. 27, 2018 in Chinese Patent Application No. 201480008654.7 with English translation.
Combined Chinese Office Action and Search Report dated Aug. 23, 2021 in Chinese Patent Application No. 201910140912.1 (with unedited computer generated English translation), 21 pages.
Office Action as received in the corresponding CN patent application No. 201910140912.1, dated Mar. 25, 2022 w/English Translation, 18 pages.

* cited by examiner

NONAQUEOUS ELECTROLYTE SOLUTION AND NONAQUEOUS ELECTROLYTE BATTERY USING SAME

This application is a divisional of U.S. application Ser. No. 14/835,815 filed Aug. 26, 2015, abandoned, which is a continuation of PCT/JP2014/054965 filed Feb. 27, 2014, and claims the benefit of JP 2013-067186 filed Mar. 27, 2013 and JP 2013-037724 filed Feb. 27, 2013.

TECHNICAL FIELD

The present invention relates to a nonaqueous electrolyte solution and a nonaqueous electrolyte battery using the same.

BACKGROUND ART

Accompanying the rapid progress made in the area of cell phones, laptop personal computers and other portable electronic devices, there is a growing demand for batteries used as the main and backup power supplies thereof to demonstrate higher capacities, and nonaqueous electrolyte batteries such as lithium ion secondary batteries are attracting attention for such applications since they demonstrate higher energy density in comparison with nickel-cadmium batteries or nickel-hydrogen batteries.

Typical examples of the electrolyte solution of lithium ion secondary batteries include nonaqueous electrolyte solutions obtained by dissolving an electrolyte, such as $LiPF_6$, $LiBF_4$, $LiN(CF_3SO_2)_2$ or $LiCF_3(CF_2)_3SO_3$, in a mixed solvent consisting of a solvent having a high dielectric constant, such as ethylene carbonate or propylene carbonate, and a solvent having a low viscosity such as dimethyl carbonate, diethyl carbonate or ethyl methyl carbonate.

In addition, carbonaceous materials capable of occluding and releasing lithium ions are mainly used for a negative electrode active material of lithium ion secondary batteries, and typical examples thereof include natural graphite, artificial graphite and amorphous carbon. Metal or alloy-based negative electrodes are also known that use silicon or tin and the like with the aim of further increasing capacity. Transition metal compound oxides capable of occluding and releasing lithium ions are mainly used for a positive electrode active material, and typical examples of the transition metal include cobalt, nickel, manganese and iron.

Such lithium ion secondary batteries are known to undergo decreases in charge-discharge capacity caused by side reactions between the electrodes and electrolyte since they use highly active positive and negative electrodes, and various studies have been conducted on nonaqueous solvents and electrolytes in order to improve battery properties.

In Patent Document 1, an attempt is made to improve battery storage properties by adding a tricarboimide compound such as triallyl cyanurate or triallyl isocyanurate to a nonaqueous electrolyte solution.

Patent Document 2 reports that superior cycle stability is obtained by dissolving a low molecular weight isocyanate compound in an organic electrolyte solution to form a reactive layer on the electrode interface.

Patent Document 3 proposes that a large dipole moment generated by polarization of nitrile groups is able to inhibit oxidative decomposition of an electrolyte solution on a positive electrode when charging at a high voltage by using an electrolyte solution containing an organic compound having two or more nitrile groups, and that battery properties are improved as a result thereof.

Patent Document 4 reports that the use of an electrolyte solution containing lithium fluorosulfonate improves battery high-temperature storage characteristics, input/output characteristics and impedance characteristics.

Patent Document 5 reports that the use of an electrolyte solution containing lithium fluorophosphate improves battery high-temperature storage characteristics.

Patent Documents 6 and 7 report that the addition of a phosphite ester compound and triallyl cyanurate or triallyl isocyanurate to a nonaqueous electrolyte solution improves cycle characteristics and electrolyte solution safety.

In addition, lithium ion secondary batteries have conventionally been known to undergo a decrease in capacity when repeatedly charged and discharged, an increase in battery internal resistance when stored under high-temperature conditions while in the charged state, deterioration such as a decrease in battery capacity, or in the worst possible scenario, have the potential for being extremely dangerous due to rupturing or ignition of the battery due to a runaway reaction within the battery per se, and various studies have also been conducted on nonaqueous solvents and electrolytes in order to rectify this situation.

Patent Document 8 proposes that, by using as an electrolyte solution additive an isocyanuric acid derivative having substituents consisting of an alkyl group or aryl group having 1 to 10 carbon atoms or an organic group having 1 to 20 carbon atoms containing a carbonyl group and/or oxy group and/or a double bond, a reductive decomposition reaction of the solvent that occurs during charging can be suppressed to a low level, battery life with respect to such parameters as high-temperature storage characteristics and cycle characteristics, battery charging/discharging efficiency, and low-temperature characteristics can be improved.

PRIOR ART DOCUMENTS

Patent Documents

Patent Document 1: Japanese Unexamined Patent Publication No. H07-192757
Patent Document 2: Japanese Unexamined Patent Publication No. 2000-268859
Patent Document 3: Japanese Unexamined Patent Publication No. H07-176322
Patent Document 4: Japanese Unexamined Patent Publication No. 2011-187440
Patent Document 5: Japanese Unexamined Patent Publication No. H11-67270
Patent Document 6: Japanese Unexamined Patent Publication No. 2010-282906
Patent Document 7: International Publication No. WO 2008/50599
Patent Document 8: Japanese Unexamined Patent Publication No. 2000-348765

DISCLOSURE OF THE INVENTION

Problems to be Solved by the Invention

However, although there has been an even greater need to improve the properties of lithium nonaqueous electrolyte secondary batteries in recent years, and these batteries are required to demonstrate a high level of performance with respect to all battery properties, including high-temperature storage characteristics, energy density, output characteristics, battery life, high-speed charging and discharging characteristics and low-temperature characteristics, these requirements have yet to be met. Since there is a tradeoff between durability performance, including high-temperature storage characteristics, and other aspects of performance such as capacity, resistance or output characteristics, there has been the problem of it being difficult to achieve a favorable balance with respect to overall performance.

In addition, Patent Document 8 does not mention a compound having substituents other than substituents consisting of an alkyl group or aryl group or an organic group having 1 to 20 carbon atoms containing a carbonyl group and/or oxy group and/or double bond, and there is also no mention made regarding effects on battery internal resistance.

The present invention was realized in consideration of the aforementioned problems. Namely, an object of the present invention is to provide a lithium nonaqueous electrolyte secondary battery that demonstrates a favorable overall balance of battery performance with respect to performance such as durability, capacity, resistance and output characteristics.

Moreover, an object of the present invention is to provide a lithium nonaqueous electrolyte secondary battery, and more particularly, a nonaqueous electrolyte solution for a secondary battery that inhibits increases in resistance during high-temperature storage in a charged state and decreases in capacity, as well as a secondary battery that uses this lithium nonaqueous electrolyte solution.

Means for Solving the Problems

As a result of conducting extensive studies to achieve the aforementioned objects, the inventors of the present invention has completed the present invention as subsequently described, which can solve the aforementioned problems.

Invention 1 relates to a nonaqueous electrolyte solution for a nonaqueous electrolyte battery provided with a positive electrode and negative electrode capable of occluding and releasing metal ions, wherein in addition to containing an electrolyte and a nonaqueous solvent, the nonaqueous electrolyte solution contains a compound represented by the following general formula (A), and (1) at least one compound selected from the group consisting of a nitrile compound, an isocyanate compound, a difluorophosphate, a fluorosulfonate, a lithium bis(fluorosulfonyl)imide and a compound represented by the following general formula (B), or (2) a cyclic carbonate compound having a fluorine atom in an amount of 0.01% by mass to 50.0% by mass based on the total amount of the nonaqueous electrolyte solution.

[Chemical 1]

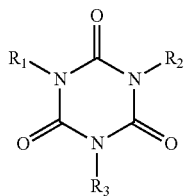

(A)

In formula (A), $R_1$ to $R_3$ may be mutually the same or different and represent optionally substituted organic groups having 1 to 20 carbon atoms.

[Chemical 2]

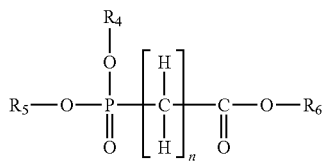

(B)

In formula (B), $R_4$, $R_5$ and $R_6$ respectively and independently represent an alkyl group, alkenyl group or alkynyl group having 1 to 12 carbon atoms that may be substituted with a halogen atom, and n represents an integer of 0 to 6.

Invention 2 relates to a nonaqueous electrolyte solution containing an electrolyte and a nonaqueous solvent, wherein the nonaqueous electrolyte solution contains a compound represented by the following general formula (1).

[Chemical 3]

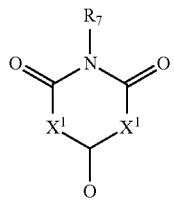

(1)

In formula (1), $X^1$ and $X^2$ independently represent $NR_8$, $NR_8R_9$ or $CR_8R_9$, $R_7$ to $R_9$ respectively and independently represent a hydrogen atom, fluorine atom, alkyl group, alkenyl group, alkynyl group or aryl group, at least one of $R_7$ to $R_9$ represents a group having a cyano group, and may be mutually the same or different.

Invention 3 relates to the nonaqueous electrolyte solution described in Invention 1, wherein in the general formula (A), at least one of $R_1$ to $R_3$ is a hydrocarbon group having a carbon-carbon unsaturated bond.

Invention 4 relates to the nonaqueous electrolyte solution described in Invention 1 or Invention 3, wherein the hydrocarbon group having a carbon-carbon unsaturated bond is an allyl group or a methallyl group.

Invention 5 relates to the nonaqueous electrolyte solution described in any of Inventions 1 and 3 to 4, wherein the added amount of the compound containing a structure represented by the general formula (A) is 0.01% by mass to 10.0% by mass based on the total amount of the nonaqueous electrolyte solution.

Invention 6 relates to the nonaqueous electrolyte solution described in any of Inventions 1 and 3 to 5, wherein the nitrile compound, the isocyanate compound, the difluorophosphate, the fluorosulfonate, the lithium bis(fluorosulfonyl)imide and the compound represented by the general formula (B) are contained in an amount of 0.01% by mass to 10.0% by mass based on the total amount of the nonaqueous electrolyte solution.

Invention 7 relates to the nonaqueous electrolyte solution described in any of Inventions 1 and 3 to 6, wherein the cyclic carbonate having a fluorine atom is at least one compound selected from the group consisting of monofluoroethylene carbonate, 4,4-difluoroethylene carbonate and 4,5-difluoroethylene carbonate.

Invention 8 relates to the nonaqueous electrolyte solution described in any of Inventions 1 and 3 to 7, wherein the nonaqueous electrolyte solution contains at least one compound selected from the group consisting of a cyclic carbonate having a carbon-carbon unsaturated bond, an acid anhydride, a vinyl sulfonate ester, an aromatic compound having 12 carbon atoms or less and a linear carboxylate ester.

Invention 9 relates to the nonaqueous electrolyte solution described in Invention 2, wherein the compound represented by the general formula (1) is a compound represented by any of the following structural formulas (2) to (9).

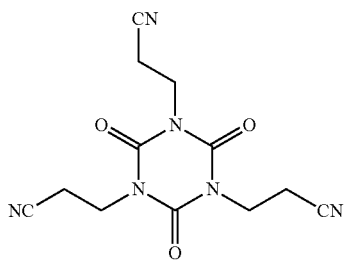

Invention 10 relates to the nonaqueous electrolyte solution described in Invention 2 or 9, wherein the content of the compound represented by the general formula (1) is a ratio of 0.001% by mass to 10% by mass based on the total amount of the nonaqueous electrolyte solution.

Invention 11 relates to the nonaqueous electrolyte solution described in any of Inventions 2, 9 and 10, which contains at least one compound selected from the group consisting of a cyclic carbonate having a carbon-carbon unsaturated bond, a cyclic carbonate having a halogen atom, a monofluorophosphate, a difluorophosphate and a nitrile compound.

Invention 12 relates to a nonaqueous electrolyte secondary battery provided with a positive electrode capable of occluding and releasing lithium ions and a negative electrode capable of occluding and releasing lithium ions, wherein the nonaqueous electrolyte solution is the nonaqueous electrolyte solution described in any of Inventions 1 to 11.

Invention 13 relates to the nonaqueous electrolyte battery described in Invention 12, wherein a negative electrode active material of the negative electrode capable of occluding and releasing lithium ions has carbon as a constituent element thereof.

Invention 14 relates to the nonaqueous electrolyte battery described in Invention 13, wherein a negative electrode active material of the negative electrode capable of occluding and releasing lithium ions has silicon (Si) or tin (Sn) as a constituent element thereof.

Invention 15 relates to the nonaqueous electrolyte battery described in Invention 14, wherein a negative electrode active material of the negative electrode capable of occluding and releasing lithium ions is a mixture or complex of particles having silicon (Si) or tin (Sn) as a constituent element thereof and graphite particles.

Invention 16 relates to the nonaqueous electrolyte battery described in Invention 15, wherein the content of the particles having silicon (Si) or tin (Sn) as a constituent element thereof based on the total amount of the particles having silicon (Si) or tin (Sn) as a constituent element thereof and the graphite particles is 0.1% by mass to 25% by mass.

Effect of the Invention

According to the present invention, a lithium nonaqueous electrolyte secondary battery can be provided that demonstrates favorable overall balance of battery performance with respect to performance such as durability, capacity, resistance and output characteristics.

Although the action and principle behind a nonaqueous electrolyte secondary battery fabricated using the nonaqueous electrolyte solution of the present invention and the nonaqueous electrolyte secondary battery of the present invention demonstrating favorable overall balance of battery performance is not clear, they are thought to be as indicated below. However, the present invention is not limited to the action and principle described below.

Although the compounds described in Patent Documents 1 to 5 are reported to improve high-temperature storage characteristics and cycle characteristics of a battery by acting on the positive electrode or negative electrode of the battery to inhibit a decomposition reaction of the electrolyte solution, the majority of the effects thereof were limited to improvement of high-temperature storage characteristics and those effects were unable to be said to be adequate. In addition, the effect of improving cycle characteristics described in Patent Document 2 was also inadequate and was not satisfactory.

Although it is described in Patent Document 6 that a fluorinated cyclic carbonate such as fluoroethylene carbonate is used as a cyclic carbonate in an electrolyte solution, the optimum amount thereof and the like are not clear.

In order to solve the aforementioned problems, the present invention contains a compound containing a structure represented by formula (A) and (1) at least one compound selected from the group consisting of a nitrile compound, an isocyanate compound, a difluorophosphate, a fluorosulfonate, a lithium bis(fluorosulfonyl)imide and a compound represented by general formula (B). As a result, it was found that not only high-temperature storage characteristics, but also cycle characteristics and rate characteristics are also improved, thereby leading to completion of the present invention.

In order to solve the aforementioned problems, the present invention contains a compound containing a structure represented by formula (A) and (2) a cyclic carbonate compound having a fluorine atom in an amount of 0.01% by mass to 50.0% by mass based on the total amount of the nonaqueous electrolyte solution. As a result, the suitable amount of cyclic carbonate having a fluorine atom contained in the nonaqueous electrolyte solution was found, thereby leading to completion of the present invention.

As a result of using as a battery electrolyte solution, the nonaqueous electrolyte solution of the present invention is able to inhibit generation of gas during high-temperature storage of the battery in a charged state while also inhibiting decreases in capacity during high-temperature storage in a charged state.

DESCRIPTION OF EMBODIMENTS

Although the following provides an explanation of embodiments of the present invention, the present invention is not limited to the following embodiments, and can be arbitrarily modified within a range that does not deviate from the gist of the present invention.

In addition, the terms "% by weight", "ppm by weight" and "parts by weight" respectively have the same meanings as "% by mass", "ppm by mass" and "parts by mass". In addition, cases in which a quantity is simply described with ppm refer to "ppm by weight".

Next, an explanation is provided of a first embodiment of the present invention.

I. First Embodiment

1. Nonaqueous Electrolyte Solution 1-1. Nonaqueous Electrolyte Solution of Present Invention The nonaqueous electrolyte solution of the present invention contains a compound containing a structure represented by the following general formula (A), and at least one compound selected from the group consisting of a nitrile compound, an isocyanate compound, a difluorophosphate, a fluorosulfonate, a lithium bis(fluorosulfonyl)imide and a compound represented by the following general formula (B).

1-1-1. Compound Having Structure Represented by General Formula (A)

[Chemical 5]

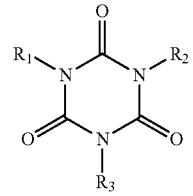

(A)

In formula (A), $R_1$ to $R_3$ may be mutually the same or different and are optionally substituted organic groups having 1 to 20 carbon atoms.

Here, an organic group represents a functional group composed of atoms selected from the group consisting of carbon atoms, hydrogen atoms, nitrogen atoms, oxygen atoms and halogen atoms. Specific examples thereof include an alkyl group, alkenyl group, alkynyl group, aryl group, alkoxy group, nitrile group, ether group, carbonate group and carbonyl group.

In addition, examples of substituents include an alkyl group, alkenyl group, alkynyl group, aryl group, alkoxy group, nitrile group, ether group, carbonate group, carbonyl group, carboxyl group, sulfonyl group and phosphoryl group, which may be substituted with a halogen atom.

Specific examples of alkyl groups include linear or branched alkyl groups such as a methyl group, ethyl group, n-propyl group, i-propyl group, n-butyl group, sec-butyl group and tert-butyl group, fluorine-substituted alkyl groups, and cyclic alkyl groups such as a cyclopropyl group, cyclopentyl group and cyclohexyl group.

Specific examples of alkenyl groups include a vinyl group, allyl group, methallyl group, 1-propenyl group and fluorine-substituted vinyl, allyl, methallyl and alkyl groups.

Specific examples of alkynyl groups include an ethynyl group, propargyl group and 1-propynyl group.

Specific examples of aryl groups include a phenyl group, tolyl group, benzyl group and phenethyl group.

Specific examples of optionally substituted organic groups include an acrylic group, methacrylic group, acrylic group and methacrylic group via an alkyl group, epoxy group, glycidyl group, carbonyl group, cyanoalkyl group, vinylsulfonyl group, trimethoxysilyl group, trimethoxysilyl group having an alkyl group, trimethylsilyl group and trimethylsilyl group having an alkyl group.

Among these, preferable examples include a methyl group, ethyl group, i-propyl group, tert-butyl group, cyclohexyl group, vinyl group, allyl group, methallyl group, ethynyl group, propargyl group, phenyl group, acrylic group, methacrylic group, acrylic group and methacrylic group via an alkyl group, glycidyl group, carbonyl group, cyanoalkyl group, vinylsulfonyl group, trimethoxysilyl group, trimethoxysilyl group having an alkyl group, trimethylsilyl group, trimethylsilyl group having an alkyl group, fluorine-substituted alkyl group, fluorine-substituted vinyl group and alkyl group.

More preferable examples include a cyclohexyl group, vinyl group, allyl group, methallyl group, ethynyl group, propargyl group, phenyl group, acrylic group, methacrylic group, acrylic group and methacrylic group via an alkyl group, glycidyl group, cyanoalkyl group, vinylsulfonyl group, trimethoxysilyl group, trimethoxysilyl group having an alkyl group, trimethylsilyl group, trimethylsilyl group having an alkyl group, fluorine-substituted alkyl group, fluorine-substituted vinyl group and alkyl group.

Particularly preferable examples include a cyclohexyl group, vinyl group, allyl group, methallyl group, ethynyl group, propargyl group, acrylic group, methacrylic group, acrylic group and methacrylic group via an alkyl group, carbonyl group, vinylsulfonyl group, trimethoxysilyl group, trimethoxysilyl group having an alkyl group, trimethylsilyl group, trimethylsilyl group having an alkyl group, fluorine-substituted vinyl group and alkyl group.

Most preferable examples include a vinyl group, allyl group, methallyl group, ethynyl group, propargyl group, acrylic group and methacrylic group via an alkyl group, vinylsulfonyl group, glycidyl group, trimethoxysilyl group, trimethoxysilyl group having an alkyl group, trimethylsilyl group, trimethylsilyl group having an alkyl group, fluorine-substituted vinyl group and alkyl group. Among these, groups having a carbon-carbon unsaturated bond are preferable.

Specific examples of compounds include those indicated below.

[Chemical 6]

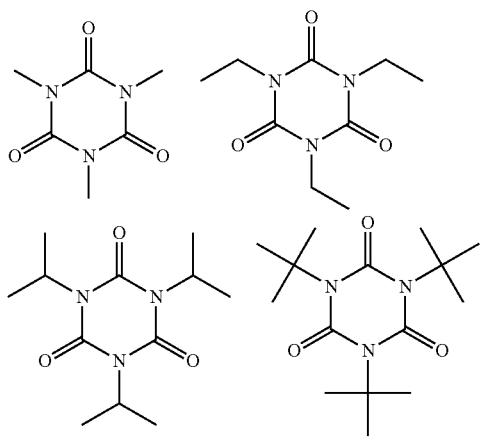

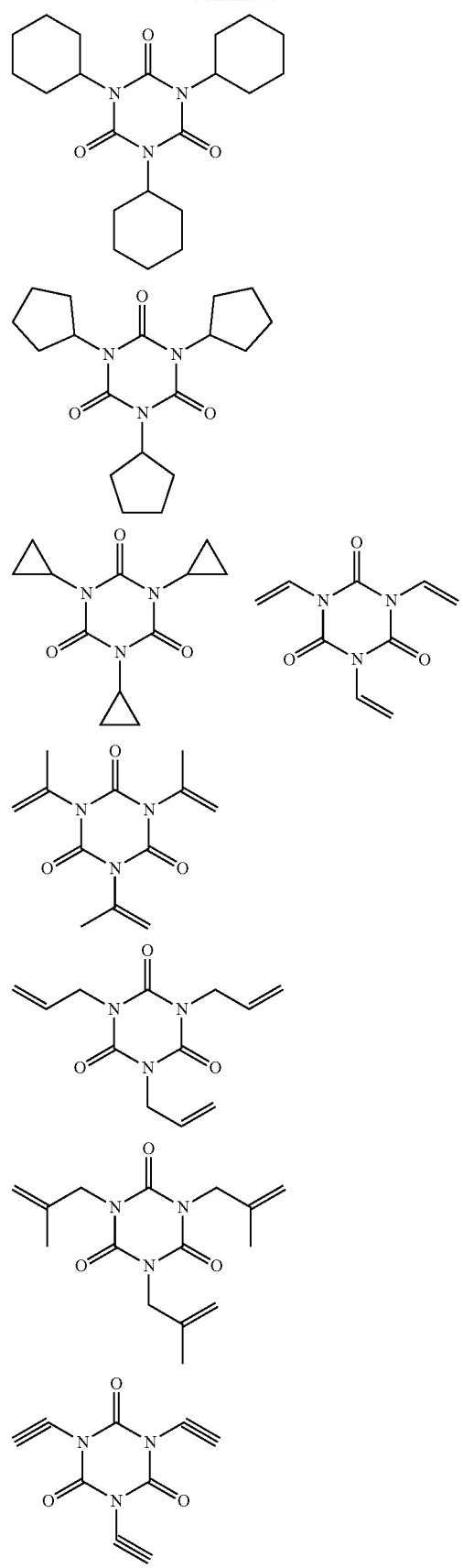

-continued

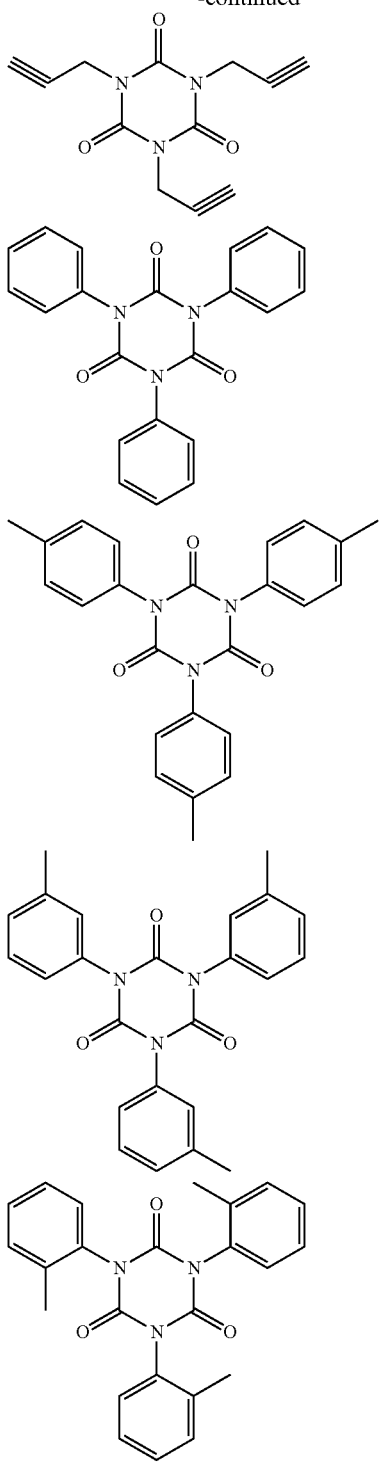
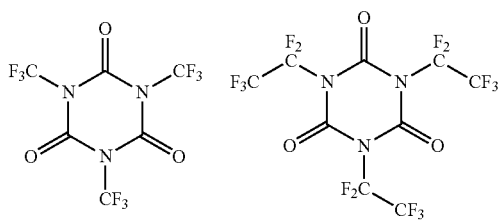
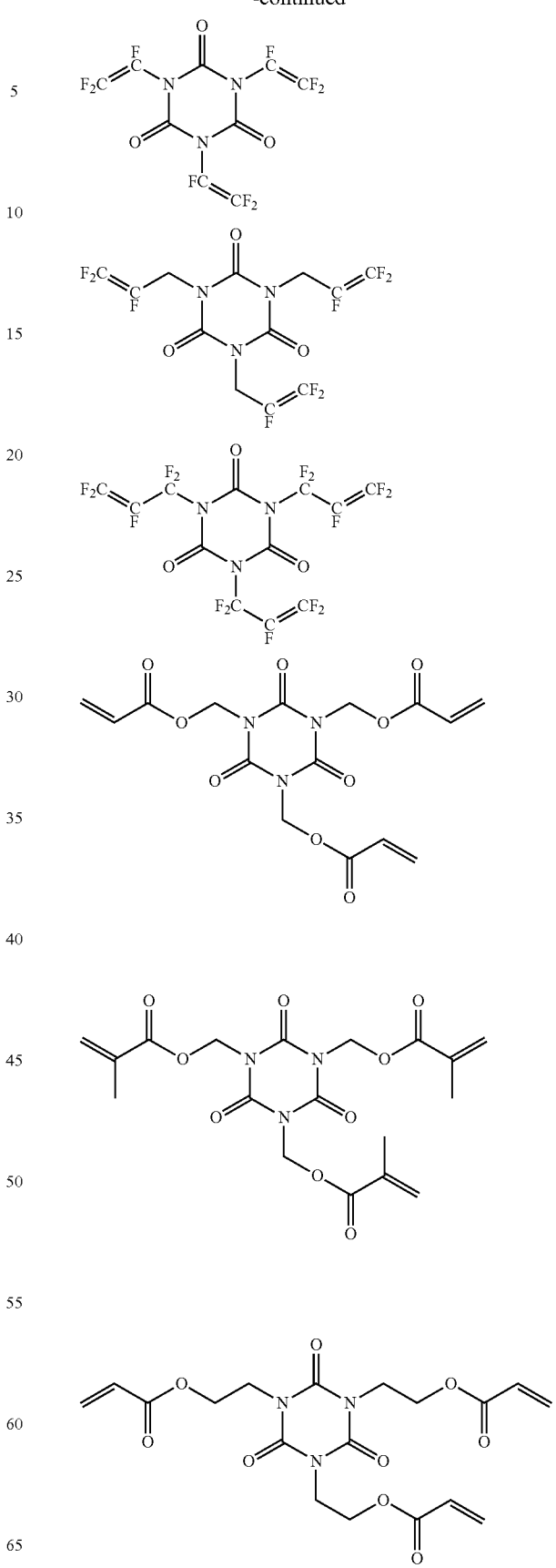

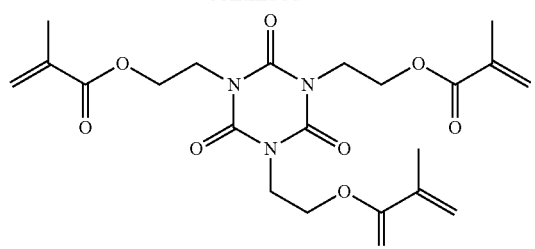
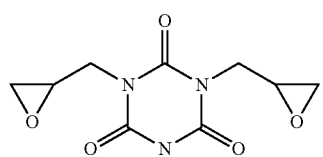
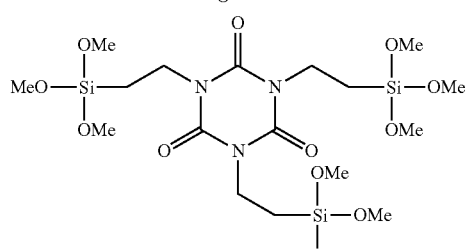
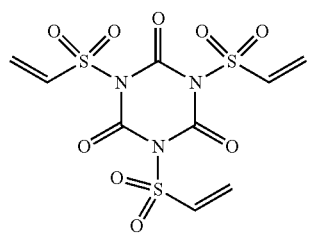
[Chemical 8]
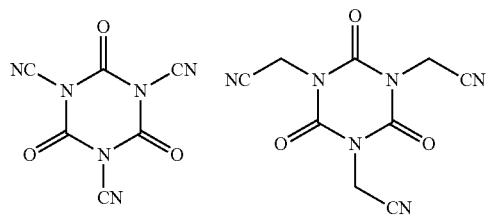
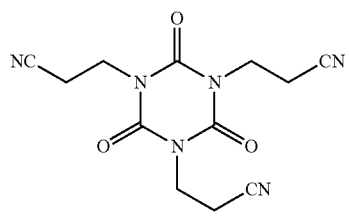
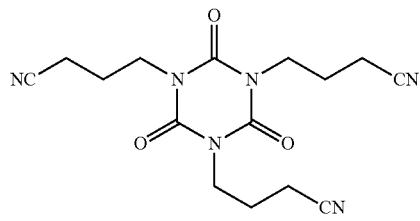
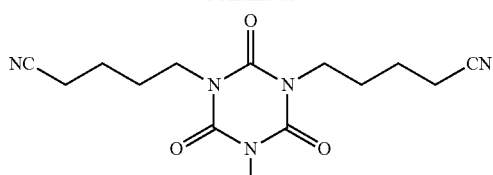
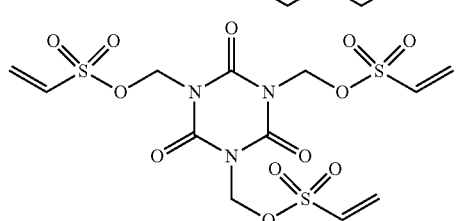
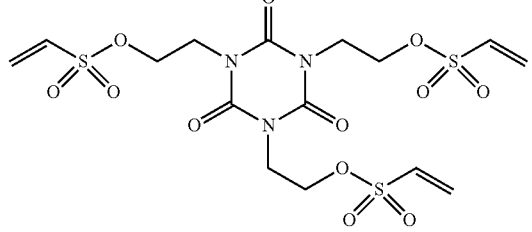
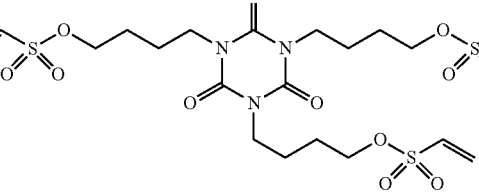
Among these, preferable examples of compounds include those indicated
[Chemical 9]
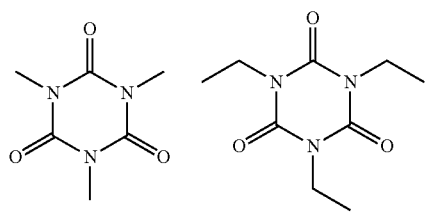
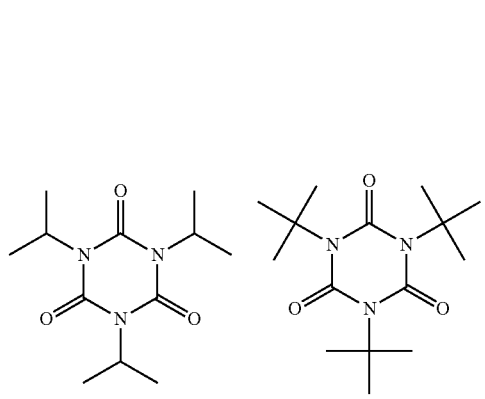

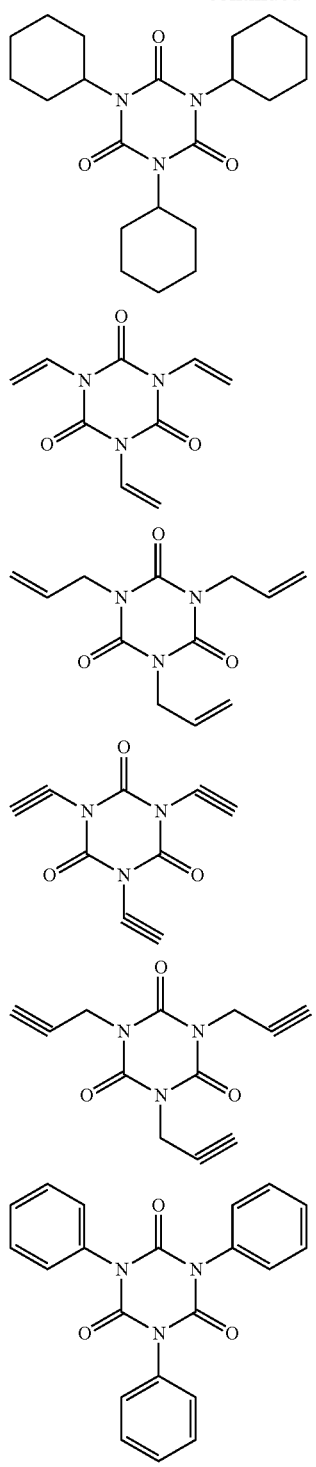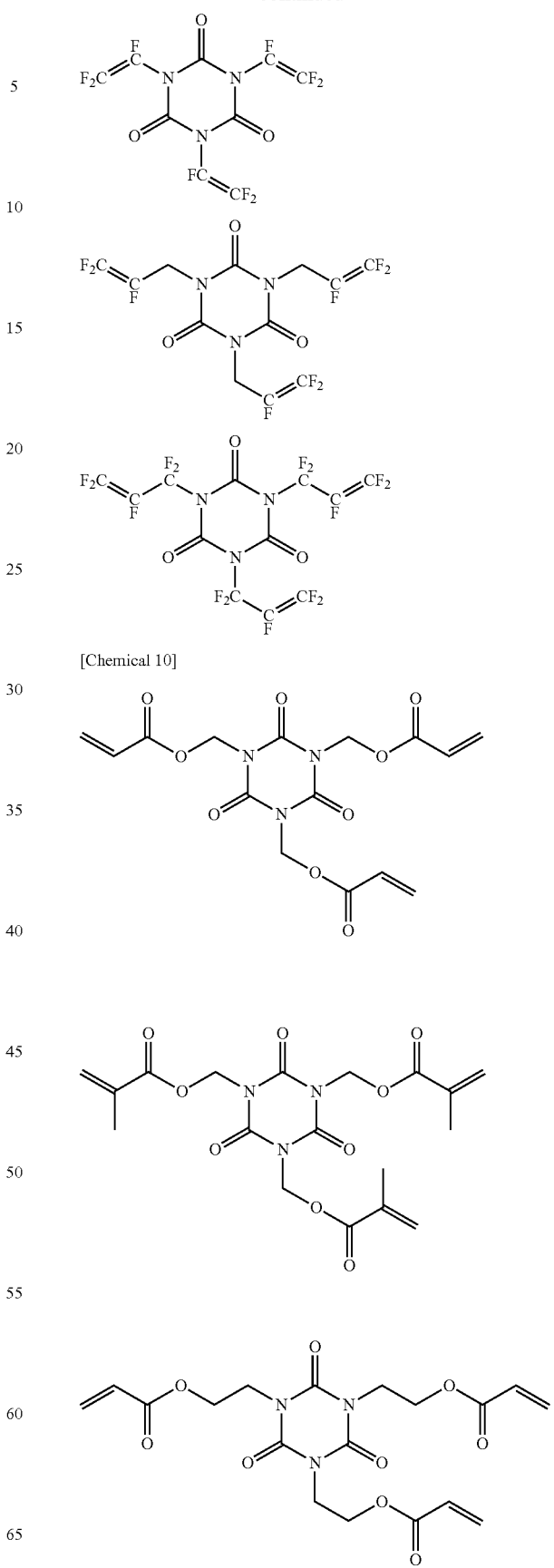
[Chemical 10]

-continued
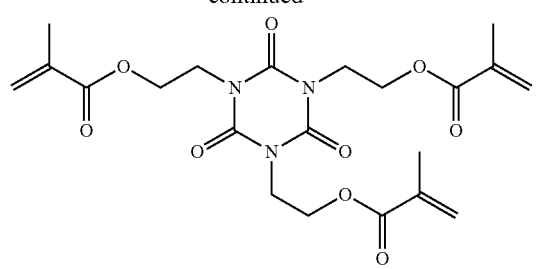
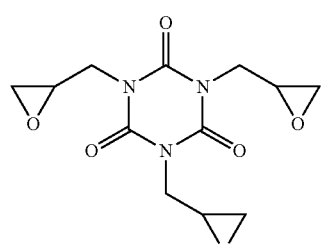
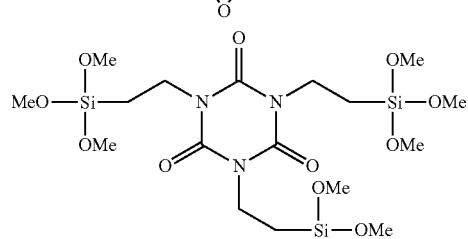
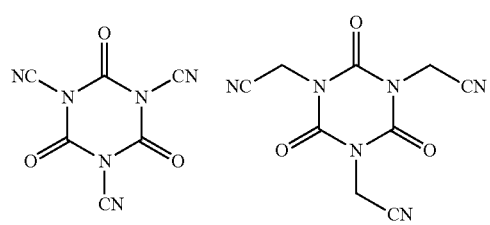
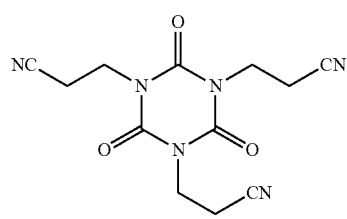
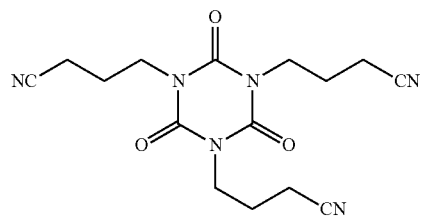
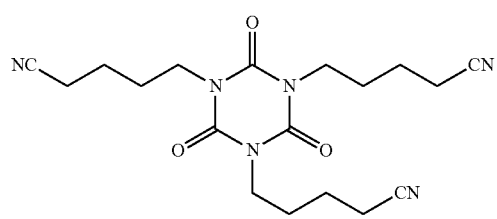
-continued
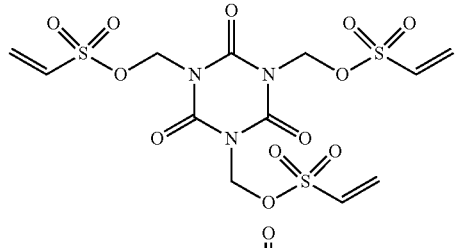
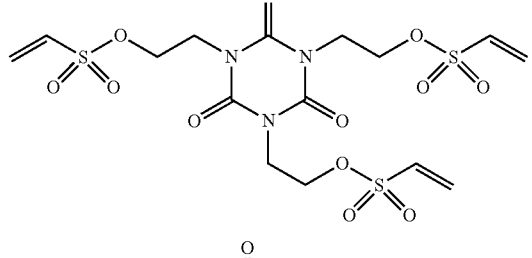
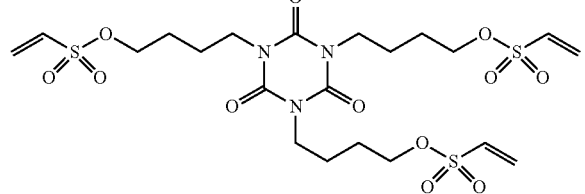
More preferable examples of compounds include those indicated below.
[Chemical 11]
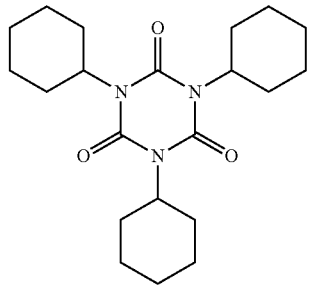
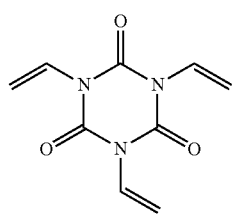
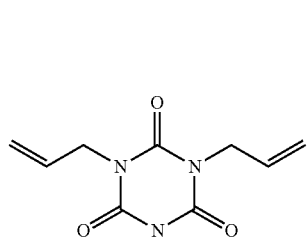

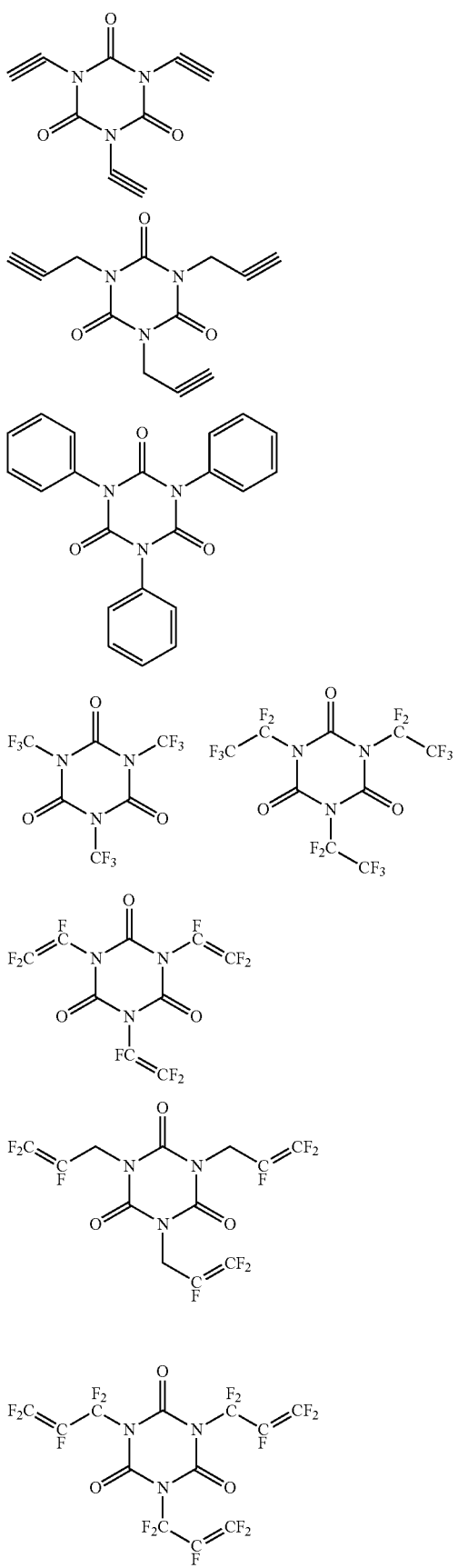
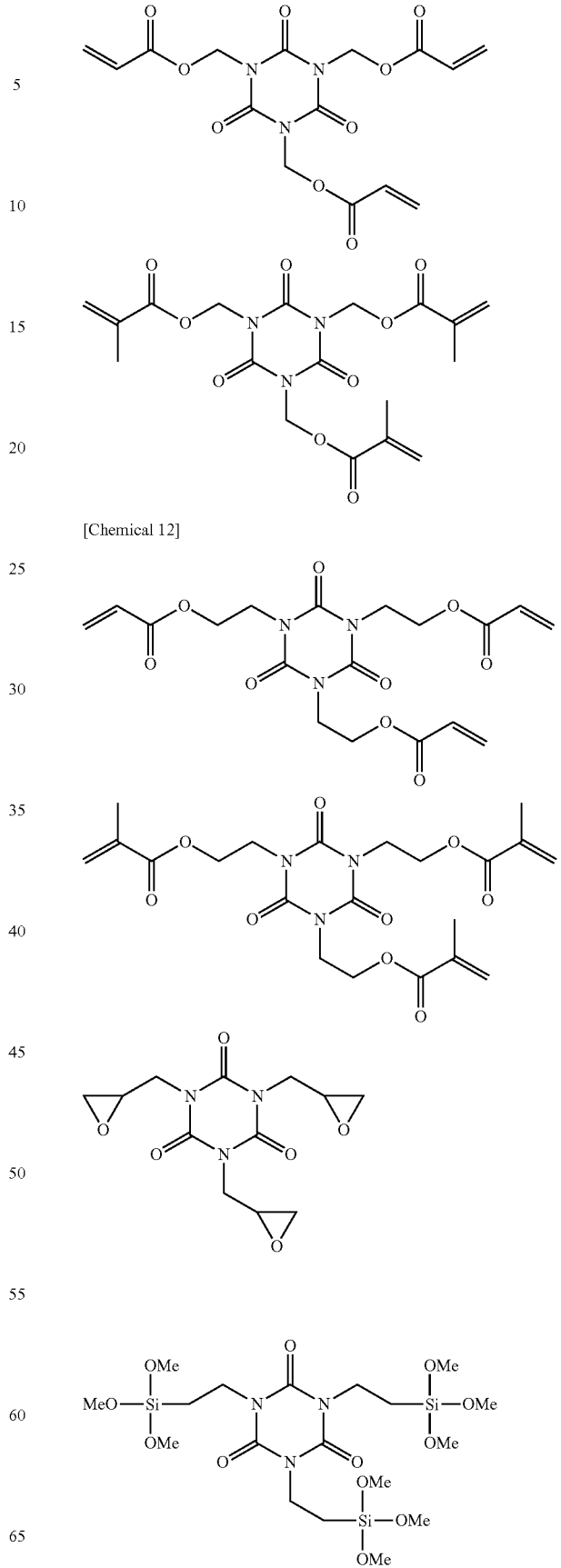

-continued
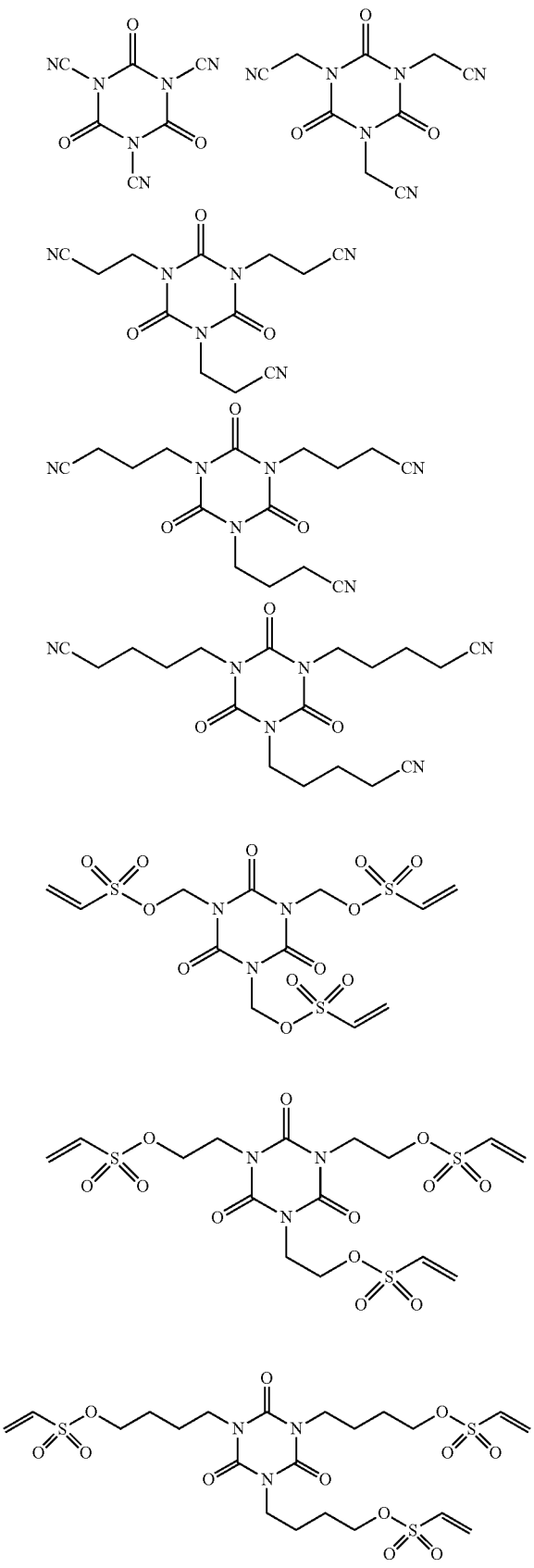
Particularly preferable examples of compounds include those indicated below.
[Chemical 13]
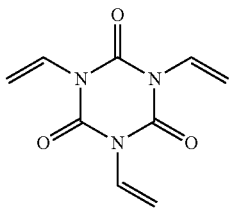
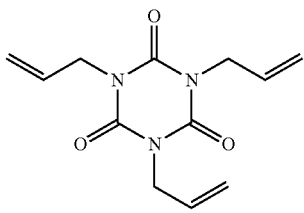
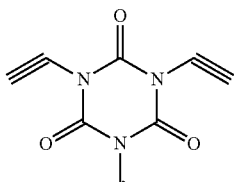
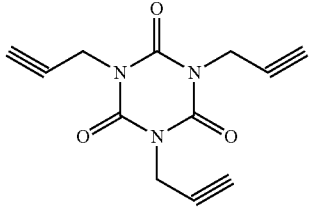
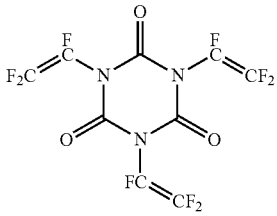
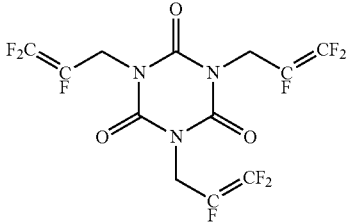
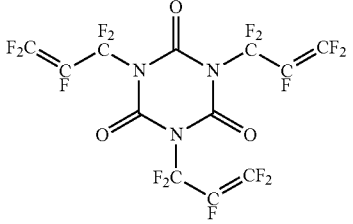

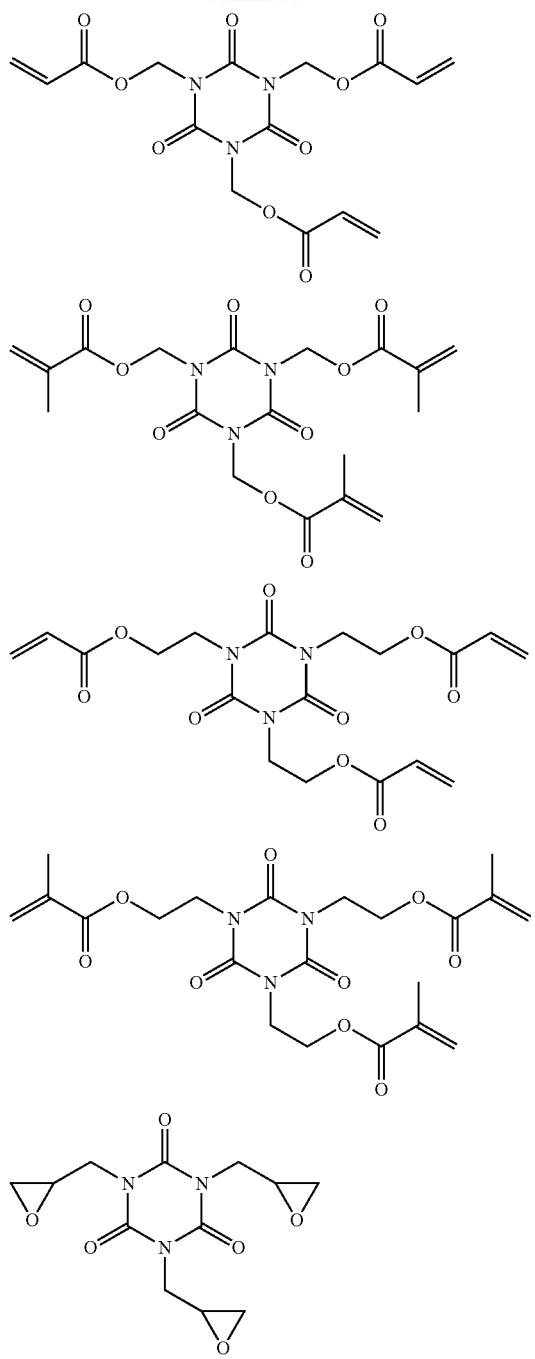
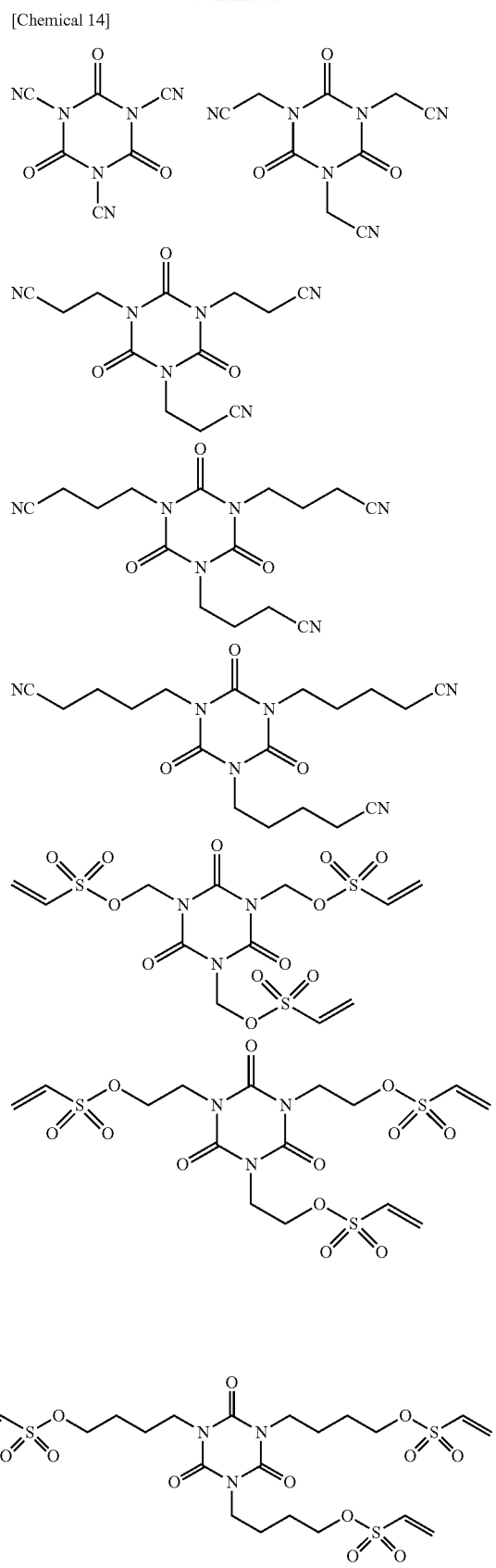

Most preferable examples of compounds include those indicated below.
[Chemical 15]
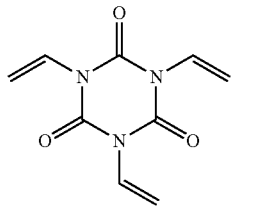
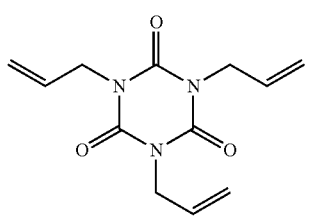
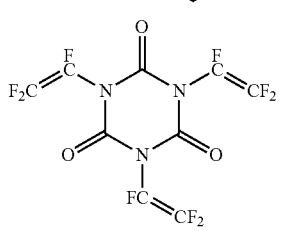
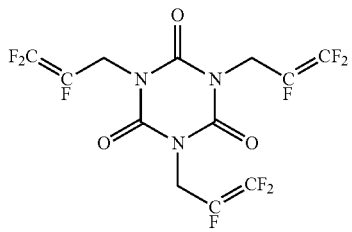
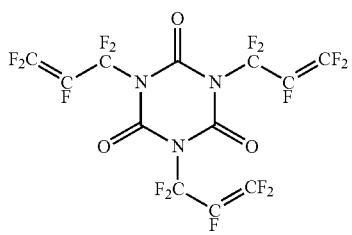
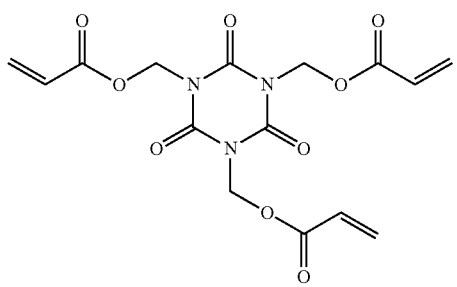
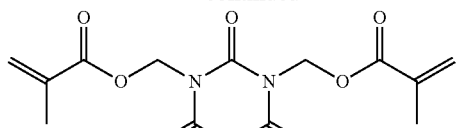
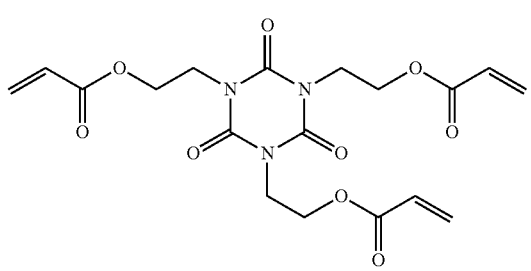
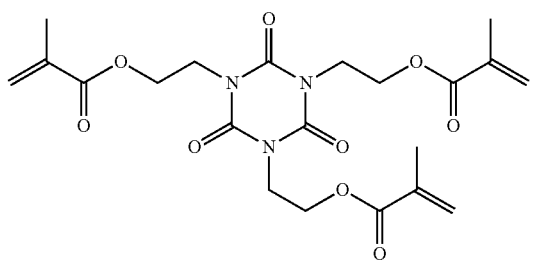
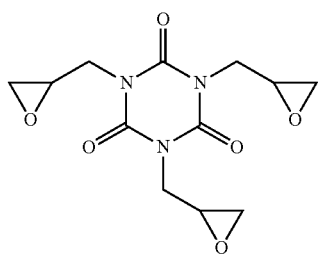
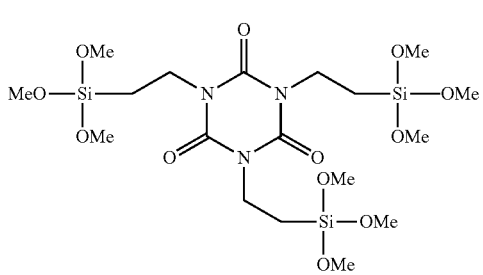
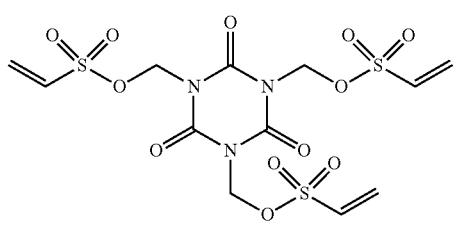

-continued

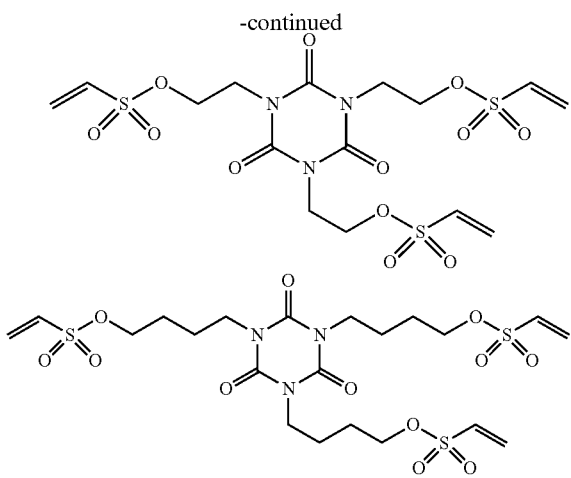

Although there are no limitations on the incorporated amount of a compound represented by general formula (A) based on the total of the nonaqueous electrolyte solution of the present invention, and may be any incorporated amount provided it does not significantly impair the effects of the present invention, the compound is normally contained in the nonaqueous electrolyte solution of the present invention at a concentration of 0.001% by mass or more, preferably 0.01% by mass or more and more preferably 0.1% by mass or more, and normally 10% by mass or less, preferably 5% by mass or less, more preferably 3% by mass or less, even more preferably 2% by mass or less, particularly preferably 1% by mass or less and most preferably 0.5% by mass or less.

Effects on output characteristics, load characteristics, low-temperature characteristics, cycle characteristics, high-temperature storage characteristics and the like are further improved in the case of satisfying the aforementioned range.

1-1-2. Nitrile Compound

There are no particular limitations on the type of nitrile compound provided it is a compound having a nitrile group in a molecule thereof.

Specific examples of nitrile compounds include compounds having one nitrile group such as acetonitrile, propionitrile, butyronitrile, isobutyronitrile, valeronitrile, isovaleronitrile, lauronitrile, 2-methylbutyronitrile, trimethylacetonitrile, hexane nitrile, cyclopentane carbonitrile, cyclohexane carbonitrile, acrylonitrile, methacrylonitrile, crotononitrile, 3-methylcrotononitrile, 2-methyl-2-butene nitrile, 2-pentene nitrile, 2-methyl-2-pentene nitrile, 3-methyl-2-pentene nitrile, 2-hexene nitrile, fluoroacetonitrile, difluoroacetonitrile, trifluoroacetonitrile, 2-fluoropropionitrile, 3-fluoropropionitrile, 2,2-difluoroproprionitrile, 2,3-difluoropropionitrile, 3,3-difluoropropionitrile, 2,2,3-trifluoropropionitrile, 3,3,3-trifluoropropionitrile, 3,3'-oxydipropionitrile, 3,3'-thiodipropionitrile, 1,2,3-propane tricarbonitrile, 1,3,5-pentane tricarbonitrile and pentafluoropropionitrile;

compounds having two nitrile groups such as malononitrile, succinonitrile, glutaronitrile, adiponitrile, pimelonitrile, suberonitrile, azelanitrile, sebaconitrile, undecane dinitrile, dodecane dinitrile, methylmalononitrile, ethylmalononitrile, isopropylmalononitrile, tert-butylmalononitrile, methylsuccinonitrile, 2,2-dimethylsuccinonitrile, 2,3-dimethylsuccinonitrile, 2,3,3-trimethylsuccinonitrile, 2,2,3,3-tetramethylsuccinonitrile, 2,3-diethyl-2,3-dimethylsuccinonitrile, 2,2-diethyl-3,3-dimethylsuccinonitrile, bicyclohexyl-1,1-dicarbonitrile, bicyclohexyl-2,2-dicarbonitrile, bicyclohexyl-3,3-dicarbonitrile, 2,5-dimethyl-2,5-hexane dicarbonitrile, 2,3-diisobutyl-2,3-dimethylsuccinonitrile, 2,2-diisobutyl-3,3-dimethylsuccinonitrile, 2-methylglutaronitrile, 2,3-dimethylglutaronitrile, 2,4-dimethylglutaronitrile, 2,2,3,3-tetramethylglutaronitrile, 2,2,4,4-tetramethylglutaronitrile, 2,2,3,4-tetramethylglutaronitrile, 2,3,3,4-tetramethylglutaronitrile, maleonitrile, fumaronitrile, 1,4-dicyanopentane, 2,6-dicyanoheptane, 2,7-dicyanooctane, 2,8-dicyanononane, 1,6-dicyanodecane, 1,2-dicyanobenzene, 1,3-dicyanobenzene, 1,4-dicyanobenzene, 3,3'-(ethylenedioxy)dipropionitrile, 3,3'-(ethylenedithio)dipropionitrile and 3,9-bis(2-cyanoethyl)-2,4,8,10-tetraoxaspiro[5.5]undecane; and, compounds having three cyano groups such as cyclohexane tricarbonitrile, tris(cyanoethyl)amine, tris(cyanoethoxy)propane, tricyanoethylene, pentane tricarbonitrile, propane tricarbonitrile and heptane tricarbonitrile.

Among these, lauronitrile, crotononitrile, succinonitrile, glutaronitrile, adiponitrile, pimelonitrile, suberonitrile, azelanitrile, sebaconitrile, undecane dinitrile, dodecane dinitrile, fumaronitrile, 3,9-bis(2-cyanoethyl)-2,4,8,10-tetraoxaspiro[5.5]undecane are preferable from the viewpoint of improving storage characteristics. In addition, dinitrile compounds such as succinonitrile, glutaronitrile, adiponitrile, pimelonitrile, suberonitrile, azelanitrile, sebaconitrile, undecane dinitrile, dodecane dinitrile, fumaronitrile and 3,9-bis(2-cyanoethyl)-2,4,8,10-tetraoxaspiro[5.5]undecane are particularly preferable. Linear dinitriles having 4 or more carbon atoms are more preferable.

One type of nitrile compound may be used alone or two or more types may be used in combination in an arbitrary combination and ratio. Although there are no limitations on the incorporated amount of the nitrile compound with respect to the total of the nonaqueous electrolyte solution of the present invention, and may be any incorporated amount provided it does not significantly impair the effects of the present invention, the compound is normally contained in the nonaqueous electrolyte solution of the present invention at a concentration of 0.001% by mass or more, preferably 0.01% by mass or more and more preferably 0.1% by mass or more, and normally 10% by mass or less, preferably 5% by mass or less, more preferably 3% by mass or less, even more preferably 2% by mass or less and most preferably 1% by mass or less. Effects on output characteristics, load characteristics, low-temperature characteristics, cycle characteristics, high-temperature storage characteristics and the like are further improved in the case of satisfying the aforementioned range.

1-1-3. Isocyanate Compound

There are no particular limitations on the type of isocyanate compound provided it is a compound that has an isocyanate group in a molecule thereof.

Specific examples of isocyanate compounds include hydrocarbon-based monoisocyanate compounds such as methyl isocyanate, ethyl isocyanate, propyl isocyanate, isopropyl isocyanate, butyl isocyanate, tertiary butyl isocyanate, pentyl isocyanate, hexyl isocyanate, cyclohexyl isocyanate, phenyl isocyanate and fluorophenyl isocyanate;

monoisocyanate compounds having a carbon-carbon unsaturated bond such as vinyl isocyanate, allyl isocyanate, ethynyl isocyanate and propynyl isocyanate;

hydrocarbon-based diisocyanate compounds such as monomethylene diisocyanate, dimethylene diisocyanate, trimethylene diisocyanate, tetramethylene diisocyanate, pentamethylene diisocyanate, hexamethylene diisocyanate, heptamethylene diisocyanate, octamethylene diisocyanate, nonamethylene diisocyanate, decamethylene diisocyanate, dodecamethylene diisocyanate, 1,3-diisocyanatopropane, 1,4-diiscyanato-2-butene, 1,4-diisocyanato-2-fluorobutane, 1,4-diisocyanato-2,3-difluorobutane, 1,5-diisocyanato-2-pentene, 1,5-diisocyanato-2-methylpentane, 1,6-diisocyanato-2-hexene, 1,6-diisocyanato-3-hexene, 1,6-diisocyanato-3-fluorohexane, 1,6-diisocyanato-3,4-difluorohexane, toluene diisocyanate, xylene diisocyanate, tolylene diisocyanate, 1,2-bis(isocyanatomethyl)cyclohexane, 1,3-bis(isocyanatomethyl)cyclohexane, 1,4-bis(isocyanatomethyl)cyclohexane, 1,2-diisocyanatocyclohexane, 1,3-diisocyanatocyclohexane, 1,4-diisocyanatocyclohexane, dicyclohexylmethane-1,1'-diisocyanate, dicyclohexylmethane-2,2'-diisocyanate, dicyclohexylmethane-3,3'-diisocyanate, dicyclohexylmethane-4,4'-diisocyanate, bicyclo[2.2.1]heptan-2,5-diylbis(methylisocyanate), bicyclo[2.2.1]heptan-2,6-diylbis(methylisocyanate), isophorone diisocyanate, carbonyl diisocyanate, 1,4-diisocyanatobutane-1,4-dione, 1,5-diisocyanatopentane-1,5-dione, 2,2,4-trimethylhexamethylene diisocyanate and 2,4,4-trimethylhexamethylene diisocyanate; and, isocyanate compounds such as diisocyanatosulfone, (ortho-, meta- or para-)toluenesulfonyl isocyanate, benzenesulfonyl isocyanate, fluorosulfonyl isocyanate, phenoxysulfonyl isocyanate, pentafluorophenoxysulfonyl isocyanate and methoxysulfonyl isocyanate.

Among these, monoisocyanate compounds having a carbon-carbon unsaturated bond such as vinyl isocyanate, allyl isocyanate, ethynyl isocyanate and propynyl isocyanate;

hydrocarbon-based diisocyanate compounds such as monomethylene diisocyanate, dimethylene diisocyanate, trimethylene diisocyanate, tetramethylene diisocyanate, pentamethylene diisocyanate, hexamethylene diisocyanate, heptamethylene diisocyanate, octamethylene diisocyanate, nonamethylene diisocyanate, decamethylene diisocyanate, dodecamethylene diisocyanate, 1,3-bis(isocyanatomethyl)cyclohexane, dicyclohexylmethane-4,4'-diisocyanate, bicyclo[2.2.1]heptan-2,5-diylbis(methylisocyanate), bicyclo[2.2.1]heptan-2,6-diylbis(methylisocyanate), isophorone diisocyanate, 2,2,4-trimethylhexamethylene diisocyanate and 2,4,4-trimethylhexamethylene diisocyanate; and, isocyanate compounds such as diisocyanatosulfone, (ortho-, meta- or para-)toluenesulfonyl isocyanate, benzenesulfonyl isocyanate, fluorosulfonyl isocyanate, phenoxysulfonyl isocyanate, pentafluorophenoxysulfonyl isocyanate and methoxysulfonyl isocyanate are preferable from the viewpoint of improving cycle characteristics and storage characteristics.

Allyl isocyanate, hexamethylene diisocyanate, 1,3-bis(isocyanatomethyl)cyclohexane, diisocyanatosulfone and (ortho-, meta- or para-)toluenesulfonyl isocyanate are more preferable, hexamethylene diisocyanate, 1,3-bis(isocyanatomethyl)cyclohexane and (ortho-, meta- or para-)toluenesulfonyl isocyanate are particularly preferable, and hexamethylene diisocyanate and 1,3-bis(isocyanatomethyl)cyclohexane are most preferable.

In addition, isocyanate compounds having a branched chain are preferable as isocyanate compounds.

In addition, the isocyanate compound used in the present invention may also be a trimer compound derived from a compound having at least two isocyanate groups in a molecule thereof, or an aliphatic polyisocyanate obtained by adding a polyvalent alcohol thereto. Examples thereof include biuret, isocyanurate, adduct and bifunctional types of modified polyisocyanates indicated with the basic structures of the following general formulas (1-2-1) to (1-2-4) (in the following general formulas (1-2-1) to (1-2-4), R and R' respectively and independently represent arbitrary hydrocarbon groups).

[Chemical 16]

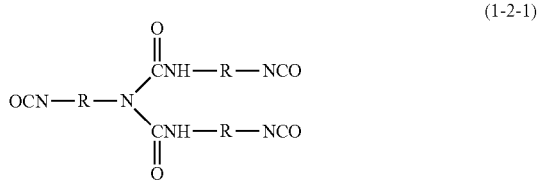

(1-2-1)

[Chemical 17]

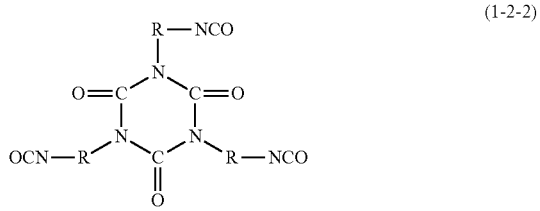

(1-2-2)

[Chemical 18]

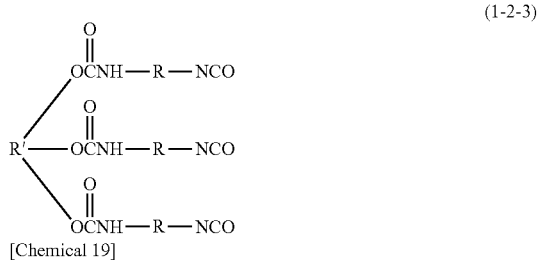

(1-2-3)

[Chemical 19]

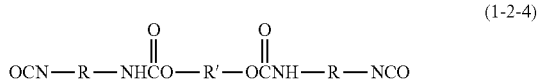

(1-2-4)

Compounds used in the present invention having at least two isocyanate groups in a molecule thereof include so-called block isocyanates in which storage stability has been enhanced as a result of blocking with a blocking agent. Examples of blocking agents include alcohols, phenols, organic amines, oximes and lactams, and more specifically, examples thereof include n-butanol, phenol, tributylamine, diethylethanolamine, methyl ethyl ketoxime and ε-caprolactam.

A metal catalyst such as dibutyltin dilaurate or an amine-based catalyst such as 1,8-diazabicyclo[5.4.0]undec-7-ene is preferably used in combination for the purpose of obtaining higher effects by promoting a reaction based on the compound having at least two isocyanate groups in a molecule thereof.

Moreover, one type of compound having an isocyanate group may be used alone or two or more types may be used in combination in an arbitrary combination and ratio.

Although there are no limitations on the incorporated amount of a compound having an isocyanate group based on the total of the nonaqueous electrolyte solution of the present invention, and may be any incorporated amount provided it does not significantly impair the effects of the present invention, the compound is normally contained in the nonaqueous electrolyte solution of the present invention at a concentration of 0.001% by mass or more, preferably 0.01% by mass or more and more preferably 0.1% by mass or more, and normally 10% by mass or less, preferably 5% by mass or less, more preferably 3% by mass or less, even more preferably 2% by mass or less, particularly preferably 1% by mass or less and most preferably 0.5% by mass or less.

Effects on output characteristics, load characteristics, low-temperature characteristics, cycle characteristics, high-temperature storage characteristics and the like are further improved in the case of satisfying the aforementioned range.

1-1-4. Difluorophosphate

There are no particular limitations on the counter cation of difluorophosphonate, and examples thereof include lithium, sodium, potassium, rubidium, cesium, magnesium, calcium, barium and ammonium represented by $NR_{13}R_{14}R_{15}R_{16}$ (wherein, $R_{13}$ to $R_{16}$ respectively and independently represent hydrogen atom or an organic group having 1 to 12 carbon atoms).

There are no particular limitations on the organic group having 1 to 12 carbon atoms represented by $R_{13}$ to $R_{16}$ of the aforementioned ammonium, and examples thereof include an alkyl group that may be substituted with a halogen atom, a cycloalkyl group that may be substituted with a halogen atom or alkyl group, an aryl group that may be substituted with a halogen atom or alkyl group, and an optionally substituted nitrogen atom-containing heterocyclic group. Among these, $R_{13}$ to $R_{16}$ preferably respectively and independently represent a hydrogen atom, alkyl group, cycloalkyl group or nitrogen atom-containing heterocyclic group.

Specific examples of difluorophosphate include lithium difluorophosphate, sodium difluorophosphate and potassium difluorophosphate, and preferably lithium difluorophosphate.

One type of difluorophosphate may be used alone or two or more types may be used in combination in an arbitrary combination and ratio. In addition, there are no particular limitations on the incorporated amount of difluorophosphate, and may be any incorporated amount provided it does not significantly impair the effects of the present invention.

The incorporated amount of difluorophosphate is such that it is normally contained at a concentration of 0.001% by mass or more, preferably 0.01% by mass or more and more preferably 0.1% by mass or more, and normally 10% by mass or less, preferably 5% by mass or less, more preferably 3% by mass or less, even more preferably 2% by mass or less, and most preferably 1% by mass or less, in 100% by mass of the nonaqueous electrolyte solution.

If within this range, effects that adequately improve the cycle characteristics of the nonaqueous electrolyte battery are easily demonstrated, and situations resulting in a decrease in high-temperature storage characteristics, an increase in the amount of gas generated or a decrease in discharge capacity maintenance rate are easily avoided.

1-1-5. Fluorosulfonate

There are no particular limitations on the counter cation of fluorosulfonate, and examples thereof include lithium, sodium, potassium, rubidium, cesium, magnesium, calcium, barium and ammonium represented by $NR_{13}R_{14}R_{15}R_{16}$ (wherein, $R_{13}$ to $R_{16}$ respectively and independently represent hydrogen atom or an organic group having 1 to 12 carbon atoms).

There are no particular limitations on the organic group having 1 to 12 carbon atoms represented by $R_{13}$ to $R_{16}$ of the aforementioned ammonium, and examples thereof include an alkyl group that may be substituted with a halogen atom, a cycloalkyl group that may be substituted with a halogen atom or alkyl group, an aryl group that may be substituted with a halogen atom or alkyl group, and an optionally substituted nitrogen atom-containing heterocyclic group. Among these, $R_{13}$ to $R_{16}$ preferably respectively and independently represent a hydrogen atom, alkyl group, cycloalkyl group or nitrogen atom-containing heterocyclic group.

Specific examples of fluorosulfonate include lithium fluorosulfonate, sodium fluorosulfonate, potassium fluorosulfonate, rubidium fluorosulfonate and cesium fluorosulfonate, and preferably lithium fluorosulfonate.

One type of fluorosulfonate may be used alone or two or more types may be used in combination in an arbitrary combination and ratio. In addition, there are no particular limitations on the incorporated amount of fluorosulfonate, and may be any incorporated amount provided it does not significantly impair the effects of the present invention.

The incorporated amount of fluorosulfonate is such that it is normally contained at a concentration of 0.001% by mass or more, preferably 0.01% by mass or more and more preferably 0.1% by mass or more, and normally 10% by mass or less, preferably 5% by mass or less, more preferably 3% by mass or less, even more preferably 2% by mass or less, and most preferably 1% by mass or less, in 100% by mass of the nonaqueous electrolyte solution.

If within this range, effects that adequately improve the cycle characteristics of the nonaqueous electrolyte battery are easily demonstrated, and situations resulting in a decrease in high-temperature storage characteristics, an increase in the amount of gas generated or a decrease in discharge capacity maintenance rate are easily avoided.

1-1-6. Lithium Bis(Fluorosulfonyl)imide

The structural formula of lithium bis(fluorosulfonyl)imide is represented by the following formula (C).

[Chemical 20]

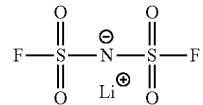

(C)

The incorporated amount of lithium bis(fluorosulfonyl) imide is such that it is normally contained at a concentration of 0.001% by mass or more, preferably 0.01% by mass or more and more preferably 0.1% by mass or more, and normally 10% by mass or less, preferably 5% by mass or less, more preferably 3% by mass or less, even more preferably 2% by mass or less, and most preferably 1% by mass or less, in 100% by mass of the nonaqueous electrolyte solution.

If within this range, effects that adequately improve the cycle characteristics of the nonaqueous electrolyte battery are easily demonstrated, and situations resulting in a decrease in high-temperature storage characteristics, an increase in the amount of gas generated or a decrease in discharge capacity maintenance rate are easily avoided.

1-1-7. Compound Having Structure Represented by General Formula (B)

[Chemical 21]

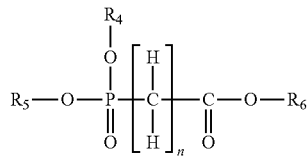

In formula (B), $R_4$, $R_5$ and $R_6$ respectively and independently represent an alkyl group, alkenyl group or alkynyl group having 1 to 12 carbon atoms that may be substituted with a halogen atom, and n represents an integer of 0 to 6.

Examples of the aforementioned compounds represented by general formula (B) include the compounds indicated below.

<Examples of Compounds in which n=0 in the General Formula (B)>

Trimethyl phosphonoformate, methyl diethyl phosphonoformate, methyl dipropyl phosphonoformate, methyl dibutyl phosphonoformate, triethyl phosphonoformate, ethyl dimethyl phosphonoformate, ethyl dipropyl phosphonoformate, ethyl dibutyl phosphonoformate, tripropyl phosphonoformate, propyl dimethyl phosphonoformate, propyl diethyl phosphonoformate, propyl dibutyl phosphonoformate, tributyl phosphonoformate, butyl dimethyl phosphonoformate, butyl diethyl phosphonoformate, butyl dipropyl phosphonoformate, methyl bis(2,2,2-trifluoroethyl) phosphonoformate, ethyl bis(2,2,2-trifluoroethyl)phosphonoformate, propyl bis(2,2,2-trifluoroethyl)phosphonoformate and butyl bis(2,2,2-trifluoroethyl)phosphonoformate.

<Examples of Compounds in which n=1 in the General Formula (B)>

Trimethyl phosphonoacetate, methyl diethyl phosphonoacetate, methyl dipropyl phosphonoacetate, methyl dibutyl phosphonoacetate, triethyl phosphonoacetate, ethyl dimethyl phosphonoacetate, ethyl dipropyl phosphonoacetate, ethyl dibutyl phosphonoacetate, tripropyl phosphonoacetate, propyl dimethyl phosphonoacetate, propyl diethyl phosphonoacetate, propyl dibutyl phosphonoacetate, tributyl phosphonoacetate, butyl dimethyl phosphonoacetate, butyl diethyl phosphonoacetate, butyl dipropyl phosphonoacetate, methyl bis(2,2,2-trifluoroethyl)phosphonoacetate, ethyl bis(2,2,2-trifluoroethyl)phosphonoacetate, propyl bis(2,2,2-trifluoroethyl)phosphonoacetate, butyl bis(2,2,2-trifluoroethyl)phosphonoacetate, allyl dimethyl phosphonoacetate, allyl diethyl phosphonoacetate, 2-propynyl dimethyl phosphonoacetate and 2-propynyl diethyl phosphonoacetate.

<Examples of Compounds in which n=2 in the General Formula (B)>

Trimethyl 3-phosphonopropionate, methyl (3-diethylphosphono)propionate, methyl (3-dipropylphosphono)propionate, methyl (3-dibutylphosphono)propionate, triethyl 3-phosphonopropionate, ethyl 3-(dimethylphosphono)propionate, ethyl 3-(dipropylphosphono)propionate, ethyl 3-(dibutylphosphono)propionate, tripropyl 3-phosphonopropionate, propyl 3-(dimethylphosphono)propionate, propyl 3-(diethylphosphono)propionate, propyl 3-(dibutylphosphono)propionate, tributyl 3-phosphonopropionate, butyl 3-(dimethylphosphono)propionate, butyl 3-(diethylphosphono)propionate, butyl 3-(dipropylphosphono)propionate, methyl 3-(bis(2,2,2-trifluoroethyl)phosphono)propionate, ethyl 3-(bis(2,2,2-trifluoroethyl)phosphono)propionate, propyl 3-(bis(2,2,2-trifluoroethyl)phosphono)propionate and butyl 3-(bis(2,2,2-trifluoroethyl)phosphono)propionate.

<Examples of Compounds in which n=3 in the General Formula (B)>

Trimethyl 4-phosphonobutyrate, methyl 4-(diethylphosphono)butyrate, methyl 4-(dipropylphosphono)butyrate, methyl 4-(dibutylphosphono)butyrate, triethyl 4-phosphonobutyrate, ethyl 4-(dimethylphosphono)butyrate, ethyl 4-(di propyl phosphono)butyrate, ethyl 4-(dibutylphosphono)butyrate, tripropyl 4-phosphonobutyrate, propyl 4-(dimethylphosphono)butyrate, propyl 4-(diethylphosphono)butyrate, propyl 4-(dibutylphosphono)butyrate, tributyl 4-phosphonobutyrate, butyl 4-(dimethylphosphono)butyrate, butyl 4-(diethylphosphono)butyrate and butyl 4-(dipropylphosphono)butyrate.

Among these, compounds in which n=0, 1 or 2 are preferable, compounds in which n=0 or 1 are particularly preferable, and compounds in which n=1 are most preferable from the viewpoint of improving battery properties.

Among compounds in which n=1, compounds in which $R_4$ to $R_6$ are saturated hydrocarbon groups are preferable.

1-1-8. Cyclic Carbonate Having Fluorine Atom

Examples of cyclic carbonate compounds having a fluorine atom include fluorides of cyclic carbonates having an alkylene group having 2 to 6 carbon atoms and derivatives thereof, such as fluorides of ethylene carbonate and derivatives thereof. Examples of derivatives of fluorides of ethylene carbonate include fluorides of ethylene carbonate substituted with an alkyl group (such as an alkyl group having 1 to 4 carbon atoms). Among these, ethylene carbonate having 1 to 8 fluorine atoms, and derivatives thereof, are preferable.

Specific examples thereof include monofluoroethylene carbonate, 4,4-difluoroethylene carbonate, 4,5-difluoroethylene carbonate, 4-fluoro-4-methylethylene carbonate, 4,5-difluoro-4-methylethylene carbonate, 4-fluoro-5-methylethylene carbonate, 4,4-difluoro-5-methylethylene carbonate, 4-(fluoromethyl)ethylene carbonate, 4-(difluoromethyl)ethylene carbonate, 4-(trifluoromethyl)ethylene carbonate, 4-(fluoromethyl)-4-fluoroethylene carbonate, 4-(fluoromethyl)-5-fluoroethylene carbonate, 4-fluoro-4,5-dimethylethylene carbonate, 4,5-difluoro-4,5-dimethylethylene carbonate and 4,4-difluoro-5,5-dimethylethylene carbonate.

Among these, at least one selected from the group consisting of monofluoroethylene carbonate, 4,4-difluoroethylene carbonate and 4,5-difluoroethylene carbonate is preferable from the viewpoints of imparting high ionic conductivity and preferably forming an interface protective coating.

One type of cyclic carbonate compound having a fluorine atom may be used alone or two or more types may be used in combination in an arbitrary combination and ratio.

One type of cyclic carbonate compound having a fluorine atom may be used alone or two or more types may be used in combination in an arbitrary combination and ratio. Although there are no limitations on the incorporated amount of the halogenated cyclic carbonate with respect to the total of the nonaqueous electrolyte solution of the present invention, and may be any incorporated amount provided it does not significantly impair the effects of the present invention, it is normally contained in the nonaqueous electrolyte solution of the present invention at a concentration of 0.01% by mass or more, preferably 0.05% by mass or more and more preferably 0.1% by mass or more, and normally 50% by mass or less, preferably 30% by mass or less, more preferably 20% by mass or less, particularly preferably 10% by mass or less and most preferably 5% by mass or less.

1-2. Electrolyte

<Lithium Salt>

A lithium salt is normally used as the electrolyte. There are no particular limitations on the lithium salt provided it is that which is known to be used in this application, an arbitrary lithium salt can be used, and specific examples thereof are indicated below.

Examples include inorganic lithium salts such as $LiPF_6$, $LiBF_4$, $LiClO_4$, $LiAlF_4$, $LiSbF_6$, $LiTaF_6$ and $LiWF_7$;

lithium tungstates such as $LiWOF_5$;

lithium carboxylates such as $HCO_2Li$, $CH_3CO_2Li$, $CH_2FCO_2Li$, $CHF_2CO_2Li$, $CF_3CO_2Li$, $CF_3CH_2CO_2Li$, $CF_3CF_2CO_2Li$, $CF_3CF_2CF_2CO_2Li$ and $CF_3CF_2CF_2CF_2CO_2Li$;

lithium sulfonates such as $FSO_3Li$, $CH_3SO_3Li$, $CH_2FSO_3Li$, $CHF_2SO_3Li$, $CF_3SO_3Li$, $CF_3CF_2SO_3Li$, $CF_3CF_2CF_2SO_3Li$ and $CF_3CF_2CF_2CF_2SO_3Li$;

lithium imides such as $LiN(FCO)_2$, $LiN(FCO)(FSO_2)$, $LiN(FSO_2)_2$, $LiN(FSO_2)(CF_3SO_2)$, $LiN(CF_3SO_2)_2$, $LiN(C_2F_5SO_2)_2$, lithium cyclic 1,2-perfluoroethane disulfonyl imide, lithium cyclic 1,3-perfluoropropane disulfonyl imide and $LiN(CF_3SO_2)(C_4F_9SO_2)$;

lithium methides such as $LiC(FSO_2)_3$, $LiC(CF_3SO_2)_3$ or $LiC(C_2F_5SO_2)_3$;

lithium oxalatoborates such as lithium difluoro oxalatoborate and lithium bis(oxalato)borate;

lithium oxalatophosphates such as lithium tetrafluoro oxalatophosphate, lithium difluorobis(oxalato)phosphate and lithium tris(oxalato)phosphate; and other examples such as, fluorine-containing organic lithium salts such as $LiPF_4(CF_3)_2$, $LiPF_4(C_2F_5)_2$, $LiPF_4(CF_3SO_2)_2$, $LiPF_4(C_2F_5SO_2)_2$, $LiBF_3CF_3$, $LiBF_3C_2F_5$, $LiBF_3C_3F_7$, $LiBF_2(CF_3)_2$, $LiBF_2(C_2F_5)_2$, $LiBF_2(CF_3SO_2)_2$ and $LiBF_2(C_2F_5SO_2)_2$.

Among these, $LiPF_6$, $LiBF_4$, $LiSbF_6$, $LiTaF_6$, $FSO_3Li$, $CF_3SO_3Li$, $LiN(FSO_2)_2$, $LiN(FSO_2)(CF_3SO_2)$, $LiN(CF_3SO_2)_2$, $LiN(C_2F_5SO_2)_2$, lithium cyclic 1,2-perfluoroethane disulfonyl imide, lithium cyclic 1,3-perfluoropropane disulfonyl imide, $LiC(FSO_2)_3$, $LiC(CF_3SO_2)_3$, $LiC(C_2F_5SO_2)_3$, lithium bis(oxalato)borate, lithium difluoro oxalatoborate, lithium tetrafluoro oxalatophosphate, lithium difluorobis(oxalato)phosphate, $LiBF_3CF_3$, $LiBF_3C_2F_5$, $LiPF_3(CF_3)_3$, $LiPF_3(C_2F_5)_3$ and the like are particularly preferable from the viewpoints of having the effect of improving output characteristics, high-rate charge-discharge characteristics, high-temperature storage characteristics, cycle characteristics and the like.

One type of these lithium salts may be used alone or two or more types may be used in combination. Preferable examples of the case of combining the use of two or more types include the combined use of $LiPF_6$ and $LiBF_4$, $LiPF_6$ and $LiN(FSO_2)_2$, $LiPF_6$ and $FSO_3Li$ and the like, and are effective for improving load characteristics and cycle characteristics.

In this case, although there are no particular limitations on the concentration and the incorporated amount of $LiBF_4$ or $FSO_3Li$ with respect to a total of 100% by mass of the nonaqueous electrolyte solution, and may be any concentration and incorporated amount provided it does not significantly impair the effects of the present invention, they are normally 0.01% by mass or more and preferably 0.1% by mass or more, and normally 30% by mass or less and preferably 20% by mass or less with respect to the nonaqueous electrolyte solution of the present invention.

In addition, another example is the combined use of an inorganic lithium salt and organic lithium salt, and the combined use thereof is effective for inhibiting deterioration caused by high-temperature storage. Preferable examples of organic lithium salts include $CF_3SO_3Li$, $LiN(FSO_2)_2$, $LiN(FSO_2)(CF_3SO_2)$, $LiN(CF_3SO_2)_2$, $LiN(C_2F_5SO_2)_2$, lithium cyclic 1,2-perfluoroethane disulfonyl imide, lithium cyclic 1,3-perfluoropropane disulfonyl imide, $LiC(FSO_2)_3$, $LiC(CF_3SO_2)_3$, $LiC(C_2F_5SO_2)_3$, lithium bis(oxalato)borate, lithium difluoro oxalatoborate, lithium tetrafluoro oxalatophosphate, lithium difluorobis(oxalato)phosphate, $LiBF_3CF_3$, $LiBF_3C_2F_5$, $LiPF_3(CF_3)_3$ and $LiPF_3(C_2F_5)_3$. In this case, the ratio of organic lithium salt to a total of 100% by mass of nonaqueous electrolyte solution is preferably 0.1% by mass or more, particularly preferably 0.5% by mass or more, preferably 30% by mass or less and particularly preferably 20% by mass or less.

Although there are no particular limitations on the concentration of these lithium salts in the nonaqueous electrolyte solution provided it does not impair the effects of the present invention, from the viewpoints of making the electrical conductivity of the electrolyte solution to be within a favorable range and ensuring favorable battery performance, the total molar concentration of lithium in the nonaqueous electrolyte solution is preferably 0.3 mol/L or more, more preferably 0.4 mol/L or more, even more preferably 0.5 mol/L or more, preferably 3 mol/L or less, more preferably 2.5 mol/L or less, and even more preferably 2.0 mol/L or less. As a result of making the total molar concentration of lithium to be within the aforementioned range, electrical conductivity of the electrolyte solution is adequate and decreases in electrical conductivity caused by increases in viscosity, as well as decreases in battery performance attributable thereto, are prevented.

1-3. Nonaqueous Solvent

There are no particular limitations on the nonaqueous solvent in the present invention, and a known organic solvent can be used. Examples thereof include cyclic carbonates not having a fluorine atom, linear carbonates, cyclic and linear carboxylate esters, ether compounds and sulfone-based compounds.

<Cyclic Carbonates not Having a Fluorine Atom>

Examples of cyclic carbonates not having a fluorine atom include cyclic carbonates having an alkylene group having 2 to 4 carbon atoms.

Specific examples of cyclic carbonates not having a fluorine atom and having an alkylene group having 2 to 4 carbon atoms include ethylene carbonate, propylene carbonate and butylene carbonate. Among these, ethylene carbonate and propylene carbonate are particularly preferable from the viewpoint of improvement of battery properties resulting from improving the degree of dissociation of lithium ions.

One type of cyclic carbonate not having a fluorine atom may be used alone or two or more types may be used in combination in an arbitrary combination and ratio.

Although there are no particular limitations on the incorporated amount of cyclic carbonate not having a fluorine atom, and may be any incorporated amount provided it does not significantly impair the effects of the present invention, in the case of using one type alone, the incorporated amount in 100% by volume of the nonaqueous solvent is 5% by volume or more, and more preferably 10% by volume or more. As a result of being within this range, decreases in electrical conductivity resulting from a decrease in dielectric constant of the nonaqueous electrolyte solution are avoided, and large-current discharge characteristics of the nonaqueous electrolyte battery, stability with respect to the negative electrode, and cycle characteristics are easily made to be within favorable ranges. In addition, the incorporated amount is 95% by volume or less, more preferably 90% by volume or less and even more preferably 85% by volume or less. As a result of being within this range, viscosity of the nonaqueous electrolyte solution can be made to be within a suitable range, decreases in ionic conductivity are inhibited, and in turn, load characteristics of the nonaqueous electrolyte battery are easily made to be within a favorable range.

<Linear Carbonate>

The linear carbonate is preferably a linear carbonate having 3 to 7 carbon atoms, and more preferably a dialkyl carbonate having 3 to 7 carbon atoms. Specific examples of linear carbonates include dimethyl carbonate, diethyl carbonate, di-n-propyl carbonate, diisopropyl carbonate, n-propyl isopropyl carbonate, ethyl methyl carbonate, methyl n-propyl carbonate, n-butyl methyl carbonate, isobutyl methyl carbonate, t-butyl methyl carbonate, ethyl n-propyl carbonate, n-butyl ethyl carbonate, isobutyl ethyl carbonate and t-butyl ethyl carbonate.

Among these, dimethyl carbonate, diethyl carbonate, di-n-propyl carbonate, diisopropyl carbonate, n-propyl isopropyl carbonate, ethyl methyl carbonate and methyl n-propyl carbonate are preferable, while dimethyl carbonate, diethyl carbonate and ethyl methyl carbonate are particularly preferable.

In addition, linear carbonates having a fluorine atom (to also be referred to as "fluorinated linear carbonates" below) can also be used preferably.

Although there are no particular limitations on the number of fluorine atoms possessed by a fluorinated linear carbonate provided that number is 1 or more, it is normally 6 or less and preferably 4 or less. In the case a fluorinated linear carbonate has a plurality of fluorine atoms, they may be mutually bound to the same carbon atom or may be bound to different carbon atoms.

Examples of fluorinated linear carbonates include fluorinated dimethyl carbonates and derivatives thereof, fluorinated ethyl methyl carbonates and derivatives thereof, and fluorinated diethyl carbonates and derivatives thereof.

Examples of fluorinated dimethyl carbonates and derivatives thereof include fluoromethyl methyl carbonate, difluoromethyl methyl carbonate, trifluoromethyl methyl carbonate, bis(fluoromethyl) carbonate, bis(difluoro)methyl carbonate and bis(trifluoromethyl) carbonate.

Examples of fluorinated ethyl methyl carbonates and derivatives thereof include 2-fluoroethyl methyl carbonate, ethyl fluoromethyl carbonate, 2,2-difluoroethyl methyl carbonate, 2-fluoroethyl fluoromethyl carbonate, ethyl difluoromethyl carbonate, 2,2,2-trifluoroethyl methyl carbonate, 2,2-difluoroethyl fluoromethyl carbonate, 2-fluoroethyl difluoromethyl carbonate and ethyl trifluoromethyl carbonate.

Examples of fluorinated diethyl carbonates and derivatives thereof include ethyl-(2-fluoroethyl) carbonate, ethyl-(2,2-difluoroethyl) carbonate, bis(2-fluoroethyl) carbonate, ethyl-(2,2,2-trifluoroethyl) carbonate, 2,2-difluoroethyl-2'-fluoroethyl carbonate, bis(2,2-difluoroethyl) carbonate, 2,2,2-trifluoroethyl-2'-fluoroethyl carbonate, 2,2,2-trifluoroethyl-2',2'-difluoroethyl carbonate and bis(2,2,2-trifluoroethyl) carbonate.

One type of linear carbonate may be used alone or two or more types may be used in combination in an arbitrary combination and ratio.

The incorporated amount of linear carbonate in 100% by volume of organic solvent is preferably 5% by volume or more, more preferably 10% by volume or more and even more preferably 15% by volume or more. As a result of setting a lower limit in this manner, the viscosity of the nonaqueous electrolyte solution is made to be within a suitable range, decreases in ionic conductivity are inhibited, and large-current discharge characteristics of the nonaqueous electrolyte battery are easily made to be within a favorable range. In addition, the incorporated amount of linear carbonate in 100% by volume of organic solvent is preferably 90% by volume or less, more preferably 85% by volume or less and particularly preferably 80% by volume or less. As a result of setting an upper limit in this manner, decreases in electrical conductivity attributable to decreases in dielectric constant of the nonaqueous electrolyte solution are avoided, and large-current discharge characteristics of the nonaqueous electrolyte battery are easily made to be within a favorable range.

<Cyclic Carboxylate Ester>

The number of carbon atoms of the cyclic carboxylate ester is preferably 3 to 12.

Specific examples thereof include gamma-butyrolactone, gamma-valerolactone, gamma-caprolactone and epsilon-caprolactone. Among these, gamma-butyrolactone is particularly preferable from the viewpoint of improving battery properties as a result of improving the degree of dissociation of lithium ions.

One type of cyclic carboxylate ester may be used alone or two or more types may be used in combination in an arbitrary combination and ratio.

Normally, the incorporated amount of cyclic carboxylate ester in 100% by volume of nonaqueous solvent is preferably 5% by volume or more and more preferably 10% by volume or more. If within this range, electrical conductivity of the nonaqueous electrolyte solution is improved and large-current discharge characteristics of the nonaqueous electrolyte battery are easily improved. In addition, the incorporated amount of cyclic carboxylate ester is preferably 50% by volume or less and more preferably 40% by volume or less. As a result of setting an upper limit in this manner, viscosity of the nonaqueous electrolyte solution is made to be within a suitable range, decreases in electrical conductivity are avoided, increases in negative electrode resistance are inhibited, and large-current discharge characteristics of the nonaqueous electrolyte secondary battery are easily made to be within a favorable range.

<Ether-Based Compound>

The ether-based compound is preferably a linear ether having 3 to 10 carbon atoms and a cyclic ether having 3 to 6 carbon atoms, in which a portion of the hydrogen atoms have been substituted with fluorine atoms.

Examples of linear ethers having 3 to 10 carbon atoms include diethyl ether, di(2-fluoroethyl) ether, di(2,2-difluoroethyl) ether, di(2,2,2-trifluoroethyl) ether, ethyl (2-fluoroethyl) ether, ethyl (2,2,2-trifluoroethyl) ether, ethyl (1,1,2,2-tetrafluoroethyl) ether, (2-fluoroethyl) (2,2,2-trifluoroethyl) ether, (2-fluoroethyl) (1,1,2,2-tetrafluoroethyl) ether, (2,2,2-trifluoroethyl) (1,1,2,2-tetrafluoroethyl) ether, ethyl n-propyl ether, ethyl (3-fluoro-n-propyl) ether, ethyl (3,3,3-trifluoro-n-propyl) ether, ethyl (2,2,3,3-tetrafluoro-n-propyl) ether, ethyl (2,2,3,3,3-pentafluoro-n-propyl) ether, 2-fluoroethyl n-propyl ether, (2-fluoroethyl) (3-fluoro-n-propyl) ether, (2-fluoroethyl) (3,3,3-trifluoro-n-propyl) ether, (2-fluoroethyl) (2,2,3,3-tetrafluoro-n-propyl) ether, (2-fluoroethyl) (2,2,3,3,3-pentafluoro-n-propyl) ether, 2,2,2-trifluoroethyl n-propyl ether, (2,2,2-trifluoroethyl) (3-fluoro-n-propyl) ether, (2,2,2-trifluoroethyl) (3,3,3-trifluoro-n-propyl) ether, (2,2,2-trifluoroethyl) (2,2,3,3-tetrafluoro-n-propyl) ether, (2,2,2-trifluoroethyl) (2,2,3,3,3-pentafluoro-n-propyl) ether, 1,1,2,2-tetrafluoroethyl n-propyl ether, (1,1,2,2-tetrafluoroethyl) (3-fluoro-n-propyl) ether, (1,1,2,2-tetrafluoroethyl) (3,3,3-trifluoro-n-propyl) ether, (1,1,2,2-tetrafluoroethyl) (2,2,3,3-tetrafluoro-n-propyl) ether, (1,1,2,2-tetrafluoroethyl) (2,2,3,3,3-pentafluoro-n-propyl) ether, di-n-propyl ether, (n-propyl) (3-fluoro-n-propyl) ether, (n-propyl) (3,3,3-trifluoro-n-propyl) ether, (n-propyl) (2,2,3,3-tetrafluoro-n-propyl) ether, (n-propyl) (2,2,3,3,3-pentafluoro-n-propyl) ether, di(3-fluoro-n-propyl) ether, (3-fluoro-n-propyl) (3,3,3-trifluoro-n-propyl) ether, (3-fluoro-n-propyl) (2,2,3,3-tetrafluoro-n-propyl) ether, (3-fluoro-n-propyl) (2,2,3,3,3-pentafluoro-n-propyl) ether, di(3,3,3-trifluoro-n-propyl) ether, (3,3,3-trifluoro-n-propyl) (2,2,3,3-tetrafluoro-n-propyl) ether, (3,3,3-trifluoro-n-propyl) (2,2,3,3,3-pentafluoro-n-propyl) ether, di(2,2,3,3-tetrafluoro-n-propyl) ether, (2,2,3,3-tetrafluoro-n-propyl) (2,2,3,3,3-pentafluoro-n-propyl) ether, di(2,2,3,3,3-pentafluoro-n-propyl) ether, di-n-butyl ether, dimethoxymethane, methoxyethoxy methane, methoxy(2-fluoroethoxy) methane, methoxy(2,2,2-trifluoroethoxy) methane, methoxy(1,1,2,2-tetrafluoroethoxy) methane, diethoxymethane, ethoxy(2-fluoroethoxy) methane, ethoxy(2,2,2-trifluoroethoxy) methane, ethoxy(1,1,2,2-tetrafluoroethoxy) methane, di(2-fluoroethoxy)methane, (2-fluoroethoxy) (2,2,2-trifluoroethoxy) methane, (2-fluoroethoxy) (1,1,2,2-tetrafluoroethoxy) methane, di(2,2,2-trifluoroethoxy) methane, (2,2,2-trifluoroethoxy) (1,1,2,2-tetrafluoroethoxy) methane, di(1,1,2,2-tetrafluoroethoxy) methane, dimethoxyethane, methoxyethoxy ethane, methoxy(2-fluoroethoxy) ethane, methoxy(2,2,2-trifluoroethoxy) ethane, methoxy(1,1,2,2-tetrafluoroethoxy) ethane, diethoxyethane, ethoxy(2-fluoroethoxy) ethane, ethoxy(2,2,2-trifluoroethoxy) ethane, ethoxy (1,1,2,2-tetrafluoroethoxy) ethane, di(2-fluoroethoxy) ethane, (2-fluoroethoxy) (2,2,2-trifluoroethoxy) ethane, (2-fluoroethoxy) (1,1,2,2-tetrafluoroethoxy) ethane, di(2,2,2-trifluoroethoxy) ethane, (2,2,2-trifluoroethoxy) (1,1,2,2-tetrafluoroethoxy) ethane, di(1,1,2,2-tetrafluoroethoxy) ethane, ethylene glycol di-n-propyl ether, ethylene glycol di-n-butyl ether and diethylene glycol dimethyl ether.

Examples of cyclic ethers having 3 to 6 carbon atoms include tetrahydrofuran, 2-methyltetrahydrofuran, 3-methyltetrahydrofuran, 1,3-dioxane, 2-methyl-1,3-dioxane, 4-methyl-1,3-dioxane, 1,4-dioxane and fluorinated compounds thereof.

Among these, dimethoxymethane, diethoxymethane, ethoxymethoxymethane, ethylene glycol di-n-propyl ether, ethylene glycol di-n-butyl ether and diethylene glycol dimethyl ether are preferable from the viewpoint of improving ion dissociation as a result of having a high solvation capacity for lithium ions, while dimethoxymethane, diethoxymethane and ethoxymethoxy methane are particularly preferable since they have low viscosity and impart high ionic conductivity.

One type of ether-based compound may be used alone or two or more types may be used in combination in an arbitrary combination and ratio.

The incorporated amount of ether-based compound in 100% by volume of nonaqueous solvent is preferably 5% by volume or more, more preferably 10% by volume or more and even more preferably 15% by volume or more, and preferably 70% by volume or less, more preferably 60% by volume or less and even more preferably 50% by volume or less.

If within this range, it becomes easy to secure effects of the linear ether that improves the degree of dissociation of lithium ions and improve ion conductivity resulting from a decrease in viscosity, and in the case the negative electrode active material is a carbonaceous material, situations resulting in a decrease in capacity due to the linear ether being inserted together with lithium ions are easily avoided.

<Sulfone-Based Compound>

The sulfone-based compound is preferably a cyclic sulfone having 3 to 6 carbon atoms or a linear sulfone having 2 to 6 carbon atoms. The number of sulfonyl groups in a single molecule is preferably 1 or 2.

Examples of cyclic sulfones having 3 to 6 carbon atoms include monosulfone compounds in the form of trimethylene sulfones, tetramethylene sulfones and hexamethylene sulfones; and, disulfone compounds in the form of trimethylene disulfones, tetramethylene disulfones and hexamethylene disulfones.

Among these, tetramethylene sulfones, tetramethylene disulfones, hexamethylene sulfones and hexamethylene disulfones are preferable, while tetramethylene sulfones (sulfolanes) are particularly preferable, from the viewpoint of dielectric constant and viscosity.

Sulfolanes are preferably sulfolanes and/or sulfolane derivatives (which may also be subsequently referred to as "sulfolanes", including sulfolane). Sulfolane derivatives are preferably those in which one or more hydrogen atoms bound to carbon atoms that compose the sulfolane ring are substituted with fluorine atoms or alkyl groups.

Among these, 2-methylsulfolane, 3-methylsulfolane, 2-fluorosulfolane, 3-fluorosulfolane, 2,2-difluorosulfolane, 2,3-difluorosulfolane, 2,4-difluorosulfolane, 2,5-difluorosulfolane, 3,4-difluorosulfolane, 2-fluoro-3-methylsulfolane, 2-fluoro-2-methylsulfolane, 3-fluoro-3-methylsulfolane, 3-fluoro-2-methylsulfolane, 4-fluoro-3-methylsulfolane, 4-fluoro-2-methylsulfolane, 5-fluoro-3-methylsulfolane, 5-fluoro-2-methylsulfolane, 2-fluoromethylsulfolane, 3-fluoromethylsulfolane, 2-difluoromethylsulfolane, 3-difluoromethylsulfolane, 2-trifluoromethylsulfolane, 3-trifluoromethylsulfolane, 2-fluoro-3-(trifluoromethyl)sulfolane, 3-fluoro-3-(trifluoromethyl)sulfolane, 4-fluoro-3-(trifluoromethyl)sulfolane and 5-fluoro-3-(trifluoromethyl)sulfolane are preferable from the viewpoint of input/output characteristics due to their high ion conductivity.

In addition, examples of linear sulfones having 2 to 6 carbon atoms include dimethyl sulfone, ethyl methyl sulfone, diethyl sulfone, n-propyl methyl sulfone, n-propyl ethyl sulfone, di-n-propyl sulfone, isopropyl methyl sulfone, isopropyl ethyl sulfone, diisopropyl sulfone, n-butyl methyl sulfone, n-butyl ethyl sulfone, t-butyl methyl sulfone, t-butyl ethyl sulfone, monofluoromethyl methyl sulfone, difluoromethyl methyl sulfone, trifluoromethyl methyl sulfone, monofluoroethyl methyl sulfone, difluoroethyl methyl sulfone, trifluoroethyl methyl sulfone, pentafluoroethyl methyl sulfone, ethyl monofluoromethyl sulfone, ethyl difluoromethyl sulfone, ethyl trifluoromethyl sulfone, perfluoroethyl methyl sulfone, ethyl trifluoroethyl sulfone, ethyl pentafluoroethyl sulfone, di(trifluoroethyl) sulfone, perfluorodiethyl sulfone, fluoromethyl n-propyl sulfone, difluoromethyl n-propyl sulfone, trifluoromethyl n-propyl sulfone, fluoromethyl isopropyl sulfone, difluoromethyl isopropyl sulfone, trifluoromethyl isopropyl sulfone, trifluoroethyl n-propyl sulfone, trifluoroethyl isopropyl sulfone, pentafluoroethyl n-propyl sulfone, pentafluoroethyl isopropyl sulfone, trifluoroethyl n-butyl sulfone, trifluoroethyl t-butyl sulfone, pentafluoroethyl n-butyl sulfone and pentafluoroethyl t-butyl sulfone.

Among these, dimethyl sulfone, ethyl methyl sulfone, diethyl sulfone, n-propyl methyl sulfone, isopropyl methyl sulfone, n-butyl methyl sulfone, t-butyl methyl sulfone, monofluoromethyl methyl sulfone, difluoromethyl methyl sulfone, trifluoromethyl methyl sulfone, monofluoroethyl methyl sulfone, difluoroethyl methyl sulfone, trifluoroethyl methyl sulfone, pentafluoroethyl methyl sulfone, ethyl monofluoromethyl sulfone, ethyl difluoromethyl sulfone, ethyl trifluoromethyl sulfone, ethyl trifluoroethyl sulfone, ethyl pentafluoroethyl sulfone, trifluoromethyl n-propyl sulfone, trifluoromethyl isopropyl sulfone, trifluoroethyl n-butyl sulfone, trifluoroethyl t-butyl sulfone, trifluoromethyl n-butyl sulfone and trifluoromethyl t-butyl sulfone are preferable from the viewpoint of high input/output characteristics due to their high ion conductivity.

One type of sulfone-based compound may be used alone or two or more types may be used in combination in an arbitrary combination and ratio.

Normally, the incorporated amount of sulfone-based compound in 100% by volume of nonaqueous solvent is preferably 0.3% by volume or more, more preferably 1% by volume or more and even more preferably 5% by volume or more, and preferably 40% by volume or less, more preferably 35% by volume or less and even more preferably 30% by volume or less.

If within this range, effects of improving durability such as cycle characteristics and storage characteristics are easily obtained, viscosity of the nonaqueous electrolyte solution can be made to be within a suitable range, decreases in electrical conductivity can be avoided, and situations such as a decrease in charge-discharge capacity maintenance rate are easily avoided in the case of carrying out charging and discharging of the nonaqueous electrolyte battery at a high current density.

<Use of Cyclic Carbonate Having Fluorine Atom as Nonaqueous Solvent>

In the present invention, in the case of using a cyclic carbonate having a fluorine atom as a nonaqueous solvent, one type of the previously exemplified nonaqueous solvent may be used in combination with the cyclic carbonate having a fluorine atom or two or more types may be used in combination with the cyclic carbonates having a fluorine atom as a nonaqueous solvent other than the cyclic carbonate having a fluorine atom.

For example, one example of a preferable combination of nonaqueous solvents is the combination mainly consisting of a cyclic carbonate having a fluorine atom and linear carbonate. In particular, the total amount of cyclic carbonate having a fluorine atom and linear carbonate in the nonaqueous solvent is preferably 60% by volume or more, more preferably 80% by volume or more and even more preferably 90% by volume or more, and the ratio of the cyclic carbonate having a fluorine atom to the total amount of cyclic carbonate having a fluorine atom and linear carbonate is 3% by volume or more, preferably 5% by volume or more, more preferably 10% by volume or more and even more preferably 15% by volume or more, and normally 60% by volume or less, preferably 50% by volume or less, more preferably 40% by volume or less, even more preferably 35% by volume or less, particularly preferably 30% by volume or less, and most preferably 20% by volume or less.

The combined use of these nonaqueous solvents may result in a favorable balance between the cycle characteristics and high-temperature storage characteristics (and particularly residual capacity after high-temperature storage and high-load discharge capacity) of a battery fabricated using these nonaqueous solvents.

Specific examples of preferable combinations of cyclic carbonates having a fluorine atom and linear carbonates include monofluoroethylene carbonate and dimethyl carbonate, monofluoroethylene carbonate and diethyl carbonate, monofluoroethylene carbonate and ethyl methyl carbonate, monofluoroethylene carbonate, dimethyl carbonate and diethyl carbonate, monofluoroethylene carbonate, dimethyl carbonate and ethyl methyl carbonate, monofluoroethylene carbonate, diethyl carbonate and ethyl methyl carbonate, and monofluoroethylene carbonate, dimethyl carbonate, diethyl carbonate and ethyl methyl carbonate.

Among combinations of cyclic carbonates having a fluorine atom and linear carbonates, those containing a symmetrical linear alkyl carbonate for the linear carbonate are more preferable, and those containing monofluoroethylene carbonate, a symmetrical linear carbonate and an asymmetrical linear carbonate, e.g., monofluoroethylene carbonate, dimethyl carbonate and ethyl methyl carbonate, monofluoroethylene carbonate, diethyl carbonate and ethyl methyl carbonate and monofluoroethylene carbonate, dimethyl carbonate, diethyl carbonate and ethyl methyl carbonate are particularly preferable since they result in a favorable balance between cycle characteristics and large-current discharge characteristics. Among these, the symmetrical linear carbonate is preferably dimethyl carbonate and the alkyl group of the linear carbonate preferably has 1 to 2 carbon atoms.

Combinations obtained by further adding a cyclic carbonate not having a fluorine atom to these combinations of cyclic carbonates having a fluorine atom and linear carbonates are also examples of preferable combinations. Among these, the total amount of cyclic carbonate having a fluorine atom and cyclic carbonate not having a fluorine atom in the nonaqueous solvent is preferably 10% by volume or more, more preferably 15% by volume or more and even more preferably 20% by volume or more, and the ratio of the cyclic carbonate having a fluorine atom to the total amount of the cyclic carbonate having a fluorine atom and cyclic carbonate not having a fluorine atom is 1% by volume or more, preferably 3% by volume or more, more preferably 5% by volume or more, even more preferably 10% by volume or more and particularly preferably 20% by volume or more, and preferably 95% by volume or less, more preferably 85% by volume or less, even more preferably 75% by volume or less and particularly preferably 60% by volume or less.

If a cyclic carbonate not having a fluorine atom is contained within these concentration ranges, the electrolyte solution is able to maintain electrical conductivity while forming a stable protective coating on the negative electrode.

Specific examples of preferable combinations of a cyclic carbonate having a fluorine atom, a cyclic carbonate not having a fluorine atom and a linear carbonate include monofluoroethylene carbonate, ethylene carbonate and dimethyl carbonate, monofluoroethylene carbonate, ethylene carbonate and diethyl carbonate, monofluoroethylene carbonate, ethylene carbonate and ethyl methyl carbonate, monofluoroethylene carbonate, ethylene carbonate, dimethyl carbonate and diethyl carbonate, monofluoroethylene carbonate, ethylene carbonate, dimethyl carbonate and ethyl methyl carbonate, monofluoroethylene carbonate, ethylene carbonate, diethyl carbonate and ethyl methyl carbonate, monofluoroethylene carbonate, ethylene carbonate, dimethyl carbonate, diethyl carbonate and ethyl methyl carbonate, monofluoroethylene carbonate, propylene carbonate and dimethyl carbonate, monofluoroethylene carbonate, propylene carbonate and diethyl carbonate, monofluoroethylene carbonate, propylene carbonate and ethyl methyl carbonate, monofluoroethylene carbonate, propylene carbonate, dimethyl carbonate and diethyl carbonate, monofluoroethylene carbonate, propylene carbonate, dimethyl carbonate and ethyl methyl carbonate, monofluoroethylene carbonate, propylene carbonate, diethyl carbonate and ethyl methyl carbonate, monofluoroethylene carbonate, propylene carbonate, dimethyl carbonate, diethyl carbonate and ethyl methyl carbonate, monofluoroethylene carbonate, ethylene carbonate, propylene carbonate and dimethyl carbonate, monofluoroethylene carbonate, ethylene carbonate, propylene carbonate and diethyl carbonate, monofluoroethylene carbonate, ethylene carbonate, propylene carbonate and ethyl methyl carbonate, monofluoroethylene carbonate, ethylene carbonate, propylene carbonate, dimethyl carbonate and diethyl carbonate, monofluoroethylene carbonate, ethylene carbonate, propylene carbonate, dimethyl carbonate and ethyl methyl carbonate, monofluoroethylene carbonate, ethylene carbonate, propylene carbonate, diethyl carbonate and ethyl methyl carbonate, and monofluoroethylene carbonate, ethylene carbonate, propylene carbonate, dimethyl carbonate, diethyl carbonate and ethyl methyl carbonate.

Among combinations of cyclic carbonates having a fluorine atom, cyclic carbonates not having a fluorine atom and linear carbonates, those containing an asymmetrical linear alkyl carbonate for the linear carbonate are more preferable, and those containing monofluoroethylene carbonate and an asymmetrical linear carbonate, e.g., monofluoroethylene carbonate, ethylene carbonate and ethyl methyl carbonate, monofluoroethylene carbonate, propylene carbonate and ethyl methyl carbonate, monofluoroethylene carbonate, ethylene carbonate, dimethyl carbonate and ethyl methyl carbonate, monofluoroethylene carbonate, propylene carbonate, dimethyl carbonate and ethyl methyl carbonate, monofluoroethylene carbonate, ethylene carbonate, propylene carbonate, dimethyl carbonate and ethyl methyl carbonate, monofluoroethylene carbonate, ethylene carbonate, diethyl carbonate and ethyl methyl carbonate, monofluoroethylene carbonate, propylene carbonate, diethyl carbonate and ethyl methyl carbonate, monofluoroethylene carbonate, ethylene carbonate, propylene carbonate, diethyl carbonate and ethyl methyl carbonate, monofluoroethylene carbonate, ethylene carbonate, dimethyl carbonate, diethyl carbonate and ethyl methyl carbonate, monofluoroethylene carbonate, propylene carbonate, dimethyl carbonate, diethyl carbonate and ethyl methyl carbonate, and monofluoroethylene carbonate, ethylene carbonate, propylene carbonate, dimethyl carbonate, diethyl carbonate and ethyl methyl carbonate are particularly preferable since they result in a favorable balance between cycle characteristics and large-current discharge characteristics. Among these, the asymmetrical linear carbonate is preferably ethyl methyl carbonate, and the alkyl group of the linear carbonate preferably has 1 to 2 carbon atoms.

In the case of containing ethyl methyl carbonate in the nonaqueous solvent, if the ethyl methyl carbonate is contained in the nonaqueous solvent within a range such that the ratio of ethyl methyl carbonate to the total nonaqueous solvent is preferably 10% by volume or more, more preferably 20% by volume or more, even more preferably 25% by volume or more and particularly preferably 30% by volume or more, and preferably 95% by volume or less, more preferably 90% by volume or less, even more preferably 85% by volume or less and particularly preferably 80% by volume or less, load characteristics of the battery may be improved.

In the aforementioned combinations consisting mainly of a cyclic carbonate having a fluorine atom and a linear carbonate, other solvents may be mixed therein other than the aforementioned cyclic carbonates not having a fluorine atom, examples of which include cyclic carboxylate esters, linear carboxylate esters, cyclic ethers, linear ethers, sulfur-containing organic solvents, phosphorous-containing organic solvents and fluorine-containing aromatic solvents.

<Use of Cyclic Carbonate Having Fluorine Atom as Assistant>

In the present invention, in the case of using a cyclic carbonate having a fluorine atom as an assistant, one type of the previously exemplified nonaqueous solvents may be used alone or two or more types may be used in combination in an arbitrary combination and ratio as a nonaqueous solvent other than the cyclic carbonate having a fluorine atom.

Examples of a preferable combination of nonaqueous solvents include combinations consisting mainly of a cyclic carbonate not having a fluorine atom and a linear carbonate.

Among these, the total amount of cyclic carbonate not having a fluorine atom and linear carbonate in the nonaqueous solvent is preferably 70% by volume or more, more preferably 80% by volume or more and even more preferably 90% by volume or more, and the ratio of the cyclic carbonate not having a fluorine atom to the total amount of cyclic carbonate and linear carbonate is preferably 5% by volume or more, more preferably 10% by volume or more and even more preferably 15% by volume or more, and preferably 50% by volume or less, more preferably 35% by volume or less, even more preferably 30% by volume or less and particularly preferably 25% by volume or less.

Use of these combinations of nonaqueous solvents may result in a favorable balance between cycle characteristics and high-temperature storage characteristics (and particularly residual capacity after high-temperature storage and high-load discharge capacity) of a battery fabricated using these nonaqueous solvents.

Specific examples of preferable combinations of cyclic carbonates not having a fluorine atom and linear carbonates include ethylene carbonate and dimethyl carbonate, ethylene carbonate and diethyl carbonate, ethylene carbonate and ethyl methyl carbonate, ethylene carbonate, dimethyl carbonate and diethyl carbonate, ethylene carbonate, dimethyl carbonate and ethyl methyl carbonate, ethylene carbonate, diethyl carbonate and ethyl methyl carbonate, ethylene carbonate, dimethyl carbonate, diethyl carbonate and ethyl methyl carbonate, propylene carbonate and ethyl methyl carbonate, propylene carbonate, ethyl methyl carbonate and diethyl carbonate, and propylene carbonate, ethyl methyl carbonate and dimethyl carbonate.

Among combinations of cyclic carbonates not having a fluorine atom and linear carbonates, those containing an asymmetrical linear alkyl carbonate for the linear carbonate are more preferable, and those containing ethylene carbonate and ethyl methyl carbonate, propylene carbonate and ethyl methyl carbonate, ethylene carbonate, ethyl methyl carbonate and dimethyl carbonate, ethylene carbonate, ethyl methyl carbonate and diethyl carbonate, propylene carbonate, ethyl methyl carbonate and dimethyl carbonate, or propylene carbonate, ethyl methyl carbonate and diethyl carbonate are particularly preferable since they result in a favorable balance between cycle characteristics and large-current discharge characteristics.

Among these, the asymmetric linear carbonate is preferably ethyl methyl carbonate, and the alkyl group of the linear carbonate preferably has 1 to 2 carbon atoms.

In the case dimethyl carbonate is contained in the nonaqueous solvent, if the dimethyl carbonate is contained in the nonaqueous solvent within a range such that the ratio of dimethyl carbonate to the total amount of nonaqueous solvent is preferably 10% by volume or more, more preferably 20% by volume or more, even more preferably 25% by volume or more and particularly preferably 30% by volume or more, and preferably 90% by volume or less, more preferably 80% by volume or less, even more preferably 75% by volume or less and particularly preferably 70% by volume or less, load characteristics of the battery may be improved.

Among these, by containing dimethyl carbonate and ethyl methyl carbonate, and making the content ratio of dimethyl carbonate to be greater than the content ratio of ethyl methyl carbonate, battery properties following high-temperature storage may be improved while maintaining electrical conductivity of the electrolyte solution, thereby making this preferable.

The volume ratio of dimethyl carbonate to ethyl methyl carbonate in the total nonaqueous solvent (dimethyl carbonate/ethyl methyl carbonate) is preferably 1.1 or more, more preferably 1.5 or more and even more preferably 2.5 or more from the viewpoints of improving electrical conductivity of the electrolyte solution and improving battery properties after storage. The aforementioned volume ratio (dimethyl carbonate/ethyl methyl carbonate) is preferably 40 or less, more preferably 20 or less, even more preferably 10 or less and particularly preferably 8 or less from the viewpoint of improving battery properties at low temperatures.

Other solvents may also be mixed into the aforementioned combinations consisting mainly of a cyclic carbonate not having a fluorine atom and a linear carbonate, examples of which include cyclic carboxylate esters, linear carboxylate esters, cyclic ethers, linear ethers, sulfur-containing organic solvents, phosphorous-containing organic solvents and fluorine-containing aromatic solvents.

Furthermore, in the present specification, although the volume of the nonaqueous solvent refers to the value obtained by measuring at 25° C., the value obtained by measuring at the melting point is used for compounds that are a solid at 25° C., such as ethylene carbonate.

1-4. Assistant

In the nonaqueous electrolyte battery of the present invention, an assistant may be suitably used according to the objective in addition to the compound containing a structure represented by general formula (A) and at least one compound selected from the group consisting of a nitrile compound, isocyanate compound, difluorophosphate, fluorosulfonate, lithium bis(fluorosulfonyl)imide, compound represented by general formula (B), and 0.01% by mass to 50% by mass of a cyclic carbonate compound having a fluorine atom with respect to the total amount of the nonaqueous electrolyte solution. Examples of assistants include the cyclic carbonates having a carbon-carbon unsaturated bond, acid anhydride compounds, vinyl sulfonate ester compounds, aromatic compounds having 12 carbon atoms or less, fluorinated unsaturated cyclic carbonates, compounds having a triple bond and other assistants indicated below, and cyclic carbonates having a carbon-carbon unsaturated bond and acid anhydride compounds are preferable.

1-4-1. Cyclic Carbonates Having Carbon-Carbon Unsaturated Bond

There are no particular limitations on the cyclic carbonates having a carbon-carbon unsaturated bond (and may also be referred to as "unsaturated cyclic carbonates" below) provided they are cyclic carbonates that have a carbon-carbon double bond or carbon-carbon triple bond, and any unsaturated carbonate can be used. Furthermore, cyclic carbonates having an aromatic ring are also included in unsaturated cyclic carbonates.

Examples of unsaturated cyclic carbonates include vinylene carbonates, ethylene carbonates substituted with a substituent having an aromatic ring, carbon-carbon double bond or carbon-carbon triple bond, phenyl carbonates, vinyl carbonates, allyl carbonates and catechol carbonates.

Examples of vinylene carbonates include vinylene carbonate, methylvinylene carbonate, 4,5-dimethylvinylene carbonate, phenylvinylene carbonate, 4,5-diphenylvinylene carbonate, vinylvinylene carbonate, 4,5-divinylvinylene carbonate, allylvinylene carbonate, 4,5-diallylvinylene carbonate, 4-fluorovinylene carbonate, 4-fluoro-5-methylvinylene carbonate, 4-fluoro-5-phenylvinylene carbonate, 4-fluoro-5-vinylvinylene carbonate and 4-allyl-5-fluorovinylene carbonate.

Specific examples of ethylene carbonates substituted with a substituent having an aromatic ring, carbon-carbon double bond or carbon-carbon triple bond include vinylethylene carbonate, 4,5-divinylethylene carbonate, 4-methyl-5-vinylethylene carbonate, 4-allyl-5-vinylethylene carbonate, ethynyl ethylene carbonate, 4,5-diethynyl ethylene carbonate, 4-methyl-5-ethynyl ethylene carbonate, 4-vinyl-5-ethynyl ethylene carbonate, 4-allyl-5-ethynyl ethylene carbonate, phenyl ethylene carbonate, 4,5-diphenyl ethylene carbonate, 4-phenyl-5-vinylethylene carbonate, 4-allyl-5-phenylethylene carbonate, allyl ethylene carbonate, 4,5-diallyl ethylene carbonate and 4-methyl-5-allyl ethylene carbonate.

Among these, examples of unsaturated cyclic carbonates particularly preferable for combined use with a compound containing a structure represented by general formula (A) include vinylene carbonate, methylvinylene carbonate, 4,5-dimethylvinylene carbonate, vinylvinylene carbonate, 4,5-vinylvinylene carbonate, allylvinylene carbonate, 4,5-diallylvinylene carbonate, vinylethylene carbonate, 4,5-divinylethylene carbonate, 4-methyl-5-vinylethylene carbonate, allylethylene carbonate, 4,5-diallylethylene carbonate, 4-methyl-5-allylethylene carbonate, 4-allyl-5-vinylethylene carbonate, ethynylethylene carbonate, 4,5-di ethynylethylene carbonate, 4-methyl-5-ethynyl ethylene carbonate and 4-vinyl-5-ethynyl ethylene carbonate. In addition, vinylene carbonate, vinylethylene carbonate and ethynyl ethylene carbonate are particularly preferable since they form a more stable interface protective coating.

There are no particular limitations on the molecular weight of the unsaturated cyclic carbonate, and may be any molecular weight provided it does not significantly impair the effects of the present invention. The molecular weight thereof is preferably 80 to 250. If within this range, solubility of the unsaturated cyclic carbonate in the nonaqueous electrolyte solution is easily secured and the effects of the present invention are easily and adequately demonstrated. The molecular weight of the unsaturated cyclic carbonate is more preferably 85 to 150.

There are no particular limitations on the method used to produce the unsaturated cyclic carbonate, and can be produced by arbitrarily selecting a known method.

One type of the unsaturated cyclic carbonate may be used alone or two or more types may be used in combination in an arbitrary combination and ratio. In addition, there are no particular limitations on the incorporated amount of unsaturated cyclic carbonate and may be an arbitrary amount provided it does not significantly impair the effects of the present invention. The incorporated amount of the unsaturated cyclic carbonate in 100% by mass of the nonaqueous electrolyte solution is preferably 0.001% by mass or more, more preferably 0.01% by mass or more and even more preferably 0.1% by mass or more, and preferably 5% by mass or less, more preferably 4% by mass or less and even more preferably 3% by mass or less. If within this range, the nonaqueous electrolyte battery easily demonstrates effects for adequately improving cycle characteristics, and situations resulting in decreases in high-temperature storage characteristics, increases in the amount of gas generated, or decreases in discharge capacity maintenance rate are easily avoided.

1-4-2. Acid Anhydride Compounds

Acid anhydride compounds are not limited to being carboxylic acid anhydrides, sulfuric acid anhydrides, nitric acid anhydrides, sulfonic acid anhydrides, phosphoric acid anhydrides, phosphorous acid anhydrides, cyclic acid anhydrides or linear acid anhydrides, and there are no particular limitations on the structure thereof provided they are acid anhydride compounds.

Specific examples of acid anhydride compounds include malonic anhydride, succinic anhydride, glutaric anhydride, adipic anhydride, maleic anhydride, citraconic anhydride, 2,3-dimethylmaleic anhydride, glutaconic anhydride, itaconic anhydride, phthalic anhydride, phenylmaleic anhydride, 2,3-diphenylmaleic anhydride, cyclohexane-1,2-dicarboxylic anhydride, 4-cyclohexene-1,2-dicarboxylic anhydride, 3,4,5,6-tetrahydrophthalic anhydride, 4,4'-oxydiphthalic anhydride, 5-norbornene-2,3-dicarboxylic anhydride, methyl-5-norbornene-2,3-dicarboxylic anhydride, phenylsuccinic anhydride, 2-phenylglutaric anhydride, allylsuccinic anhydride, 2-buten-11-ylsuccinic anhydride, (2-methyl-2-propenyl)succinic anhydride, tetrafluorosuccinic anhydride, diacetyltartaric anhydride, bicyclo[2.2.2]oct-7-ene-2,3,5,6-tetracarboxylic di-anhydride, 5-(2,5-dioxotetrahydrofuryl)-3-methyl-3-cyclohexene-1,2-dicarboxylic anhydride, methacrylic anhydride, acrylic anhydride, crotonic anhydride, methanesulfonic anhydride, trifluoromethanesulfonic anhydride, nonafluorobutanesulfonic anhydride and acetic anhydride.

Among these, succinic anhydride, maleic anhydride, citraconic anhydride, phenylmaleic anhydride, bicyclo[2.2.2]oct-7-ene-2,3,5,6-tetracarboxylic di-anhydride, 5-(2,5-dioxotetrahydrofuryl)-3-methyl-3-cyclohexene-1,2-dicarboxylic anhydride, allylsuccinic anhydride, acetic anhydride, methacrylic anhydride, acrylic anhydride and methanesulfonic anhydride are particularly preferable.

One type of acid anhydride compound may be used alone or two or more types may be used in combination in an arbitrary combination and ratio.

Although there are no limitations on the incorporated amount of acid anhydride compound based on the total amount of the nonaqueous electrolyte solution of the present invention, and may be any incorporated amount provided it does not significantly impair the effects of the present invention, the acid anhydride compound is contained in the nonaqueous electrolyte solution of the present invention normally at a concentration of 0.001% by mass or more, preferably 0.01% by mass or more and more preferably 0.1% by mass or more, and normally 10% by mass or less, preferably 5% by mass or less, more preferably 3% by mass or less, even more preferably 2% by mass or less, particularly preferably 1% by mass or less and most preferably 0.5% by mass or less.

In the case of satisfying the aforementioned range, the effects on output characteristics, load characteristics, low-temperature characteristics, cycle characteristics, high-temperature storage characteristics and the like are further improved.

1-4-4. Vinyl Sulfonate Ester Compounds

There are no particular limitations on the type of vinyl sulfonate ester compound provided it has a vinyl sulfonate ester structure in a molecule thereof.

Specific examples of vinyl sulfonate ester compounds are indicated below.

[Chemical 22]

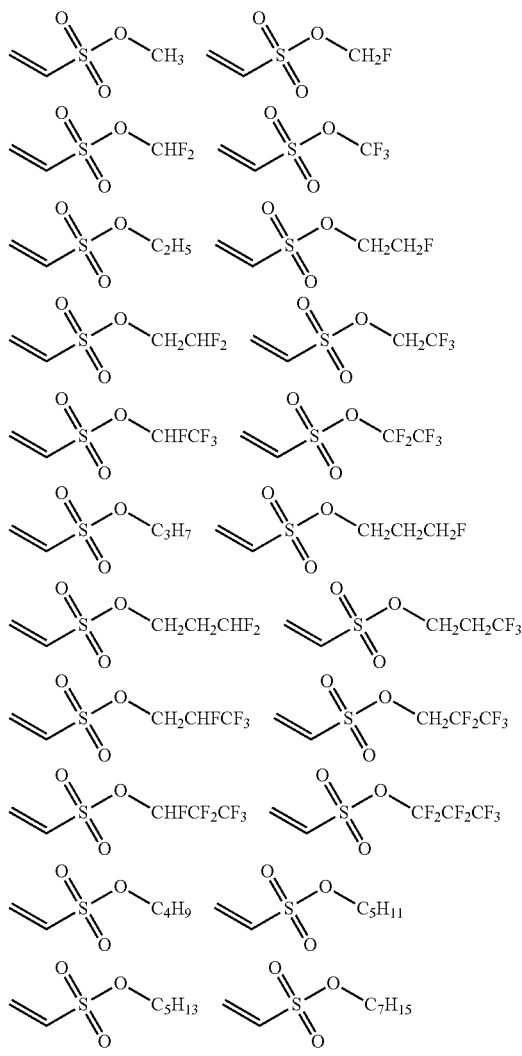

[Chemical 23]

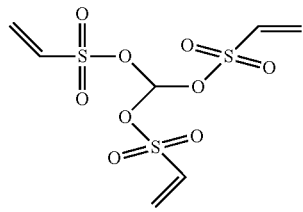

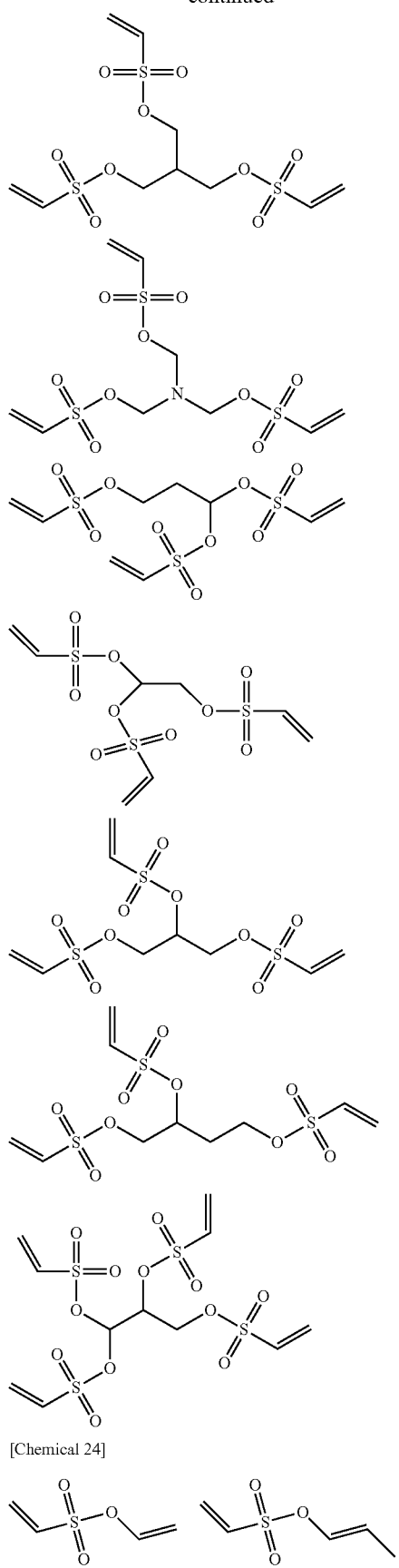

-continued

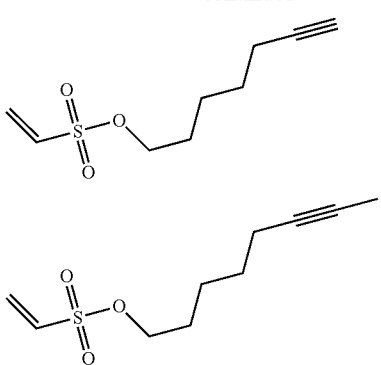

Among these, the following compounds are preferable.

[Chemical 25]

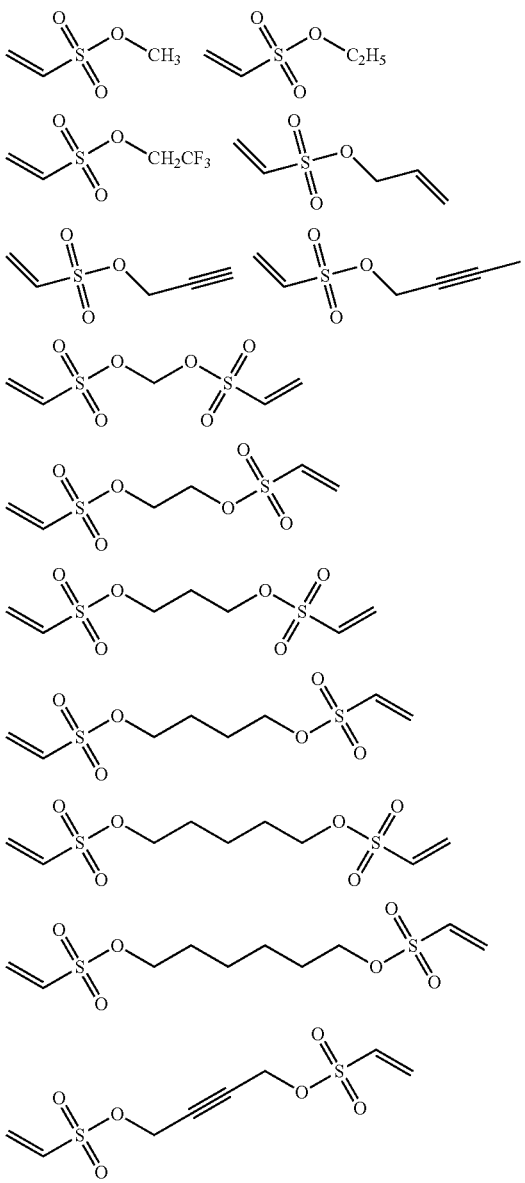

-continued

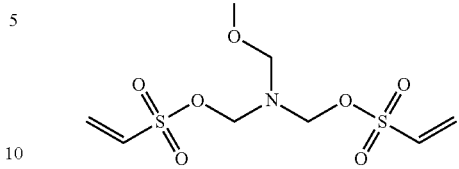

One type of vinyl sulfonate ester compound may be used alone or two or more types may be used in combination in an arbitrary combination and ratio. Although there are no limitations on the incorporated amount of vinyl sulfonate ester compound with respect to the total amount of the nonaqueous electrolyte solution of the present invention, and may be any incorporated amount provided it does not significantly impair the effects of the present invention, the vinyl sulfonate ester compound is normally contained in the nonaqueous electrolyte solution of the present invention at a concentration of 0.001% by mass or more, preferably 0.01% by mass or more and more preferably 0.1% by mass or more, and normally 10% by mass or less, preferably 5% by mass or less, more preferably 3% by mass or less, even more preferably 2% by mass or less, particularly preferably 1% by mass or less and most preferably 0.5% by mass or less. In the case of satisfying the aforementioned range, the effects on output characteristics, load characteristics, low-temperature characteristics, cycle characteristics, high-temperature storage characteristics and the like are further improved.

1-4-5. Aromatic Compounds Having 12 Carbon Atoms or Less

There are no particular limitations on the type of aromatic compound having 12 carbon atoms or less provided it is a compound in which the number of carbon atoms in a molecule thereof is 12 or less.

Specific examples of aromatic compounds having 12 carbon atoms or less include aromatic compounds such as biphenyl, alkylbiphenyl, cyclohexylbenzene, t-butylbenzene, t-amylbenzene, diphenyl ether and dibenzofuran; partial fluorides of the aforementioned aromatic compounds such as 2-fluorobiphenyl, o-cyclohexylfluorobenzene and p-cyclohexylfluorobenzene; and, fluorine-containing anisole compounds such as 2,4-difluoroanisole, 2,5-difluoroanisole, 2,6-difluoroanisole and 3,5-difluoroanisole.

Among these, aromatic compounds such as biphenyl, alkylbiphenyl, cyclohexylbenzene, t-butylbenzene, t-amylbenzene, diphenyl ether and dibenzofuran are preferable.

One type of these compounds may be used alone or two or more types may be used in combination. In the case of using two or more types in combination, the combination of cyclohexylbenzene and t-butylbenzene or t-amylbenzene, and the combined use of at least one selected from the group consisting of aromatic compounds not containing oxygen such as biphenyl, alkylbiphenyl, cyclohexylbenzene, b-butylbenzene and t-amylbenzene and at least one selected from oxygen-containing aromatic compounds such as diphenyl ether and dibenzofuran, are particularly preferable from the viewpoint of balanced high-temperature storage characteristics.

There are no particular limitations on the aromatic compound having 12 carbon atoms or less provided it does not significantly impair the effects of the present invention. An overcharge preventive agent is normally contained in 100% by mass of the nonaqueous electrolyte solution at a concentration of 0.001% by mass or more, preferably 0.01% by mass or more and more preferably 0.1% by mass or more, and normally 10% by mass or less, preferably 5% by mass or less, more preferably 3% by mass or less, even more preferably 2% by mass or less and particularly preferably 1% by mass or less. If within this range, the effects of the overcharge preventive agent are easily and adequately demonstrated, and situations resulting in a decrease in high-temperature storage characteristics and other battery properties are easily avoided.

1-4-6. Linear Carboxylate Esters

The linear carboxylate ester preferably has 3 to 7 carbon atoms. Specific examples thereof include methyl acetate, ethyl acetate, n-propyl acetate, isopropyl acetate, n-butyl acetate, isobutyl acetate, t-butyl acetate, methyl propionate, ethyl propionate, n-propyl propionate, isopropyl propionate, n-butyl propionate, isobutyl propionate, t-butyl propionate, methyl butyrate, ethyl butyrate, n-propyl butyrate, isopropyl butyrate, methyl isobutyrate, ethyl isobutyrate, n-propyl isobutyrate and isopropyl isobutyrate.

Among these, methyl acetate, ethyl acetate, n-propyl acetate, n-butyl acetate, methyl propionate, ethyl propionate, n-propyl propionate, isopropyl propionate, methyl butyrate and ethyl butyrate are preferable from the viewpoint of improving ion conductivity by lowering viscosity. Methyl propionate, ethyl propionate, n-propyl propionate, isopropyl propionate are more preferable, while methyl propionate and ethyl propionate are particularly preferable.

One type of linear carboxylate ester may be used alone or two or more types may be used in combination in an arbitrary combination and ratio.

Normally, the incorporated amount of linear carboxylate ester in 100% by volume of nonaqueous solvent is preferably 10% by volume or more and more preferably 15% by volume or more. As a result of setting a lower limit in this manner, electrical conductivity of the nonaqueous electrolyte solution is improved and large-current discharge characteristics of the nonaqueous electrolyte battery are easily improved. In addition, the incorporated amount of the linear carboxylate ester in 100% by volume of the nonaqueous solvent is preferably 60% by volume or less, more preferably 50% by volume or less, even more preferably 30% by volume or less, particularly preferably 20% by volume or less and most preferably 10% by volume or less. As a result of setting an upper limit in this manner, increases in load resistance are inhibited and large-current discharge characteristics and cycle characteristics of the nonaqueous electrolyte battery are easily made to be within favorable ranges.

1-4-7. Fluorinated Unsaturated Cyclic Carbonates

A cyclic carbonate having an unsaturated bond and a fluorine atom (and may also be referred to as a "fluorinated unsaturated cyclic carbonate" below) is preferably used as the fluorinated cyclic carbonate. There are no particular limitations on the fluorinated unsaturated cyclic carbonate provided the number of fluorine atoms possessed thereby is 1 or more. Among these, the number of fluorine atoms is normally 6 or less, preferably 4 or less and most preferably 1 or 2.

Examples of fluorinated unsaturated cyclic carbonates include fluorinated vinylene carbonate derivatives and fluorinated ethylene carbonate derivatives substituted with a substituent having an aromatic ring or carbon-carbon double bond.

Examples of fluorinated vinylene carbonate derivatives include 4-fluorovinylene carbonate, 4-fluoro-5-methylvinylene carbonate, 4-fluoro-5-phenylvinylene carbonate, 4-allyl-5-fluorovinylene carbonate and 4-fluoro-5-vinylvinylene carbonate.

Examples of fluorinated ethylene carbonate derivatives substituted with a substituent having an aromatic ring or carbon-carbon double bond include 4-fluoro-4-vinylethylene carbonate, 4-fluoro-4-allyl ethylene carbonate, 4-fluoro-5-vinylethylene carbonate, 4-fluoro-5-allylethylene carbonate, 4,4-difluoro-4-vinylethylene carbonate, 4,4-difluoro-4-allylethylene carbonate, 4,5-difluoro-4-vinylethylene carbonate, 4,5-difluoro-4-allylethylene carbonate, 4-fluoro-4,5-divinylethylene carbonate, 4-fluoro-4,5-diallylethylene carbonate, 4,5-difluoro-4,5-divinylethylene carbonate, 4,5-difluoro-4,5-diallylethylene carbonate, 4-fluoro-4-phenyl ethylene carbonate, 4-fluoro-5-phenylethylene carbonate, 4,4-difluoro-5-phenylethylene carbonate and 4,5-difluoro-4-phenylethylene carbonate.

Among these, preferable examples of fluorinated unsaturated cyclic carbonates consisting of 4-fluorovinylene carbonate, 4-fluoro-5-methylvinylene carbonate, 4-fluoro-5-vinylvinylene carbonate, 4-allyl-5-fluorovinylene carbonate, 4-fluoro-4-vinylethylene carbonate, 4-fluoro-4-allyl ethylene carbonate, 4-fluoro-5-vinylethylene carbonate, 4-fluoro-5-allylethylene carbonate, 4,4-difluoro-4-vinylethylene carbonate, 4,4-difluoro-4-allylethylene carbonate, 4,5-difluoro-4-vinylethylene carbonate, 4,5-difluoro-4-allylethylene carbonate, 4-fluoro-4,5-divinylethylene carbonate, 4-fluoro-4,5-diallylethylene carbonate, 4,5-difluoro-4,5-divinylethylene carbonate and 4,5-difluoro-4,5-diallylethylene carbonate are used more preferably since they form a stable interface protective coating.

There are no particular limitations on the molecular weight of the fluorinated unsaturated cyclic carbonate, and may be any molecular weight provided it does not significantly impair the effects of the present invention. The molecular weight is preferably 50 to 250. If within this range, solubility of the fluorinated cyclic carbonate in the nonaqueous electrolyte solution is easily secured and the effects of the present invention are easily demonstrated.

There are no particular limitations on the method used to produce the fluorinated unsaturated cyclic carbonate, and it can be produced by arbitrarily selecting a known method. The molecular weight is more preferably 100 to 200.

One type of fluorinated unsaturated cyclic carbonate may be used alone or two or more types may be used in combination in an arbitrary combination and ratio. In addition, there are no particular limitations on the incorporated amount of the fluorinated unsaturated cyclic carbonate, and may be any incorporated amount provided it does not significantly impair the effects of the present invention.

Normally, the incorporated amount of the fluorinated unsaturated cyclic carbonate in 100% by mass of the nonaqueous electrolyte solution is preferably 0.01% by mass or more, more preferably 0.1% by mass or more and even more preferably 0.5% by mass or more, and preferably 10% by mass or less, more preferably 5% by mass or less, even more preferably 3% by mass or less and particularly preferably 2% by mass or less.

If within this range, the nonaqueous electrolyte battery easily demonstrates the effect of adequately improving cycle characteristics, and situations resulting in decreases in high-temperature storage characteristics, increases in the amount of gas generated or decreases in discharge capacity maintenance rate are easily avoided.

1-4-8. Compounds Having Triple Bond

There are no particular limitations on the type of compound having a triple bond provided it has at least one triple bond in a molecule thereof.

Specific examples of compounds having a triple bond include the compounds indicated below:

hydrocarbon compounds such as 1-pentyne, 2-pentyne, 1-hexyne, 2-hexyne, 3-hexyne, 1-heptyne, 2-heptyne, 3-heptyne, 1-octyne, 2-octyne, 3-octyne, 4-octyne, 1-nonyne, 2-nonyne, 3-nonyne, 4-nonyne, 1-dodecyne, 2-dodecyne, 3-dodecyne, 4-dodecyne, 5-dodecyne, phenylacetylene, 1-phenyl-1-propyne, 1-phenyl-2-propyne, 1-phenyl-1-butyne, 4-phenyl-1-butyne, 4-phenyl-1-butyne, 1-phenyl-1-pentyne, 5-phenyl-1-pentyne, 1-phenyl-1-hexyne, 6-phenyl-1-hexyne, diphenylacetylene, 4-ethynyltoluene and dicyclohexylacetylene;

monocarbonates such as 2-propynylmethyl carbonate, 2-propynylethyl carbonate, 2-propynylpropyl carbonate, 2-propynylbutyl carbonate, 2-propynylphenyl carbonate, 2-propynylcyclohexyl carbonate, di-2-propynyl carbonate, 1-methyl-2-propynylmethyl carbonate, 1,1-dimethyl-2-propynylmethyl carbonate, 2-butynylmethyl carbonate, 3-butynylmethyl carbonate, 2-pentynylmethyl carbonate, 3-pentynylmethyl carbonate and 4-pentynylmethyl carbonate;

dicarbonates such as 2-butyne-1,4-diol dimethyl dicarbonate, 2-butyne-1,4-diol diethyl dicarbonate, 2-butyne-1,4-diol dipropyl dicarbonate, 2-butyne-1,4-diol dibutyl dicarbonate, 2-butyne-1,4-diol diphenyl dicarbonate and 2-butyne-1,4-diol dicyclohexyl dicarbonate;

monocarboxylate esters such as 2-propynyl acetate, 2-propynyl propionate, 2-propynyl butyrate, 2-propynyl benzoate, 2-propynyl cyclohexyl carboxylate, 1,1-dimethyl-2-propynyl acetate, 1,1-dimethyl-2-propynyl propionate, 1,1-dimethyl-2-propynyl butyrate, 1,1-dimethyl-2-propynyl benzoate, 1,1-dimethyl-2-propynyl cyclohexyl carboxylate, 2-butynyl acetate, 3-butynyl acetate, 2-pentynyl acetate, 3-pentynyl acetate, 4-pentynyl acetate, methyl acrylate, ethyl acrylate, propyl acrylate, vinyl acrylate, 2-propenyl acrylate, 2-butenyl acrylate, 3-butenyl acrylate, methyl methacrylate, ethyl methacrylate, propyl methacrylate, vinyl methacrylate, 2-propenyl methacrylate, 2-butenyl methacrylate, 3-butenyl methacrylate, methyl 2-propiolate, ethyl 2-propiolate, propyl 2-propiolate, vinyl 2-propiolate, 2-propenyl 2-propiolate, 2-butenyl 2-propiolate, 3-butenyl 2-propiolate, methyl 2-butynoate, ethyl 2-butynoate, propyl 2-butynoate, vinyl 2-butynoate, 2-propenyl 2-butynoate, 2-butenyl 2-butynoate, 3-butenyl 2-butynoate, methyl 3-butynoate, ethyl 3-butynoate, propyl 3-butynoate, vinyl 3-butynoate, 2-propenyl 3-butynoate, 2-butenyl 3-butynoate, 3-butenyl 3-butynoate, methyl 2-pentynoate, ethyl 2-pentynoate, propyl 2-pentynoate, vinyl 2-pentynoate, 2-propenyl 2-pentynoate, 2-butenyl 2-pentynoate, 3-butenyl 2-pentynoate, methyl 3-pentynoate, ethyl 3-pentynoate, propyl 3-pentynoate, vinyl 3-pentynoate, 2-propenyl 3-pentynoate, 2-butenyl 3-pentynoate, 3-butenyl 3-pentynoate, methyl 4-pentynoate, ethyl 4-pentynoate, propyl 4-pentynoate, vinyl 4-pentynoate, 2-propenyl 4-pentynoate, 2-butenyl 4-pentynoate and 3-butenyl 4-pentynoate;

dicarboxylate esters such as 2-butyne-1,4-diol diacetate, 2-butyne-1,4-diol dipropionate, 2-butyne-1,4-diol dibutyrate, 2-butyne-1,4-diol dibenzoate and 2-butyne-1,4-diol dicyclohexane carboxylate;

oxalate diesters such as methyl 2-propynyl oxalate, ethyl 2-propynyl oxalate, propyl 2-propynyl oxalate, vinyl 2-propynyl oxalate, allyl 2-propynyl oxalate, di-2-propynyl oxalate, methyl 2-butynyl oxalate, ethyl 2-butynyl oxalate, propyl 2-butynyl oxalate, vinyl 2-butynyl oxalate, allyl 2-butynyl oxalate, di-2-butynyl oxalate, methyl 3-butynyl oxalate, ethyl 3-butynyl oxalate, propyl 3-butynyl oxalate, vinyl 3-butynyl oxalate, allyl 3-butynyl oxalate and di-3-butynyl oxalate;

phosphine oxides such as methyl(2-propynyl)(vinyl) phosphine oxide, divinyl(2-propynyl) phosphine oxide, di(2-propynyl)(vinyl) phosphine oxide, di(2-propenyl)(2-propynyl) phosphine oxide, di(2-propynyl)(2-propenyl) phosphine oxide, di(3-butenyl)(2-propynyl) phosphine oxide and di(2-propynyl)(3-butenyl) phosphine oxide;

phosphinate esters such as 2-propynyl methyl(2-propenyl) phosphinate, 2-propynyl 2-butenyl(methyl) phosphinate, 2-propynyl di(2-propenyl) phosphinate, 2-propynyl di(3-butenyl) phosphinate, 1,1-dimethyl-2-propynyl methyl (2-propenyl) phosphinate, 1,1-dimethyl-2-propynyl 2-butenyl(methyl) phosphinate, 1,1-dimethyl-2-propynyl di(2-propenyl) phosphinate, 1,1-dimethyl-2-propynyl di(3-butenyl) phosphinate, 2-propenyl methyl(2-propynyl) phosphinate, 3-butenyl methyl(2-propynyl) phosphinate, 2-propenyl di(2-propynyl) phosphinate, 3-butenyl di(2-propynyl) phosphinate, 2-propenyl 2-propynyl(2-propenyl) phosphinate and 3-butenyl 2-propynyl(2-propenyl) phosphinate;

phosphonate esters such as 2-propynyl methyl(2-propenyl) phosphonate, methyl(2-propynyl) 2-butenyl phosphonate, (2-propynyl)(2-propenyl) 2-propenyl phosphonate, (3-butenyl)(2-propynyl) 3-butenyl phosphonate, (1,1-dimethyl-2-propynyl)(methyl) 2-propenyl phosphonate, (1,1-dimethyl-2-propynyl)(methyl) 2-butenyl phosphonate, (1,1-dimethyl-2-propynyl)(2-propenyl) 2-propenyl phosphonate, (1,1-dimethyl-2-propynyl)(3-butenyl) 3-butenyl phosphonate, (2-propynyl)(2-propenyl) methyl phosphonate, (3-butenyl)(2-propynyl) methyl phosphonate, (1,1-dimethyl-2-propynyl)(2-propenyl) methyl phosphonate, (3-butenyl)(1,1-dimethyl-2-propynyl) methyl phosphonate, (2-propynyl)(2-propenyl) ethyl phosphonate, (3-butenyl)(2-propynyl) ethyl phosphonate, (1,1-dimethyl-2-propynyl)(2-propenyl) ethyl phosphonate and (3-butenyl)(1,1-dimethyl-2-propynyl) ethyl phosphonate; and, phosphate esters such as (methyl)(2-propenyl)(2-propynyl) phosphate, (ethyl)(2-propenyl)(2-propynyl) phosphate, (2-butenyl)(methyl)(2-propynyl) phosphate, (2-butenyl)(ethyl)(2-propynyl) phosphate, (1,1-dimethyl-2-propynyl)(methyl)(2-propenyl) phosphate, (1,1-dimethyl-2-propynyl)(ethyl)(2-propenyl) phosphate, (2-butenyl)(1,1-dimethyl-2-propynyl)(methyl) phosphate and (2-butenyl)(ethyl)(1,1-dimethyl-2-propynyl) phosphate.

Among these, compounds having an alkynyloxy group are preferable since they more stably form a negative electrode coating in the electrolyte solution.

Moreover, compounds such as 2-propynyl methyl carbonate, di-2-propynyl carbonate, 2-butyne-1,4-diol dimethyl dicarbonate, 2-propynyl acetate, 2-butyene-1,4-diol diacetate, methyl 2-propynyl oxalate and di-2-propynyl oxalate are particularly preferable from the viewpoint of improving storage characteristics.

One type of the aforementioned compound having a triple bond may be used alone or two or more types may be used in combination in an arbitrary combination and ratio. Although there are no limitations on the incorporated amount of the compound having a triple bond with respect to the total amount of the nonaqueous electrolyte solution of the present invention, and may be any incorporated amount provided it does not significantly impair the effects of the present invention, the compound is normally contained in the nonaqueous electrolyte solution of the present invention at a concentration of 0.01% by mass or more, preferably 0.05% by mass or more and more preferably 0.1% by mass or more, and normally 5% by mass or less, preferably 3% by mass or less and more preferably 1% by mass or less. In the case of satisfying the aforementioned range, effects on output characteristics, load characteristics, low-temperature characteristics, cycle characteristics, high-temperature storage characteristics and the like are further improved.

1-4-9. Other Assistants

Known assistants other than those previously described can be used as other assistants. Examples of other assistants include:

carbonate compounds such as erythritan carbonate, spirobis-dimethylene carbonate and methoxyethyl methyl carbonate;

spiro compounds such as 2,4,8,10-tetraoxaspiro[5.5] undecane and 3,9-divinyl-2,4,8,10-tetraoxasprio[5.5] undecane;

sulfur-containing compounds such as ethylene sulfite, methyl fluorosulfonate, ethyl fluorosulfonate, methyl methanesulfonate, ethyl methanesulfonate, busulfan, sulfolene, diphenyl sulfone, N,N-dimethyl methanesulfonamide, N,N-diethyl methanesulfonamide, methyl vinylsulfonate, ethyl vinylsulfonate, allyl vinylsulfonate, propargyl vinylsulfonate, methyl allylsulfonate, ethyl allylsulfonate, allyl allylsulfonate, propargyl allylsulfonate and 1,2-bis(vinylsulfonyloxy) ethane;

nitrogen-containing compounds such as 1-methyl-2-pyrrolidinone, 1-methyl-2-piperidone, 3-methyl-2-oxazolidinone, 1,3-dimethyl-2-imidazolidinone and N-methylsuccinimide;

phosphorous-containing compounds such as trimethyl phosphite, triethyl phosphite, triphenyl phosphite, trimethyl phosphate, triethyl phosphate, triphenyl phosphate, dimethyl methylphosphonate, diethyl ethylphosphonate, dimethyl vinylphosphonate, diethyl vinylphosphonate, methyl dimethylphosphinate, ethyl diethylphosphinate, trimethylphosphine oxide and triethylphosphine oxide;

hydrocarbon compounds such as heptane, octane, nonane, decane or cycloheptane; and, fluorine-containing aromatic compounds such as fluorobenzene, difluorobenzene, hexafluorobenzene and benzotrifluoride.

One type of these compounds may be used alone or two or more types may be used in combination. The addition of these assistants makes it possible to improve capacity maintenance characteristics following high-temperature storage and cycle characteristics.

There are no particular limitations on the incorporated amount of other assistants, and may be any incorporated amount provided it does not significantly impair the effects of the present invention. The incorporated amount of other assistants in 100% by mass of the nonaqueous electrolyte solution is preferably 0.01% by mass to 5% by mass. If within this range, the effects of the other assistant are adequately and easily demonstrated, and situations resulting in a decrease in high-load discharge characteristics or other battery properties are easily avoided.

The incorporated amount of other assistants is more preferably 0.1% by mass or more, even more preferably 0.2% by mass or more, more preferably 3% by mass or less and even more preferably 1% by mass or less.

The aforementioned nonaqueous electrolyte solution includes that present within the nonaqueous electrolyte battery described in the present invention.

More specifically, the case of the nonaqueous electrolyte solution being a nonaqueous electrolyte solution within a nonaqueous electrolyte battery obtained by separately synthesizing constituent elements of the nonaqueous electrolyte solution such as a lithium salt, solvent and assistant, preparing the nonaqueous electrolyte solution from those substantially isolated components, and injecting into a battery separately assembled using a method to be subsequently described, the case of individually placing the constituent elements of the nonaqueous electrolyte solution of the present invention in a battery and mixing within the battery to obtain the same composition as that of the nonaqueous electrolyte solution of the present invention, and the case of forming a compound composing the nonaqueous electrolyte solution of the present invention within the nonaqueous electrolyte battery to obtain the same composition as that of the nonaqueous electrolyte solution of the present invention, are also included in the present invention.

2. Battery Constitution

The nonaqueous electrolyte battery of the present invention is preferably used as an electrolyte solution for a nonaqueous electrolyte battery in the form of a secondary battery such as a lithium secondary battery. The following provides an explanation of a nonaqueous electrolyte battery that uses the nonaqueous electrolyte solution of the present invention.

The nonaqueous electrolyte battery of the present invention can employ a known structure, and is typically provided with a negative electrode and positive electrode, which are capable of occluding and releasing ions (such as lithium ions) and the aforementioned nonaqueous electrolyte solution of the present invention.

2-1. Negative Electrode

The following provides a description of a negative electrode active material used in the negative electrode. There are no particular limitations on the negative electrode active material provided it is capable of electrochemically occluding and releasing lithium ions. Specific examples thereof include carbonaceous materials, alloy-based materials and lithium-containing metal compound oxide materials. One type of these materials may be used alone or two or more types may be used in combination in an arbitrary combination.

<Negative Electrode Active Material>

Examples of negative electrode active materials include carbonaceous materials, alloy-based materials and lithium-containing metal compound oxide materials.

Examples of carbonaceous materials include (1) natural graphite, (2) artificial graphite, (3) amorphous carbon, (4) carbon-coated graphite, (5) graphite-coated graphite, and (6) resin-coated graphite.

Examples of (1) natural graphite include scaly graphite, flaky graphite, soil graphite and/or graphite particles obtained by carrying out treatment such as spheronization or densification using these graphite materials as raw materials. Among these, spherical or ellipsoidal graphite obtained by subjecting to spheronization treatment is particularly preferable from the viewpoint of particle fillability and charge/discharge rate characteristics.

An apparatus that repeatedly subjects the particles to primarily impact force as well as other mechanical actions such as a compression, rubbing or shear force, and including particle interaction, can be used for the apparatus used for spheronization treatment. More specifically, a device is preferable that has a rotor installed with a large number of blades within a casing, and carries out spheronization treatment by imparting mechanical actions such as impact compression, rubbing or shear force to a carbon material introduced therein by rotating the rotor at a high speed. In addition, an apparatus having a mechanism that enables mechanical action to be repeatedly imparted by circulating the carbon material is preferable.

For example, in the case of carrying out spheronization treatment using the apparatus described above, the peripheral velocity of the rotating rotor is preferably 30 m/sec to 100 m/sec, more preferably 40 m/sec to 100 m/sec and even more preferably 50 m/sec to 100 m/sec. In addition, although treatment can be carried out by simply passing the carbon substance through the apparatus, the carbon substance is preferably treated by allowing to circulate or remain inside the apparatus for 30 seconds or more, and more preferably treated by allowing to circulate or remain in the apparatus for 1 minute or more.

Examples of (2) artificial graphite include that produced by graphitizing an organic compound such as coal tar pitch, coal-based heavy oil, atmospheric residual oil, petroleum-based heavy oil, aromatic hydrocarbons, nitrogen-containing cyclic compounds, sulfur-containing cyclic compounds, polyphenylene, polyvinyl chloride, polyvinyl alcohol, polyacrylonitrile, polyvinyl butyral, natural polymers, polyphenylene sulfide, polyphenylene oxide, furfuryl alcohol resin, phenol-formaldehyde resin or imide resin at a temperature normally within the range of 2500° C. to 3200° C. followed by pulverizing and/or classifying as necessary. At this time, silicon-containing compounds or boron-containing compounds and the like can also be used as graphitization catalysts. In addition, another example of artificial graphite is that obtained by graphitizing mesocarbon microbeads separated in the heat treatment process of pitch. Moreover, another example is artificial graphite of granulated particles composed of primary particles. For example, an example of artificial graphite is graphite particles in which flat particles have been aggregated or bound so that their orientation planes are non-parallel, and these particles are obtained by mixing and graphitizing mesocarbon microbeads, a graphitizable carbonaceous material powder such as coke, a graphitizable binder such as tar or pitch, and a graphitization catalyst, followed by pulverizing as necessary.

Examples of (3) amorphous carbon include amorphous carbon particles obtained by one or more rounds of heat treatment over a temperature range at which graphitization does not occur (temperature range of 400° C. to 2200° C.) using as raw material a readily graphitizable carbon precursor such as tar or pitch, and amorphous carbon particles obtained by heat treatment using as raw material a non-graphitizable carbon precursor such as resin.

Examples of (4) carbon-coated graphite include carbon-graphite complex obtained by mixing natural graphite and/or artificial graphite with a carbon precursor in the form of an organic compound such as tar, pitch or resin, followed by subjecting to one or more rounds of heat treatment within a range of 400° C. to 2300° C., using the resulting natural graphite and/or artificial graphite as core graphite, and coating the core graphite with amorphous carbon. The complex form may be that in which the entire surface or only a portion thereof is coated, or a plurality of primary particles may be compounded using carbon from the aforementioned carbon precursor as a binder. In addition, a carbon-graphite complex can also be obtained by reacting a hydrocarbon-based gas such as benzene, toluene, methane, propane or the volatile component of an aromatic system with natural graphite and/or artificial graphite followed by depositing (CVD) carbon on the graphite surface.

Examples of (5) graphite-coated graphite include graphite-coated graphite in which a graphitized substance is coated over the entire or a portion of the surface of core graphite obtained by mixing natural graphite and/or artificial graphite with a carbon precursor of a readily graphitizable organic compound such as tar, pitch or resin followed by subjecting to one or more rounds of heat treatment over a temperature range of about 2400° C. to 3200° C., and using the resulting natural graphite and/or artificial graphite for the core graphite.

Examples of (6) resin-coated graphite include resin-coated graphite in which core graphite is coated with a resin and the like obtained by mixing natural graphite and/or artificial graphite with a resin and the like followed by drying at a temperature below 400° C. and using the resulting natural graphite and/or artificial graphite for the core graphite.

In addition, one type of the carbonaceous materials of (1) to (6) may be used alone or two or more types may be used in combination in an arbitrary combination or ratio.

Examples of organic compounds such as tar, pitch or resin used in (2) to (5) above include carbonizable organic compounds selected from the group consisting of petroleum-based heavy oil, direct liquefaction heavy oil, cracked petroleum heavy oil, aromatic hydrocarbons, N ring compounds, S ring compounds, polyphenylene, synthetic organic polymers, natural polymers, thermoplastic resins and thermosetting resins. In addition, raw material organic compounds may be used after dissolving in a low molecular weight organic solvent in order to adjust viscosity during mixing.

In addition, natural graphite subjected to spheronization treatment is preferable for the natural graphite and/or artificial graphite serving as the raw material of the core graphite.

There are no particular limitations on alloy-based materials used for the negative electrode active material, and may be any of lithium alone, a metal alone or alloy that forms a lithium alloy, or an oxide, carbide, nitride, silicide, sulfide, phosphide or other compound thereof, provided it is able to occlude and release lithium. The metal alone or alloy that forms a lithium alloy is preferably a material that contains a metal or metalloid (namely, excluding carbon) element of group 13 or group 14, and is more preferably a metal alone of aluminum, silicon or tin metal or an alloy or compound containing any of these atoms. One type of these may be used alone or two or more types may be used in combination in an arbitrary combination and ratio.

<Physical Properties of Carbonaceous Materials>

In the case of using a carbonaceous material as the negative electrode active material, it is preferable to use a material having the physical properties indicated below.

(X-Ray Parameters)

The d value (interlayer spacing) of the lattice plane (002 plane) of the carbonaceous material as determined by X-ray diffraction according to the Gakushin method is normally 0.335 nm or more and normally 0.360 nm or less, preferably 0.350 nm or less and more preferably 0.345 nm or less. In addition, the crystallite size (Lc) of the carbonaceous material as determined by X-ray diffraction according to the Gakushin method is preferably 1.0 nm or more and more preferably 1.5 nm or more.

(Volume-Based Mean Particle Diameter) The volume-based mean particle diameter of the carbonaceous material is the mean diameter (median diameter) based on volume as determined according to the laser diffraction scattering method, and is normally 1 μm or more, preferably 3 μm or more, more preferably 5 μm or more and particularly preferably 7 μm or more, and normally 100 μm or less, preferably 50 µm or less, more preferably 40 µm or less, even more preferably 30 µm or less and particularly preferably 25 µm or less.

If volume-based mean particle diameter is below the aforementioned range, irreversible capacity may increase leading to a loss of initial battery capacity. In addition, if the mean particle diameter exceeds the aforementioned range, there is increased susceptibility to the formation of an uneven coated surface when fabricating the electrode by coating, which is undesirable in terms of the battery fabrication process.

Volume-based mean particle diameter is measured by dispersing carbon powders in a 0.2% by mass aqueous solution (about 10 mL) of a surfactant in the form of polyoxyethylene (20) sorbitan monolaurate followed by measuring using a laser diffraction/scattering particle size analyzer (such as the Model LA-700 manufactured by Horiba, Ltd.). The median diameter determined in this manner is defined as the volume-based mean particle diameter of a carbonaceous material of the present invention.

(Raman R Value)

The Raman R value of the carbonaceous material is the value measured by laser Raman spectroscopy, and is normally 0.01 or more, preferably 0.03 or more and more preferably 0.1 or more, and normally 1.5 or less, preferably 1.2 or less, even more preferably 1 or less, and particularly preferably 0.5 or less.

If the Raman R value is below the aforementioned range, crystallinity of the particle surfaces may become excessively high resulting in a shortage of sites where lithium enters between layers accompanying charging and discharging. Namely, charge acceptability may decrease. In addition, crystals may be easily oriented in the direction parallel to the electrode plate in the case of increasing the density of the negative electrode by pressing after coating onto a current collector, thereby leading to a decrease in load characteristics.

On the other hand, if the Raman R value exceeds the aforementioned range, crystallinity of the particle surfaces may decrease, reactivity with the nonaqueous electrolyte solution may increase, thereby leading to reduced efficiency and increased generation of gas.

Raman spectrum is measured using a Raman spectrometer (such as a Raman spectrometer manufactured by Jasco Corp.) by filling the sample into a measuring cell by allowing the sample to naturally drop therein, and irradiating the surface of the sample in the cell with argon ion laser light (or semiconductor laser light) while rotating the cell within a plane perpendicular to the laser light. Intensity IA of a peak PA in the vicinity of 1580 cm$^{-1}$ and intensity IB of a peak PB in the vicinity of 1360 cm$^{-1}$ are measured on the resulting Raman spectrum followed by calculation of the intensity ratio R thereof (R=IB/IA). The Raman R value calculated in this manner is defined as the Raman R value of a carbonaceous material of the present invention.

In addition, the conditions used during the aforementioned Raman measurement are as indicated below.

Laser wavelength: Ar ion laser: 514.5 nm (semiconductor laser: 532 nm)
Measuring range: 1100 cm$^{-1}$ to 1730 cm$^{-1}$
Raman R value: Background processing
Smoothing processing: simple average, convolution: 5 points (BET Specific Surface Area)

The BET specific surface area of the carbonaceous material is the value of specific surface area measured using the BET method, and is normally 0.1 m$^2$·g$^{-1}$ or more, preferably 0.7 m$^2$·g$^{-1}$ or more, even more preferably 1.0 m$^2$·g$^{-1}$ or more and particularly preferably 1.5 m$^2$·g$^1$ or more, and normally 100 m$^2$·g$^{-1}$ or less, preferably 25 m$^2$·g$^{-1}$ or less, more preferably 15 m$^2$·g$^{-1}$ or less and particularly preferably 10 m$^2$·g$^{-1}$ or less.

If the value of BET specific surface area is below the aforementioned range, lithium acceptability during charging easily becomes poor, lithium easily precipitates on the electrode surface and there is the potential for a decrease in stability in the case of using as a negative electrode material. On the other hand, if this range is exceeded, reactivity with the nonaqueous electrolyte solution may increase when used as a negative electrode material, thereby resulting in increased generation of gas and making it difficult to obtain a preferable battery.

BET specific surface area is measured using a surface area measuring instrument (such as a fully automated surface area measuring system manufactured by Ohkura Riken Co., Ltd.) according to the nitrogen adsorption-BET 1-point method in accordance with the flowing gas method using a mixed gas of nitrogen and helium accurately adjusted to a relative pressure of nitrogen relative to atmospheric pressure of 0.3 after pre-drying the sample for 15 minutes at 350° C. in the presence of flowing nitrogen.

(Circularity)

In the case of measuring circularity as the degree of sphericity of the carbonaceous material, the circularity is preferably within the range indicated below. Furthermore, circularity is defined as "circularity=(perimeter of an equivalent circle having the same area as the particle projected shape)/(actual perimeter of particle projected shape)", and indicates a theoretically true sphere when the value of circularity is 1. The circularity of particles of the carbonaceous material having a particle diameter within the range of 3 µm to 40 µm is preferably as close to 1 as possible and is preferably 0.1 or more, and in particular, is preferably 0.5 or more, more preferably 0.8 or more, even more preferably 0.85 or more, and particularly preferably 0.9 or more. High current density charging and discharging characteristics improve the greater the value of circularity. Thus, if circularity is below the aforementioned range, fillability of the negative electrode active material may decrease resulting in an increase in resistance between particles and a decrease in short-term, high current density charging and discharging characteristics.

Circularity is measured using a flow-type particle image analyzer (such as the FPIA manufactured by Sysmex Corp.). About 0.2 g of sample are dispersed in a 0.2% by mass aqueous solution (about 50 mL) of a surfactant in the form of polyoxyethylene (20) sorbitan monolaurate, and after irradiating the sample for 1 minute at an output of 60 W with ultrasonic waves having a frequency of 28 kHz, particles are measured over a particle diameter range of 3 µm to 40 µm while setting the detection range to 0.6 µm to 400 km.

Although there are no particular limitations on the method used to improve circularity, particles that have been made to be spherical by subjecting to spheronization treatment are preferable since the shape of inter-particle gaps is uniform when using in an electrode body. Examples of spheronization treatment include a method in which particles are made to approach sphericity mechanically by imparting shear force and compressive force, and a mechanical/physical treatment method in which a plurality of microparticles are granulated by the adhesive force of a binder or the particles per se.

(Tap Density)

Tap density of the carbonaceous material is normally 0.1 g·cm$^{-3}$ or more, preferably 0.5 g·cm$^{-3}$ or more, more preferably 0.7 g·cm$^{-3}$ or more and particularly preferably 1 g·cm$^{-3}$ or more, and preferably 2 g·cm$^{-3}$ or less, more preferably 1.8 g·cm$^{-3}$ or less and particularly preferably 1.6 g·cm$^{-3}$ or less. If tap density is below the aforementioned range, it may be difficult to increase filling density in the case of using as a negative electrode and a high-capacity battery may be unable to be obtained. In addition, if the aforementioned range is exceeded, there may be a too small number of gaps between particles in an electrode, thereby making it difficult to ensure conductivity between particles and making it difficult to obtain preferable battery properties.

Tap density is measured by passing the sample particles through a sieve having a mesh size of 300 μm and allowing the sample to drop onto a 20 cm$^3$ tapping cell to fill the sample to the upper edge of the cell, followed by tapping 1000 times at a stroke length of 10 mm using a powder density meter (such as the Tap Denser manufactured by Seishin Enterprise Co., Ltd.) and calculating tap density from the volume at that time and sample weight.

(Orientation Ratio)

Orientation ratio of the carbonaceous material is normally 0.005 or more, preferably 0.01 or more and more preferably 0.015 or more, and normally 0.67 or less. If the orientation ratio is below the aforementioned range, high-density charging and discharging characteristics may decrease. Furthermore, the upper limit of the aforementioned range is the theoretical upper limit value of the orientation ratio of the carbonaceous material.

Orientation ratio is measured by X-ray diffraction after compression molding the sample. 0.47 g of sample are filled into a molding machine having a diameter of 17 mm followed by compressing at 58.8 MN·m$^{-2}$ and measuring X-ray diffraction of the resulting compact by placing in a measurement sample holder so as to lie in the same plane as the sample holder using clay. The ratio represented by (110) diffraction peak intensity/(004) diffraction peak intensity is calculated from the peak intensity of (110) diffraction and (004) diffraction of the resulting carbon.

The conditions used when measuring X-ray diffraction are as indicated below. Furthermore, "2θ" indicates the angle of diffraction.

Target: Cu(Kα beam) graphite monochromator
Slit: Divergence slit=0.5 degrees
  Receiving slit=0.15 mm
  Scattering slit=0.5 degrees
Measuring Range and Step Angle/Measuring Time:
  (110) plane: 75 degrees≤2θ≤80 degrees 1 degree/60 seconds
  (004) plane: 52 degrees≤2θ≤57 degrees 1 degree/60 seconds (Aspect Ratio (Powder))

The aspect ratio of the carbonaceous material is normally 1 or more, and normally 10 or less, preferably 8 or less and more preferably 5 or less. If the aspect ratio exceeds the aforementioned range, streaking may occur when forming an electrode plate, a uniform coated surface may not be obtained and high current density charging and discharging characteristics may decrease. Furthermore, the lower limit of the aforementioned range is the theoretical lower limit value of the aspect ratio of the carbonaceous material.

Aspect ratio is measured by magnifying and observing particles of the carbonaceous material with a scanning electron microscope. Fifty arbitrary graphite particles are selected that have been immobilized on the end surface of metal having a thickness of 50 μm or less, and a stage having a sample immobilized thereon is then rotated and inclined for each sample, followed by measuring a diameter A corresponding to the maximum length of the carbonaceous material particles when observed three-dimensionally and a diameter B corresponding to the minimum length perpendicular thereto, and determining the average value of A/B.

(Coverage Rate)

The negative electrode active material of the present invention may be coated with a carbon substance or graphite substance. Among these, coating with an amorphous carbon substance is preferable from the viewpoint of acceptability of lithium ions, and the coverage rate thereof is normally 0.5% to 30%, preferably 1% to 25% and more preferably 2% to 20%. If this content rate is excessively large, the amorphous carbon portion of the negative electrode active material becomes large and reversible capacity when incorporating in a battery tends to become small. If the content ratio is excessively small, in addition to amorphous carbon sites not being uniformly coated on the graphite particles serving as the core, the particles are not solidly granulated, and particle diameter tends to becomes excessively small when pulverized after firing.

Furthermore, the content rate (coverage rate) of carbides derived from an organic compound of the ultimately obtained negative electrode active material can be calculated using the following equation from the amount of negative electrode active material, the amount of organic compound, and the residual carbon rate as measured according to the micro method in compliance with JIS K 2270.

Equation:
Coverage rate of carbide derived from organic compound (%)=(mass of organic compound×residual carbon rate×100)/{mass of negative electrode active material+(mass of organic compound×residual carbon rate)}

(Internal Porosity)

Internal porosity of the negative electrode active material is normally 1% or more, preferably 3% or more, more preferably 5% or more and even more preferably 7% or more. In addition, it is normally less than 50%, preferably 40% or less, more preferably 30% or less and even more preferably 20% or less. If this internal porosity is excessively small, the amount of liquid within the particles decreases and charging and discharging characteristics tend to become poor, while if internal porosity is excessively large, there is a shortage of inter-particle gaps in the case of forming into an electrode, and diffusion of electrolyte solution tends to be inadequate. In addition, substances that mitigate expansion and compression of metal particles capable of alloying with Li, such as amorphous carbon, graphite substances or resin, may be present in the gaps or gaps may be filled therewith.

<Metal Particles Capable of Alloying with Li>

Examples of techniques used to confirm that metal particles are capable of alloying with Li include identification of a metal particle phase by X-ray diffraction, observation of particle structure and elemental analysis with an electron microscope, and elemental analysis by fluorescent X-rays.

Although any conventionally known metal particles can be used for the metal particles capable of alloying with Li, the metal particles are preferably a metal selected from the group consisting of Fe, Co, Sb, Bi, Pb, Ni, Ag, Si, Sn, Al, Zr, Cr, P, S, V, Mn, Nb, Mo, Cu, Zn, Ge, In and Ti or compound thereof from the viewpoint of capacity and cycle life. In addition, an alloy composed of two or more types of metals may be used, or the metal particles may be alloy particles formed by two or more types of metal elements. Among these, a metal selected from the group consisting of Si, Sn, As, Sb, Al, Zn and W or compound thereof is preferable.

Examples of metal compounds include metal oxides, metal nitrides and metal carbides. In addition, an alloy composed of two or more types of metals may also be used.

Among these, Si or an Si compound is preferable from the viewpoint of increasing capacity. In the present description, Si or Si compounds are collectively referred to as Si compounds. Specific examples thereof include $SiO_x$, $SiN_x$, $SiC_x$ and $SiZ_xO_y$ (wherein, Z represents C or N), and preferably $SiO_x$ when represented with a general formula. Although this general formula $SiO_x$ is obtained by using silicon dioxide ($SiO_2$) and metal silicon (Si) as raw materials, the value of x thereof is normally such that $0 \leq x \leq 2$. $SiO_x$ has a large theoretical capacity in comparison with graphite, and amorphous Si or nano-sized Si crystals facilitate migration of alkaline ions such as lithium ions, thereby making it possible to obtain high capacity.

More specific examples are those represented by $SiO_x$ wherein x is such that $0 \leq x < 2$, more preferably 0.2 to 1.8, more preferably 0.4 to 1.6, and particularly preferably 0.6 to 1.4, with x=0 being exceptionally preferable. If within this range, simultaneous to realizing high capacity, irreversible capacity caused by bonding between Li and oxygen can be reduced.

Mean Particle Diameter (d50) of Metal Particles Capable of Alloying with Li

The mean particle diameter (d50) of metal particles capable of alloying with Li is normally 0.01 μm or more, preferably 0.05 μm or more, more preferably 0.1 μm or more and even more preferably 0.3 μm or more, and normally 10 μm or less, preferably 9 μm or less and more preferably 8 μm or less from the viewpoint of cycle life. If mean particle diameter (d50) is within the aforementioned range, volume expansion accompanying charging and discharging can be reduced and favorable cycle characteristics can be obtained while maintaining charge-discharge capacity.

Mean particle diameter (d50) is determined by a method such as laser diffraction/scattering particle size analysis.

BET Specific Surface Area of Metal Particles Capable of Alloying with Li

The specific surface area as determined according to the BET method of metal particles capable of alloying with Li is normally 0.5 $m^2$/g to 60 $m^2$/g and preferably 1 $m^2$/g to 40 $m^2$/g. If the specific surface area as determined according to the BET method of metal particles capable of alloying with Li is within the aforementioned range, battery charging and discharging efficiency and discharge capacity are high, migration of lithium during high-speed charging and discharging is accelerated, and rate characteristics are superior, thereby making this preferable.

Oxygen Content of Metal Particles Capable of Alloying with Li

Although there are no particular limitations thereon, the oxygen content of metal particles capable of alloying with Li is normally 0.01% by mass to 8% by mass and preferably 0.05% by mass to 5% by mass. Although the distribution state of oxygen within the particles may be such that oxygen may be present near the surface, present within the particles or uniformly present within the particles, oxygen is particularly preferably present near the surface. If the oxygen content of metal particles capable of alloying with Li is within the aforementioned range, strong bonding O and Si inhibits volume expansion accompanying charging and discharging while also resulting in superior cycle characteristics, thereby making this preferable.

The negative electrode active material containing the metal particles capable of alloying with Li and graphite particles referred to in the present invention may refer to a mixture in which the metal particles capable of alloying with Li and the graphite particles are mixed in a state of mutually independent particles, or may be in the form of a complex in which the metal particles capable of alloying with Li are present on the surface or inside the graphite particles. In the present description, although there are no particular limitations thereon provided it contains metal particles capable of alloying with Li and a carbon substance, a complex (also referred to as composite particles) preferably refers to particles in which metal particles capable of alloying with Li and a carbon substance are integrated by physical and/or chemical bonds. In a more preferable mode thereof, the metal particles capable of alloying with Li and the carbon substance are in a state such that each solid component is present while dispersed within particles to a degree that they are present both on the surface of the composite particles and within the bulk, and in order to integrate them by physical and/or chemical bonds, the carbon substance is present. In a more specific preferable mode, the negative electrode active material is a composite material that is at least composed of metal particles capable of alloying with Li and graphite particles, wherein graphite particles, and preferably natural graphite, are present within particles having a folded structure having a curved surface, and metal particles capable of alloying with Li are present in gaps within that folded structure having a curved surface. In addition, the gaps may be voids or a substance such as amorphous carbon, graphite substance or resin, which mitigates expansion and compression of metal particles capable of alloying with Li, may be present in the gaps.

Content Ratio of Metal Particles Capable of Alloying with Li

The content ratio of metal particles capable of alloying with Li to the total of metal particles capable of alloying with Li and graphite particles is normally 0.1% by mass or more, preferably 1% by mass or more, more preferably 2% by mass or more, even more preferably 3% by mass or more and particularly preferably 5% by mass or more. In addition, the content ratio is normally 99% by mass or less, preferably 50% by mass or less, more preferably 40% by mass or less, even more preferably 30% by mass or less, still more preferably 25% by mass or less, particularly preferably 15% by mass or less, and most preferably 10% by mass or less. If the content ratio is within this range, adequate capacity can be obtained, thereby making this preferable.

An alloy-based material negative electrode can be produced using any known method. More specifically, although examples of methods used to produce the negative electrode include a method in which the product of adding a binder or conductive material to the aforementioned negative electrode active material is directly subjected to roll forming to obtain a sheet electrode, and a method in which the negative electrode active material is subjected to compression molding to obtain a pellet electrode, normally a method is used in which a thin film layer containing the aforementioned negative electrode active material (negative electrode active material layer) is formed by a technique such as coating, depositing, sputtering or plating on a current collector for the negative electrode (to also be referred to as a "negative electrode current collector"). In this case, a negative electrode active material layer is formed on a negative electrode current collector by adding a binder, thickener, conductive material, solvent or the like to the aforementioned negative electrode active material to form a slurry, coating this onto the negative electrode current collector and drying, followed by pressing to increase the density thereof.

Examples of materials of the negative electrode current collector include steel, copper alloy, nickel, nickel alloy and stainless steel. Among these, copper foil is preferable from the viewpoints of easy processing into a thin film and costs.

The thickness of the negative electrode current collector is normally 1 m or more and preferably 5 m or more, and normally 100 μm or less and preferably 50 m or less. If the negative electrode current collector is excessively thick, capacity of the overall battery may decrease excessively, while if it is excessively thin, it becomes difficult to handle.

Furthermore, the surface of the negative electrode current collector is preferably preliminarily subjected to roughening treatment in order to improve binding effects with the negative electrode active material layer formed on the surface. Examples of methods used to roughen the surface include blasting treatment, rolling using rollers having a rough surface, mechanical polishing methods comprising polishing the current collector surface with sandpaper adhered with abrasive particles, a whetstone, an emery buff or wire brush equipped with steel wires and the like, electrolytic polishing and chemical polishing.

In addition, a perforated negative electrode current collector in the form of expanded metal or perforated metal can also be used to improve energy density per unit mass of a battery by reducing the mass of the negative electrode current collector. This type of negative electrode current collector allows the mass thereof to be changed as desired by changing the aperture ratio thereof. In addition, in the case of forming a negative electrode active material layer on both sides of this type of negative electrode current collector, the negative electrode active material layer is less susceptible to separation due to the riveting effect of the perforations. However, in the case the aperture ratio becomes excessively high, contact area between the negative electrode active material layer and negative electrode current collector becomes small, thereby conversely resulting in a decrease in adhesive strength.

The slurry used to form the negative electrode active material layer is normally fabricated by adding a binder, thickener or the like to a negative electrode material. Furthermore, a "negative electrode material" in the present description refers to a material obtained by combining a negative electrode active material and a conductive material.

The content of negative electrode active material in the negative electrode material is normally 70% by mass or more and particularly preferably 75% by mass or more, and normally 97% by mass or less and particularly preferably 95% by mass or less. If the content of negative electrode active material is excessively low, the capacity of a secondary battery using the resulting negative electrode tends to be insufficient, while if the content is excessively high, electrical conductivity for use as a negative electrode tends to be difficult to secure due to the content of conducting agent being relatively insufficient. Furthermore, in the case of combining the use of two or more negative electrode active materials, the total amount of negative electrode active material is to satisfy the aforementioned range.

Examples of conductive materials used in the negative electrode include metal materials such as copper and nickel, and carbon materials such as graphite and carbon black. One type of these materials may be used alone or two or more types may be used in combination in an arbitrary combination and ratio. When a carbon material is used for the conductive material in particular, the carbon material also acts as an active material, thereby making this preferable.

The content of conductive material in the negative electrode material is normally 3% by mass or more and particularly preferably 5% by mass or more, and normally 30% by mass or less and particularly preferably 25% by mass or less. If the content of conductive material is excessively low, electrical conductivity tends to be inadequate, while if the content is excessively high, since this results in a relative shortage of the content of negative electrode active material and the like, battery capacity and strength tend to decrease. Furthermore, in the case of combining the use of two or more conductive materials, the total amount of conductive material is to satisfy the aforementioned range.

Any binder can be used for the binder used in the negative electrode provided it is a material that is stable with respect to the solvent and electrolyte solution used during electrode production. Examples thereof include polyvinylidene fluoride, polytetrafluoroethylene, polyethylene, polypropylene, styrene-butadiene rubber, isoprene rubber, butadiene rubber, ethylene-acrylic acid copolymer and ethylene-methacrylic acid copolymer. One type of these may be used alone or two or more types may be used in combination in an arbitrary combination and ratio. The content of the binder based on 100 parts by mass of the negative electrode material is normally 0.5 parts by mass or more and particularly preferably 1 part by mass or more, and normally 10 parts by mass or less and particularly preferably 8 parts by mass or less. If the content of binder is excessively low, strength of the resulting negative electrode tends to be inadequate, while if the content is excessively high, since this results in a relative shortage in the content of negative electrode active material and the like, battery capacity and electrical conductivity tend to be inadequate. Furthermore, in the case of combining the use of two or more binders, the total amount of binder is to satisfy the aforementioned range.

Examples of thickeners used in the negative electrode include carboxymethyl cellulose, methyl cellulose, hydroxymethyl cellulose, ethyl cellulose, polyvinyl alcohol, oxidized starch, phosphorylated starch and casein. One type of these may be used alone or two or more types may be used in combination in an arbitrary combination and ratio. Although a thickener is to be used as necessary, in the case of using the thickener, the content of thickener in the negative electrode active material layer is such that it is normally used within the range of preferably 0.5% by mass to 5% by mass.

The slurry for forming the negative electrode active material layer is prepared by mixing a conducting agent, binder and thickener as necessary into the aforementioned negative electrode active material and using an aqueous solvent or organic solvent as a dispersion medium. Although water is normally used for the aqueous solvent, an organic solvent such as an alcohol, e.g., ethanol, or a cyclic amide, e.g., N-methylpyrrolidone can also be used in combination therewith within a range of 30% by mass or less with respect to the water. In addition, examples of organic solvents normally include cyclic amides such as N-methylpyrrolidone, linear amides such as N,N-dimethylformamide and N,N-dimethylacetoamide, aromatic hydrocarbons such as anisole, toluene and xylene, and alcohols such as butanol and cyclohexanol, and among these, cyclic amides such as N-methylpyrrolidone and linear amides such as N,N-dimethylformamide and N,N-dimethylacetoamide are preferable. Furthermore, one type of these may be used alone or two or more types may be used in combination in an arbitrary combination and ratio.

The negative electrode active material layer is formed by coating the resulting slurry onto the aforementioned negative electrode current collector and drying followed by pressing. There are no particular limitations on the coating method and a known method can be used. There are also no particular limitations on the drying method, and a known method, such as air drying, heat drying or vacuum drying can be used.

<Constitution and Fabrication Method of Negative Electrode>

Any known method can be used to fabricate the electrode provided it does not significantly impair the effects of the present invention. For example, an electrode can be formed by adding a binder, solvent, and as necessary, a thickener, conducting material, filler and the like, to the negative electrode active material to form a slurry followed by coating this onto a current collector, drying and pressing.

In addition, in the case of using an alloy-based material, a method is used in which a thin film layer containing the aforementioned negative electrode active material (negative electrode active material layer) is formed by a technique such as deposition, sputtering or plating.

(Electrode Density)

Although there are no particular limitations on the electrode structure when forming the negative electrode active material into an electrode, the density of the negative electrode active material present on the current collector is preferably 1 g·cm$^{-3}$ or more, more preferably 1.2 g·cm$^{-3}$ or more and particularly preferably 1.3 g·cm$^{-3}$ or more, and preferably 2.2 g·cm$^{-3}$ or less, more preferably 2.1 g·cm$^{-3}$ or less, even more preferably 2.0 g·cm$^{-3}$ or less and particularly preferably 1.9 g·cm$^{-3}$ or less. If the density of the negative electrode active material present on the current collector exceeds the aforementioned range, negative electrode active material particles are destroyed, which may lead to an increase in initial irreversible capacity and exacerbation of high current density charging and discharging characteristics attributable to a decrease in permeability of the nonaqueous electrolyte solution into the vicinity of the interface between the current collector and negative electrode active material. In addition, if the density is below the aforementioned range, electrical conductivity between negative electrode active materials may decrease, battery resistance may increase and capacity per unit volume may decrease.

2-2. Positive Electrode

<Positive Electrode Active Material>

The following provides a description of the positive electrode active material (lithium-transition metal-based compound) used in the positive electrode.

<Lithium-Transition Metal-Based Compound>

A lithium-transition metal-based compound refers to a compound having a structure that enables desorption and insertion of Li ions, and examples thereof include sulfides, phosphate compounds and lithium-transition metal compound oxides. Examples of sulfides include compounds having a two-dimensional layered structure such as TiS$_2$ and MoS$_2$, and Chevrel compounds having a rigid, three-dimensional framework structure represented by the general formula Me$_x$Mo$_6$S$_8$ (wherein, Me represents various types of transition metals including Pb, Ag and Cu). Examples of phosphate compounds include those categorized as having an olivine structure and typically represented by the formula LiMePO$_4$ (wherein, Me represents at least one type of transition metal), specific examples of which include LiFePO$_4$, LiCoPO$_4$, LiNiPO$_4$ and LiMnPO$_4$. Examples of lithium-transition metal compound oxides include those categorized as having a spinel structure enabling three-dimensional diffusion and those categorized as having a layered structure enabling two-dimensional diffusion of lithium ions. Those having a spinel structure are typically represented by the formula LiMe$_2$O$_4$ (wherein, Me represents at least one type of transition metal), and specific examples thereof include LiMn$_2$O$_4$, LiCoMnO$_4$, LiNi$_{0.5}$Mn$_{1.5}$O$_4$ and LiCoVO$_4$.

Those having a layered structure are typically represented by the formula LiMeO$_2$ (wherein, Me represents at least one type of transition metal), and specific examples thereof include LiCoO$_2$, LiNiO$_2$, LiNi$_{1-x}$Co$_x$O$_2$, LiNi$_{1-x-y}$Co$_x$M-n$_y$O$_2$, LiNi$_{0.5}$Mn$_{0.5}$O$_2$, Li$_{1.2}$Cr$_{0.4}$Mn$_{0.4}$O$_2$, Li$_{1.2}$Cr$_{0.4}$Ti$_{0.4}$O$_2$ and LiMnO$_2$.

<Composition>

In addition, examples of lithium-containing transition metal compounds include lithium-transition metal-based compounds represented by the following compositional formula (D) or (E).

1) Case of a Lithium-Transition Metal-Based Compound Represented by the following Compositional Formula (D)

$$Li_{1+x}MO_2 \tag{D}$$

In the above formula, x is normally 0 to 0.5. M represents an element composed of Ni and Mn or Ni, Mn and Co, and the molar ratio of Mn/Ni is normally 0.1 to 5. The molar ratio of Ni/M is normally 0 to 0.5. The molar ratio of Co/M is normally 0 to 0.5. Furthermore, the lithium-rich portion represented by x may substitute on a transition metal site M.

Furthermore, in the aforementioned compositional formula (D), although the atomic ratio of the amount of oxygen is described as 2 for the sake of convenience, it may also have a certain degree of non-stoichiometry. In addition, x in the aforementioned compositional formula indicates the charged composition at the production stage of the lithium-transition metal-based compound. Normally, batteries available on the market undergo aging following battery assembly. Consequently, the amount of Li of the positive electrode may be deficient accompanying charging and discharging. In this case, x may be measured at −0.65 to 1 in terms of composition analysis of discharging the battery to 3 V.

In addition, firing the lithium-transition metal-based compound by carrying out high-temperature firing in a gaseous atmosphere containing oxygen results in superior battery properties since this enhances the crystallinity of the positive electrode active material.

Moreover, the lithium-transition metal-based compound represented by compositional formula (D) may also be in the form of a solid solution with Li$_2$MO$_3$ referred to as layer 213 as indicated in the following general formula (D').

$$\alpha Li_2MO_3 \cdot (1-\alpha)LiM'O_2 \tag{D'}$$

In this general formula, a is a value that satisfies the relationship of 0<α<1.

M represents at least one metal element in which the average oxidation number is 4+, and specific examples thereof include at least one metal element selected from the group consisting of Mn, Zr, Ti, Ru, Re and Pt.

M' represents at least one metal element in which the average oxidation number is 3+, is preferably at least one metal element selected from the group consisting of V, Mn, Fe, Co and Ni, and more preferably at least one metal element selected from the group consisting of Mn, Co and Ni.

2) Case of a Lithium-Transition Metal-Based Compound Represented by the following General Formula (E)

$$Li[Li_aM_bMn_{2-b-a}]O_{4+\delta} \tag{E}$$

In the above formula, M represents an element composed of at least one transition metal selected from Ni, Cr, Fe, Co, Cu, Zr, Al and Mg.

The value of b is normally 0.4 to 0.6.

If the value of b is within this range, energy density per unit mass is high in the lithium-transition metal-based compound.

In addition, the value of a is normally 0 to 0.3. In addition, a in the aforementioned compositional formula indicates the charged composition at the production stage of the lithium-transition metal-based compound. Normally, batteries available on the market undergo aging following battery assembly. Consequently, the amount of Li of the positive electrode may be deficient accompanying charging and discharging. In this case, a may be measured at −0.65 to 1 in terms of composition analysis of discharging the battery to 3 V.

If the value of a is within this range, favorable load characteristics are obtained without greatly impairing the energy density per unit mass in the lithium-transition metal-based compound.

Moreover, the value of 5 is normally within the range of ±0.5.

If the value of 8 is within this range, stability of the crystal structure is high and the cycle characteristics and high-temperature storage of a battery having an electrode fabricated using this lithium-transition metal-based compound are favorable.

The following provides a detailed explanation of the chemical significance of the lithium composition in the composition of the lithium-transition metal-based compound in the form of a lithium-nickel-manganese-based compound oxide. In order to determine the values of a and b in the compositional formula of the aforementioned lithium-transition metal-based compound, respective transition metals and lithium are analyzed with an inductively coupled plasma atomic emission spectrometer (ICP-AES) followed by determining the ratio of Li/Ni/Mn and then calculating the values.

From a structural viewpoint, lithium relating to a is thought to be inserted by substituting on the same transition metal site. Here, the average valence of M and manganese becomes larger than 3.5 according to the charge neutrality principle due to the lithium relating to a.

In addition, the aforementioned lithium-transition metal-based compound may also be substituted with fluorine and represented as $LiMn_2O_{4-x}F_{2x}$.

<Blending>

Specific examples of lithium-transition metal-based compounds having the aforementioned composition include $Li_{1+x}Ni_{0.5}Mn_{0.5}O_2$, $Li_{1+x}Ni_{0.85}Co_{0.10}Al_{0.05}O_2$, $Li_{1+x}Ni_{0.33}Mn_{0.33}Co_{0.33}O_2$, $Li_{1+x}Ni_{0.45}Mn_{0.45}Co_{0.1}O_2$, $Li_{1+x}Mn_{1.8}Al_{0.2}O_4$ and $Li_{1+x}Mn_{1.5}Ni_{0.5}O_4$. One type of these lithium-transition metal-based compounds may be used alone or two or more types may be used by blending.

<Heteroelement Introduction>

In addition, the lithium-transition metal-based compound may be introduced with a heteroelement. The heteroelement is selected from any of one or more types consisting of B, Na, Mg, Al, K, Ca, Ti, V, Cr, Fe, Cu, Zn, Sr, Y, Zr, Nb, Ru, Rh, Pd, Ag, In, Sb, Te, Ba, Ta, Mo, W, Re, Os, Ir, Pt, Au, Pb, La, Ce, Pr, Nd, Sm, Eu, Gd, Tb, Dy, Ho, Er, Tm, Yb, Lu, Bi, N, F, S, Cl, Br, I, As, Ge, P, Pb, Sb, Si and Sn. These heteroelements may be incorporated within the crystal structure of the lithium-transition metal-based compound or may be unevenly distributed as single substances or compounds on particle surface or crystal grain boundary without being incorporated within the crystal structure of the lithium-transition metal-based compound.

[Positive Electrode for Lithium Secondary Battery]

A positive electrode for a lithium secondary battery is obtained by forming a positive electrode active material layer, containing the aforementioned lithium-transition metal-based compound powders for a positive electrode material of a lithium secondary battery and a binder, on a current collector.

The positive electrode active material layer is fabricated by pressing the product of dry-mixing a positive electrode material, binder, and a conductive material, thickener and the like used as necessary and forming into a sheet onto a positive electrode current collector, or by dissolving or dispersing these materials in a liquid medium to obtain a slurry followed by coating onto a positive electrode current collector and drying.

A metal material such as aluminum, stainless steel, nickel plating, titanium, tantalum, or a carbon material such as carbon cloth or carbon paper is normally used for the material of the positive electrode current collector. In addition, examples of the form thereof in the case of a metal material include a metal foil, metal cylinder, metal coil, metal plate, metal thin film, expanded metal, perforated metal and metal foam, while those in the case of a carbon material include a carbon plate, carbon thin film and carbon cylinder. Furthermore, the thin film may be suitably formed into the form of a mesh.

In the case of using a thin film for the positive electrode current collector, although the thickness thereof is arbitrary, normally it is preferably within a range of 1 jam to 100 mm. If the thickness is below the aforementioned range, there is the possibility of the strength required for use as a current collector being insufficient, while on the other hand, if the thickness exceeds the aforementioned range, there is the possibility of handling being impaired.

Although there are no particular limitations on the binder used to produce the positive electrode active material layer provided it is a material that is stable with respect to the liquid medium used when producing the electrode in the case of a coating method, specific examples thereof include resin polymers such as polyethylene, polypropylene, polyethylene terephthalate, polymethyl methacrylate, aromatic polyamides, cellulose and nitrocellulose, rubber-like polymers such as styrene-butadiene rubber (SBR), acrylonitrile-butadiene rubber (NBR), fluorine-containing rubber, isoprene rubber, butadiene rubber and ethylene-propylene rubber, thermoplastic elastomer-like polymers such as styrene-butadiene-styrene block copolymers and hydrogenation products thereof, ethylene-propylene-diene ternary copolymers (EPDM), styrene-ethylene-butadiene-ethylene copolymers and styrene-isoprene-styrene block copolymers and hydrogenation products thereof, soft resin-like polymers such as syndiotactic 1,2-polybutadiene, polyvinyl acetate, ethylene-vinyl acetate copolymers and propylene-α-olefin copolymers, fluorine-based polymers such as polyvinylidene fluoride, polytetrafluoroethylene, fluorinated polyvinylidene fluoride and polytetrafluoroethylene-ethylene copolymers, and polymer compositions having ion conductivity of alkaline metal ions (particularly lithium ions). Furthermore, one type of these substances may be used alone or two or more types may be used in combination in an arbitrary combination and ratio.

The ratio of binder in the positive electrode active material layer is normally 0.1% by mass to 80% by mass. If the ratio of binder is excessively low, there is the possibility of mechanical strength of the positive electrode being insufficient preventing it from being able to retain the positive electrode active material while also causing exacerbation of battery performance with respect to cycle characteristics and the like, and on the other hand, if the ratio of binder is excessively high, there is the possibility of this leading to a decrease in battery capacity and electrical conductivity.

A conductive material for enhancing electrical conductivity is normally contained in the positive electrode active material layer. There are no particular limitations on the type thereof, and specific examples include metal materials such as copper and nickel, and carbon materials such as graphite in the form of natural graphite and artificial graphite, carbon black in the form of acetylene black, and amorphous carbon in the form of needle coke. Furthermore, one type of these substances may be used alone or two or more types may be used in combination in an arbitrary combination and ratio. The ratio of conductive material in the positive electrode active material layer is normally 0.01% by mass to 50% by mass. If the ratio of conductive material is excessively low, electrical conductivity may be inadequate, while if the ratio is excessively high, battery capacity may decrease.

There are no particular limitations on the type of liquid medium for forming the slurry provided it is a solvent that is capable of dissolving or dispersing the positive electrode materials, i.e., the lithium-transition metal-based compound powders, binder, and the conductive material and thickener used as necessary, and an aqueous solvent or organic solvent may be used. Examples of aqueous solvents include water and alcohol, while examples of organic solvents include N-methylpyrrolidone (NMP), dimethylformamide, dimethylacetoamide, methyl ethyl ketone, cyclohexanone, methyl acetate, methyl acrylate, diethyltriamine, N,N-dimethylaminopropylamine, ethylene oxide, tetrahydrofuran (THF), toluene, acetone, dimethyl ether, dimethylacetamide, hexamethylphosphoramide, dimethylsulfoxide, benzene, xylene, quinoline, pyridine, methylnaphthalene and hexane. In the case of using an aqueous solvent in particular, a dispersant is added together with thickener followed by forming into a slurry using SBR or other type of latex. Furthermore, one type of these solvents may be used alone or two or more types may be used in combination in an arbitrary combination and ratio.

The content ratio of the lithium-transition metal-based compound powders used for the positive electrode material in the positive electrode active material layer is normally 10% by mass to 99.9% by mass. If the ratio of lithium-transition metal-based compound powders in the positive electrode active material layer is excessively high, strength of the positive electrode tends to be inadequate, while if the ratio is excessively low, the resulting battery is inadequate in terms of capacity.

In addition, the thickness of the positive electrode active material layer is normally about 10 µm to 200 km.

The electrode density of the positive electrode after pressing is normally 2.2 g/cm$^3$ to 4.2 g/cm$^3$.

Furthermore, after obtaining the positive electrode active material layer by coating and drying, the layer is preferably subjected to consolidation by roller pressing and the like in order to increase the packing density of the positive electrode active material.

A positive electrode for a lithium secondary battery can be prepared in this manner.

2-3. Separator

A separator is normally interposed between the positive electrode and negative electrode in order to prevent short-circuit. In this case, the nonaqueous electrolyte solution of the present invention is normally used by impregnating the separator with this solution.

There are no particular limitations on the material or shape of the separator, and a known separator can be arbitrarily employed provided it does not significantly impair the effects of the present invention. Among these, a material such as resin, glass fiber or an inorganic substance, which has been formed with a material that is stable with respect to the nonaqueous electrolyte solution of the present invention, is used, and those in the form of a porous sheet or nonwoven fabric having superior liquid retention is used preferably.

Examples of resin and glass fiber separator materials include polyolefins such as polyethylene and polypropylene, aromatic polyamides, polytetrafluoroethylene, polyether sulfone and glass filters. Among these, glass filters and polyolefins are preferable, and polyolefins are more preferable. One type of these materials may be used alone or two or more types may be used in combination in an arbitrary combination and ratio.

Although the thickness of the separator is arbitrary, it is normally 1 m or more, preferably 5 µm or more and more preferably 10 µm or more, and normally 50 µm or less, preferably 40 µm or less and more preferably 30 µm or less. If the thickness of the separator is far below the aforementioned range, insulating properties and mechanical strength may decrease. If the thickness of the separator greatly exceeds the aforementioned range, not only battery performance with respect to rate characteristics and the like, but also energy density in terms of the entire nonaqueous electrolyte secondary battery may decrease.

Moreover, although the porosity of the separator is arbitrary in the case of using a porous material such as a porous sheet or nonwoven fabric for the separator, it is normally 20% or more, preferably 35% or more and more preferably 45% or more, and normally 90% or less, preferably 85% or less and more preferably 75% or less. If porosity is far below the aforementioned range, film resistance may become large which tends to cause exacerbation of rate characteristics. In addition, if porosity greatly exceeds the aforementioned range, mechanical strength and insulating properties of the separator tend to decrease.

In addition, although the average pore diameter of the separator is also arbitrary, it is normally 0.5 µm or less and preferably 0.2 µm or less, and normally 0.05 µm or more. If the average pore diameter exceeds the aforementioned range, there may be increased susceptibility to the occurrence of short-circuit. In addition, if the average pore diameter is below the aforementioned range, film resistance may become large and rate characteristics may decrease.

On the other hand, an oxide such as alumina and silicon dioxide, a nitride such as aluminum nitride and silicon nitride, and a sulfate such as barium sulfate and calcium sulfate is used as an inorganic material, and they are used in the form of particles or fibers.

Those in a thin film shape, e.g., a nonwoven fabric, woven fabric, microporous film and the like are used for the form of the separator. In the case of a thin film shape, that having a pore diameter of 0.01 µm to 1 µm and thickness of 5 µm to 50 am is used preferably. In addition to the aforementioned independent thin film shapes, a separator can be used that is obtained by forming a compound porous layer containing particles of the aforementioned inorganic material on the surface layer of the positive electrode and/or negative electrode using a resin binder. For example, alumina particles having a 90% particle diameter of less than 1 m are made to form a porous layer on both sides of a positive electrode by using fluororesin as binder.

The characteristics of the separator in the nonaqueous electrolyte secondary battery can be determined using the Gurley value. The Gurley value refers to the difficulty at which air is able to pass through a film in the direction of film thickness, and since it is represented as the number of seconds required for 100 ml of air to pass through the film, a smaller value indicates greater ease of passage, while a larger value indicates greater difficulty of passage. Namely, a small value means that communication of the film in the direction of film thickness is favorable, while a large value means that communication of the film in the direction of film thickness is poor. Communication refers to the degree at which pores are connected in the direction of film thickness. If the Gurley value of the separator of the present invention is low, it can be used in various applications. For example, in the case of using as the separator of a nonaqueous lithium secondary battery, a low Gurley value means that lithium ions are able to easily move, resulting in superior battery performance and thereby making this preferable. Although the Gurley value of the separator is arbitrary, it is preferably 10 seconds/100 ml to 1000 seconds/100 ml, more preferably 15 seconds/100 ml to 800 seconds/100 ml, and even more preferably 20 seconds/100 ml to 500 seconds/100 ml. If the Gurley value is 1000 seconds/100 ml or less, electrical resistance is substantially low, thereby making it preferable for use as a separator.

2.4 Battery Design

<Electrode Group>

The electrode group has a layered structure in which the aforementioned separator is interposed between the aforementioned positive electrode plate and negative electrode plate, or has a structure in which the aforementioned positive electrode plate and negative electrode plate are wound in the form of a spiral with the aforementioned separator interposed therebetween. The proportion of the volume of the electrode group to the volume inside the battery (to be referred to as the electrode group occupancy rate) is normally 40% or more and preferably 50% or more, and normally 90% or less and preferably 80% or less.

If the battery group occupancy rate is below the aforementioned range, battery capacity becomes small. In addition, if the battery group occupancy rate exceeds the aforementioned range, there is a shortage of void space and members may expand or vapor pressure of liquid components of the electrolyte may increase as a result of the battery reaching a high temperature, thereby causing an increase in internal pressure which may lower repeated charge/discharge performance or various characteristics such as high-temperature storage characteristics of the battery, and ultimately result in activation of a gas release valve that releases internal pressure to the outside.

<Outer Package Case>

There are no particular limitations on the material of the outer package case provided it is a substance that is stable with respect to the nonaqueous electrolyte solution used. More specifically, metals such as nickel-plated steel plate, stainless steel, aluminum or aluminum alloy and magnesium alloy, or laminated films of resin and aluminum foil are used. From the viewpoint of reducing weight, a metal consisting of aluminum or aluminum alloy or a laminated film is used preferably.

Examples of outer package cases using metals include those having a sealed structure obtained by welding pieces of metal by laser welding, resistance welding or ultrasonic welding, and those having a caulked structure obtained by using the aforementioned metals via a resin gasket. Examples of outer package cases using the aforementioned laminated film include those having a sealed structure obtained by thermal fusion bonding of corresponding resin layers. A resin differing from the resin used for the laminated film may be interposed between the aforementioned resin layers in order to enhance sealability. In particular, since resin and metal are joined in the case of employing a sealed structure obtained by thermal fusion bonding of resin layers via a collecting terminal, a resin having a polar group or a modified resin introduced with a polar group is preferably used as the resin.

<Protective Element>

A positive temperature coefficient (PTC), for which the resistance thereof increases during abnormal generation of heat or an excessively large current flow, a temperature fuse, a thermistor, or a valve that interrupts the flow of current to a circuit due to a sudden increase in battery internal pressure or internal temperature during abnormal generation of heat (current cutoff valve) and the like can be used as a protective element. An element that uses conditions such that it does not activate during normal use at high current is preferably selected for the aforementioned protective element, and more preferably a design is employed that does not result in abnormal generation of heat or thermal runaway even a protective element is not present.

(Outer Package)

The nonaqueous electrolyte secondary battery of the present invention is normally composed by housing the previously described nonaqueous electrolyte solution, negative electrode, positive electrode, separator and the like in an outer package (outer package case). There are no limitations on this outer package, and a known outer package can be arbitrarily employed provided it does not significantly impair the effects of the present invention.

There are no particular limitations on the material of the outer package case provided it is a substance that is stable with respect to the nonaqueous electrolyte solution used. More specifically, metals such as nickel-plated copper plate, stainless steel, aluminum or aluminum alloy, magnesium alloy, nickel and titanium, or laminated films of resin and aluminum foil are used. From the viewpoint of reducing weight, a metal consisting of aluminum or aluminum alloy and a laminated film are used preferably.

Examples of outer package cases using the aforementioned metals include those having a sealed structure obtained by welding pieces of metal by laser welding, resistance welding or ultrasonic welding, and those having a caulked structure obtained by using the aforementioned metals via a resin gasket. Examples of outer package cases using the aforementioned laminated film include those having sealed structure obtained by thermal fusion bonding of corresponding resin layers. A resin differing from the resin used for the laminated film may be interposed between the aforementioned resin layers in order to enhance sealability. In particular, since metal and resin are joined in the case of employing a sealed structure obtained by thermal fusion bonding of resin layers via a collecting terminal, a resin having a polar group or a modified resin introduced with a polar group is preferably used as the resin.

In addition, the shape of the outer package case is also arbitrary, and may be cylindrical, square, laminated, coin-shaped or large-sized.

II. Second Embodiment

3. Nonaqueous Electrolyte Solution

The nonaqueous electrolyte solution of the present invention contains an electrolyte and a nonaqueous solvent that dissolves the electrolyte in the same manner as an ordinary nonaqueous electrolyte solution, and is characterized in that it contains a compound represented by the aforementioned general formula (1).

3-1. Compound Represented by General Formula (1)

The nonaqueous electrolyte solution of the present invention is characterized in that it contains a compound represented by the following general formula (1).

[Chemical 26]

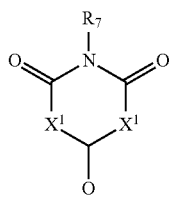

(1)

In the above formula, $X^1$ and $X^2$ independently represent $NR_8$, $NR_8R_9$ or $CR_8R_9$, and $R_7$ to $R_9$ respectively and independently represent a hydrogen atom, fluorine atom, alkyl group, alkenyl group, alkynyl group or aryl group, and at least one of $R_7$ to $R_9$ represents a group having a cyano group and may be mutually the same or different. An alkyl group or alkenyl group is preferable, and an alkyl group is more preferable. Furthermore, in the case $R_7$ to $R_9$ are alkyl groups, alkenyl groups, alkynyl groups or aryl groups, a portion or all of the hydrogen atoms contained therein may be substituted with a fluorine atom.

Specific examples of alkyl groups include a methyl group, ethyl group, n-propyl group, isopropyl group, n-butyl group, s-butyl group, t-butyl group, amyl group, t-amyl group and 2-ethylhexyl group. The alkyl group may have a substituent other than a cyano group, and the substituent is preferably an acetate ester group (—$OCOCH_3$).

Specific examples of alkenyl groups include a vinyl group, allyl group and 2-butenyl group.

Specific examples of alkynyl groups include an ethynyl group and propargyl group.

Specific examples of aryl groups include a phenyl group, 2-tolyl group, 3-tolyl group, 4-tolyl group, 2-t-butylphenyl group, 3-t-butylphenyl group, 4-t-butylphenyl group, 2-t-amylphenyl group, 3-t-amylphenyl group and 4-t-amylphenyl group.

Specific examples of compound represented by the aforementioned general formula (1) include compounds represented by the following structural formulas (2) to (9), N,N',N''-tris(2-cyanoethyl)isocyanurate (structural formula (2)), N,N'-bis(2-cyanoethyl)-N''-allylisocyanurate (structural formula (3)), N,N'-bis(2-cyanoethyl)isocyanurate (structural formula (4)), 1,1-bis(2-cyanoethyl)-N,N'-dimethyl barbiturate (structural formula (5)), N,N'-bis(2-cyanoethyl)-N''-propyl isocyanurate (structural formula (6)), N,N'-bis(2-cyanoethyl)-N''-2-carboxyethylmethyl isocyanurate (structural formula (7)), N,N'-bis(2-carboxyethylmethyl)-N''-2-cyanoethyl isocyanurate (structural formula (8)), and N,N'-bisallyl-N''-2-cyanoethyl isocyanurate (structural formula (9)), compounds represented by the following structural formulas (2) to (5) are preferable, and a compound represented by the following structural formula (2) is more preferable.

[Chemical 27]

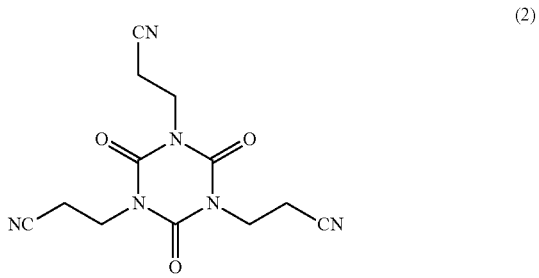

(2)

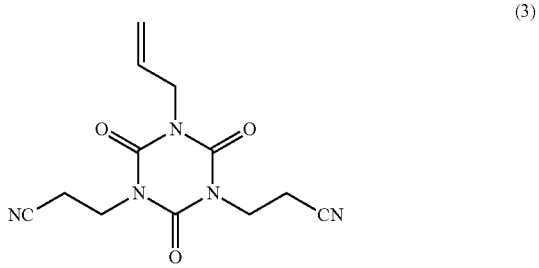

(3)

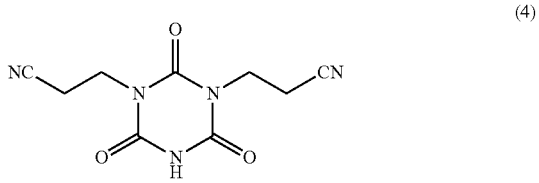

(4)

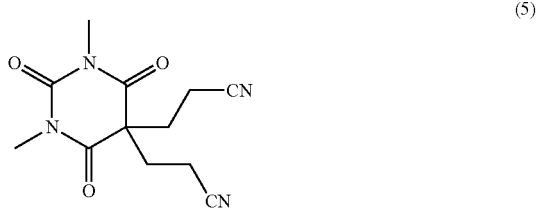

(5)

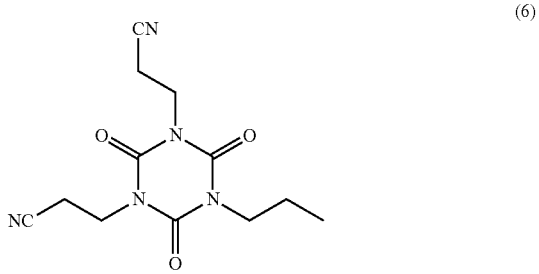

(6)

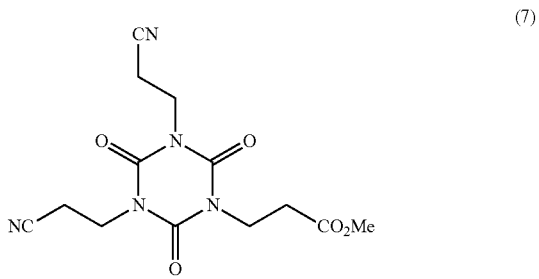

(7)

-continued

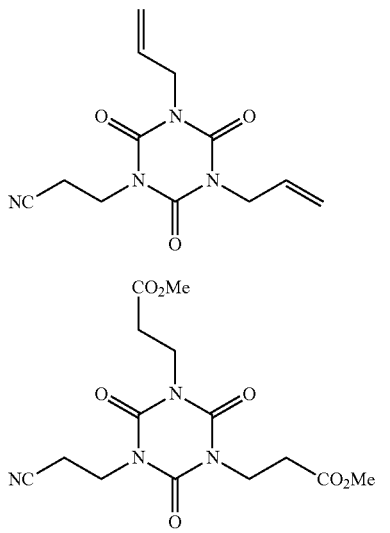

Although there are no particular limitations on the content of a compound represented by the aforementioned general formula (1), it is normally 0.001% by mass or more, preferably 0.01% by mass or more, more preferably 0.1% by mass or more and even more preferably 0.2% by mass or more, and normally 10% by mass or less, preferably 7% by mass or less and more preferably 5% by mass or less with respect to the nonaqueous electrolyte solution. If the content of the compound represented by the aforementioned general formula (1) is within the aforementioned range, the effects of the present invention are adequately demonstrated. Furthermore, although one type of the compound represented by the aforementioned general formula (1) may be used alone or two or more types may be used in combination, in the case of using a plurality of types in combination, the aforementioned content represents the total amount of the plurality of types.

In the case of using an electrolyte solution containing a compound represented by the aforementioned general formula (1), increases in resistance and decreases in capacity are inhibited during high-temperature storage in a charged state. Although the detailed mechanism responsible for this is not clear, a compound represented by the aforementioned general formula (1) is thought to inhibit increases in resistance caused by accumulation of degradation products by inhibiting side reactions as a result of acting on the positive electrode active material. Moreover, decreases in capacity are also thought to be inhibited as a result thereof.

The nonaqueous electrolyte solution of the present invention preferably contains a compound represented by the following general formula (10):

[Chemical 28]

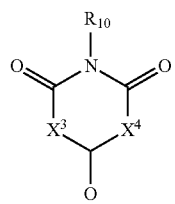

(wherein, $X^3$ and $X^4$ independently represent $NR_{11}$ or $NR_{11}R_{12}$, and $R_{10}$ to $R_{12}$ respectively and independently represent a 2-cyanoethyl group, hydrogen atom, alkyl group having 1 to 3 carbon atoms, vinyl group, allyl group or 2-ethyl acetate group, and at least one of $R_{10}$ to $R_{12}$ represents a 2-cyanoethyl group and may be mutually the same or different).

Preferably, in formula (10), $X^3$ and $X^4$ independently represent $NR_{11}$ or $NR_{11}R_{12}$, $R_{10}$ to $R_{12}$ respectively and independently represent a 2-cyanoethyl group, hydrogen atom, alkyl group having 1 to 3 carbon atoms, vinyl group or allyl group, and at least two of $R_{10}$ to $R_{12}$ represent 2-cyanoethyl groups. More preferably, in formula (10), $X^3$ and $X^4$ are both $NR_{11}$ and both $R_{10}$ and $R_{11}$ represent 2-cyanoethyl groups.

3-2. Electrolyte

There are no limitations on the electrolyte used in the nonaqueous electrolyte solution of the present invention, and a known electrolyte can be arbitrarily employed provided it is used as an electrolyte in the target nonaqueous electrolyte secondary battery. A lithium salt is normally used for the electrolyte in the case of using the nonaqueous electrolyte solution of the present invention in a lithium secondary battery.

Specific examples of electrolytes include inorganic lithium salts such as $LiClO_4$, $LiAsF_6$, $LiPF_6$, $Li_2CO_3$ and $LiBF_4$; fluorine-containing organic lithium salts such as $LiCF_3SO_3$, $LiN(CF_3SO_2)_2$, $LiN(C_2F_5SO_2)_2$, lithium cyclic 1,3-hexafluoropropane disulfonyl imide, lithium cyclic 1,2-tetrafluoroethane disulfonyl imide, $LiN(CF_3SO_2)(C_4F_9SO_2)$, $LiC(CF_3SO_2)_3$, $LiPF_4(CF_3)_2$, $LiPF_4(C_2F_5)_2$, $LiPF_4(CF_3SO_2)_2$, $LiPF_4(C_2F_5SO_2)_2$, $LiBF_2(CF_3)_2$, $LiBF_2(C_2F_5)_2$, $LiBF_2(CF_3SO_2)_2$ and $LiBF_2(C_2F_5SO_2)_2$; and, dicarboxylic acid-containing complex lithium salts such as lithium difluoro oxalatoborate, lithium bis(oxalato)borate, lithium tris(oxalato)phosphate, lithium difluoro oxalatoborate and lithium difluorobis(oxalato)phosphate.

Among these, $LiPF_6$, $LiBF_4$, $LiN(CF_3SO_2)_2$ and $LiN(C_2F_5SO_2)_2$ are preferable, and $LiPF_6$ and $LiBF_4$ are particularly preferable from the viewpoint of stability in the battery.

In addition, one type of electrolytes may be used alone or two or more types may be used in combination in an arbitrary combination and ratio. Among these, if two types of specific inorganic lithium salts are used in combination or an inorganic lithium salt and fluorine-containing organic lithium salt are used in combination, gas generation during trickle charging is inhibited or deterioration following high-temperature storage is inhibited, thereby making this preferable. The combined use of $LiPF_6$ and $LiBF_4$ or the combined use of an inorganic lithium salt such as $LiPF_6$ or $LiBF_4$ and a fluorine-containing organic lithium salt such as $LiCF_3SO_3$, $LiN(CF_3SO_2)_2$ or $LiN(C_2F_5SO_2)_2$, is particularly preferable.

Moreover, in the case of combining the use of $LiPF_6$ and $LiBF_4$, the amount of $LiBF_4$ contained based on the total amount of electrolyte is normally 0.001% by mass or more, preferably 0.01% by mass or more, more preferably 0.05% by mass or more and particularly preferably 0.1% by mass or more, and normally 50% by mass or less, preferably 20% by mass or less, more preferably 10% by mass or less, particularly preferably 5% by mass or less, and most preferably 3% by mass or less. As a result of making this ratio 0.001% by mass or more, desired effects are easily obtained, while as a result of making this ratio 50% by mass or less, increases in resistance of the electrolyte solution are inhibited due to the low degree of dissociation of $LiBF_4$.

On the other hand, in the case of combining the use of an inorganic lithium salt such as $LiPF_6$ or $LiBF_4$ and a fluorine-containing organic lithium salt such as $LiCF_3SO_3$, $LiN(CF_3SO_2)_2$ or $LiN(C_2F_5SO_2)_2$, normally, the ratio of inorganic lithium salt in the total amount of electrolyte is preferably within the range of 70% by mass to 99% by mass.

Although the concentration of lithium salt in the nonaqueous electrolyte solution of the present invention is arbitrary provided the gist of the present invention is not impaired, it is normally 0.5 mol/L or more, preferably 0.6 mol/L or more and more preferably 0.8 mol/L or more. In addition, this concentration is normally 3 mol/L or less, preferably 2 mol/L or less, more preferably 1.8 mol/L or less and even more preferably 1.6 mol/L or less. As a result of making this concentration to be within the aforementioned range, electrical conductivity of the nonaqueous electrolyte solution is adequate and decreases in electrical conductivity caused by an increase in viscosity are inhibited.

3-3. Nonaqueous Solvent

A nonaqueous solvent conventionally known as a solvent of a nonaqueous electrolyte solution can be suitably selected and used for the nonaqueous solvent contained by the nonaqueous electrolyte solution of the present invention. Furthermore, one type of nonaqueous solvent may be used alone or two or more types may be used in combination in an arbitrary combination and ratio.

Examples of nonaqueous solvents normally used include cyclic carbonates, linear carbonates, linear and cyclic carboxylate esters, linear and cyclic ethers, phosphorous-containing organic solvents and sulfur-containing organic solvents.

Examples of cyclic carbonates include alkylene carbonates such as ethylene carbonate, propylene carbonate or butylene carbonate and fluorinated alkylene carbonates such as fluoroethylene carbonate and difluoroethylene carbonate, and the number of carbon atoms of alkylene carbonates and fluorinated alkylene carbonates is normally 3 to 5.

Among these, ethylene carbonate, propylene carbonate and fluoroethylene carbonate are preferable from the viewpoints of facilitating dissolution of electrolyte due to their high dielectric constant and resulting in favorable cycle characteristics when used in a nonaqueous electrolyte secondary battery, and ethylene carbonate and fluoroethylene carbonate are particularly preferable.

Examples of linear carbonates include dialkyl carbonates such as dimethyl carbonate, ethyl methyl carbonate, diethyl carbonate, methyl n-propyl carbonate, ethyl n-propyl carbonate, di-n-propyl carbonate, 2,2,2-trifluoroethyl methyl carbonate and bis(2,2,2-trifluoroethyl) carbonate, and the number of carbons of the constituting alkyl groups is preferably 1 to 5 and particularly preferably 1 to 4 each. In addition, a portion or all of the hydrogen atoms of alkyl groups may be substituted with a fluorine atom. Among these, dimethyl carbonate, diethyl carbonate and ethyl methyl carbonate are preferable from the viewpoint of improving battery properties.

Examples of linear carboxylate esters include methyl acetate, ethyl acetate, propyl acetate, isopropyl acetate, butyl acetate, sec-butyl acetate, isobutyl acetate, t-butyl acetate, amyl acetate, methyl propionate, ethyl propionate, propyl propionate, isopropyl propionate, methyl butyrate, ethyl butyrate, propyl butyrate, methyl valerate and ethyl valerate, and compounds in which a portion of hydrogens in these compounds have been substituted with a fluorine atom, such as trifluoropropyl acetate and trifluorobutyl acetate, and the total number of carbon atoms of the linear carboxylate ester is normally 3 to 10 and preferably 4 to 7. Among these, ethyl acetate, propyl acetate, isopropyl acetate, butyl acetate, amyl acetate, methyl propionate, ethyl propionate, propyl propionate, methyl butyrate, ethyl butyrate and methyl valerate are more preferable.

Examples of cyclic carboxylate esters include γ-butyrolactone, γ-valerolactone, δ-valerolactone. Among these, γ-butyrolactone is more preferable.

Moreover, examples of linear ethers include dimethoxymethane, dimethoxyethane, diethoxymethane, diethoxyethane, ethoxymethoxymethane and ethoxymethoxyethane. Among these, dimethoxyethane and diethoxyethane are more preferable.

Examples of cyclic ethers include tetrahydrofuran and 2-methyltetrahydrofuran.

Moreover, although there are no particular limitations thereon, examples of normally used phosphorous-containing organic solvents include phosphate esters such as trimethyl phosphate, triethyl phosphate and triphenyl phosphate, phosphite esters such as trimethyl phosphite, triethyl phosphite and triphenyl phosphite, phosphine oxides such as trimethyl phosphine oxide, triethyl phosphine oxide and triphenyl phosphine oxide, and phosphazenes.

Examples of sulfur-containing organic solvents include ethylene sulfite, 1,3-propane sultone, 1,4-butane sultone, methyl methanesulfonate, ethyl methanesulfonate, busulfan, sulfolane and sulfolene.

Among the aforementioned nonaqueous solvents, the use of at least one selected from cyclic carbonates in the form of ethylene carbonate, propylene carbonate and fluoroethylene carbonate is preferable, and the combined use of these with at least one selected from linear carbonates in the form of dimethyl carbonate, ethyl methyl carbonate and diethyl carbonate is preferable from the viewpoints of viscosity and electrical conductivity of the electrolyte solution.

In the case of combining the use of a cyclic carbonate and linear carbonate for a nonaqueous solvent in this manner, the preferable content of linear carbonate in the nonaqueous solvent of the nonaqueous electrolyte solution of the present invention is normally 20% by volume or more and preferably 40% by volume or more, and normally 95% by volume or less and preferably 90% by volume or less. On the other hand, the preferable content of cyclic carbonate in the nonaqueous solvent of the nonaqueous electrolyte solution of the present invention is normally 5% by volume or more and preferably 10% by volume or more, and normally 80% by volume or less and preferably 60% by volume or less. As a result of making the ratio of cyclic carbonate within the aforementioned range, increases in viscosity of the nonaqueous electrolyte solution of the present invention are inhibited, and decreases in electrical conductivity of the nonaqueous electrolyte solution of the present invention attributable to decreases in the degree of dissociation of the electrolyte in the form of a lithium salt are inhibited. However, fluoroethylene carbonate may be used as a solvent or as an additive, and in such cases the content is not limited to the aforementioned range.

Furthermore, in the present description, although the volume of the nonaqueous solvent refers to the value obtained by measuring at 25° C., the value obtained by measuring at the melting point is used for compounds that are a solid at 25° C., such as ethylene carbonate.

3-4. Other Additives

The nonaqueous electrolyte solution of the present invention may contain various types of additives within a range that does not significantly impair the effects of the present invention. Conventionally known additives can be arbitrarily used as additives. Furthermore, one type of additive may be used alone or two or more types may be used in combination in an arbitrary combination and ratio.

Examples of additives include overcharge preventive agents and assistants for improving cycle characteristics and capacity maintenance characteristics following high-temperature storage.

Specific examples of overcharge preventive agents include aromatic compounds such as biphenyl, alkylbiphenyl, terphenyl, partially hydrogenated terphenyl, cyclohexylbenzene, t-butylbenzene, t-amylbenzene, diphenyl ether and dibenzofuran; partial fluorides of the aforementioned aromatic compounds such as 2-fluorobiphenyl, o-cyclohexylfluorobenzene and p-cyclohexylfluorobenzene; and, fluorine-containing anisole compounds such as 2,4-difluoroanisole, 2,5-difluoroanisole and 2,6-difluoroanisole.

Furthermore, one type of these overcharge preventive agents may be used alone or two or more types may be used in combination in an arbitrary combination and ratio.

In the case the nonaqueous electrolyte solution of the present invention contains an overcharge preventive agent, although the concentration thereof is arbitrary provided it does not significantly impair the effects of the present invention, the concentration based on the total amount of the nonaqueous electrolyte solution is normally 0.1% by mass or more, preferably 0.2% by mass or more and more preferably 0.3% by mass or more, and normally 5% by mass or less, preferably 4% by mass or less and more preferably 3% by mass or less. As a result of containing the overcharge preventive agent in the nonaqueous electrolyte solution within the aforementioned range, rupturing or ignition of the nonaqueous electrolyte secondary battery due to overcharging can be inhibited, and safety of the nonaqueous electrolyte secondary battery can be improved, thereby making this preferable.

On the other hand, specific examples of assistants for improving cycle characteristics and capacity maintenance characteristics following high-temperature storage include vinylene carbonate compounds such as vinylene carbonate, methylvinylene carbonate, 4,5-dimethylvinylene carbonate, fluorovinylene carbonate and trifluoromethylvinylene carbonate, vinylethylene carbonate compounds such as vinylethylene carbonate, 4-methyl-4-vinylethylene carbonate, 5-methyl-4-vinylethylene carbonate, 4,4-divinylethylene carbonate and 4,5-divinylethylene carbonate; ethynylethylene carbonate compounds such as 4-ethynylethylene carbonate, 4,5-diethynylethylene carbonate, 4-methyl-4-ethynylethylene carbonate and 4-ethynyl-5-methylethylene carbonate; and, methylene ethylene carbonate compounds such as 4,4-dimethyl-5-methylene ethylene carbonate and 4-methylene ethylene carbonate.

Among these, vinylene carbonate, vinylethylene carbonate, 4-methyl-4-vinylethylene carbonate or 4,5-divinylethylene carbonate is preferable from the viewpoints of improving cycle characteristics and capacity maintenance characteristics following high-temperature storage, and vinylene carbonate or vinylethylene carbonate is particularly preferable. These may be used alone or two or more types may be used in combination.

In the case of combining the use of two or more types, the combined use of vinylene carbonate and vinylethylene carbonate is preferable.

In the case of containing a cyclic carbonate compound having a carbon-carbon unsaturated bond, the ratio thereof in the nonaqueous electrolyte solution is normally 0.01% by mass or more, preferably 0.1% by mass or more, more preferably 0.3% by mass or more and particularly preferably 0.5% by mass or more, and normally 10% by mass or less, preferably 8% by mass or less and more preferably 6% by mass or less. As a result of making the ratio of cyclic carbonate compound having a carbon-carbon unsaturated bond within the aforementioned range, the effects of improving battery cycle characteristics and capacity maintenance characteristics following high-temperature storage can be adequately demonstrated, and increases in the amount of gas generated during high-temperature storage are inhibited.

In addition, examples of cyclic carbonates having a halogen atom include fluoroethylene carbonate, 4,5-difluoroethylene carbonate, 4,4-difluoroethylene carbonate, 4,4,5-trifluoroethylene carbonate, 4,4,5,5-tetrafluoroethylene carbonate, 4-fluoro-5-methylethylene carbonate, 4-fluoro-4-methylethylene carbonate, 4,5-difluoro-4-methylethylene carbonate, 4,4,5-trifluoro-5-methylethylene carbonate and trifluoromethylethylene carbonate. Among these, fluoroethylene carbonate, 4,5-difluoroethylene carbonate and 4-fluoro-5-methylethylene carbonate are preferable from the viewpoints of improving cycle characteristics and high-temperature storage characteristics. These may be used alone or two or more types may be used in combination.

In the case the nonaqueous electrolyte solution contains a cyclic carbonate compound having a fluorine atom, the ratio thereof in the nonaqueous electrolyte solution is normally 0.001% by mass or more, preferably 0.1% by mass or more, more preferably 0.3% by mass or more and particularly preferably 0.5% by mass or more, and normally 30% by mass or less, preferably 20% by mass or less, and more preferably 10% by mass or less. However, as was explained in section "1-2. Nonaqueous Solvent", fluoroethylene carbonate may also be used as a solvent and in that case, the content is not limited to the aforementioned range.

In addition, regarding a monofluorophosphates or difluorophosphate, there are no particular limitations on the counter cation of the monofluorophosphates and difluorophosphate, and examples thereof include lithium, sodium, potassium, magnesium, calcium and ammonium represented by $N^+R_{13}R_{14}R_{15}R_{16}$ (wherein, $R_{13}$ to $R_{16}$ respectively and independently represent a hydrogen atom or organic group having 1 to 12 carbon atoms).

There are no particular limitations on the organic group having 1 to 12 carbon atoms represented by $R_{13}$ to $R_{16}$ of the aforementioned ammonium, and examples thereof include alkyl group that may be substituted with a halogen atom, cycloalkyl group that may be substituted with a halogen atom or alkyl group, aryl group that may be substituted with a halogen atom or alkyl group, and nitrogen atom-containing heterocyclic group that may have a substituent. Among these, $R_{13}$ to $R_{16}$ preferably respectively and independently represent a hydrogen atom, alkyl group, cycloalkyl group or nitrogen atom-containing heterocyclic group.

Specific examples of monofluorophosphates and difluorophosphates include lithium monofluorophosphate, sodium monofluorophosphate, potassium monofluorophosphate, lithium difluorophosphate, sodium difluorophosphate and potassium difluorophosphate, lithium monofluorophosphate and lithium difluorophosphate are preferable, and lithium difluorophosphate is more preferable. These may be used alone or two or more types may be used in combination. In the case the nonaqueous electrolyte solution contains a monofluorophosphate and/or difluorophosphate, the ratio thereof in the nonaqueous electrolyte solution is normally 0.001% by mass or more, preferably 0.01% by mass or more, more preferably 0.1% by mass or more and particularly preferably 0.2% by mass or more, and normally 5% by mass or less, preferably 3% by mass or less and more preferably 2% by mass or less.

Furthermore, when a monofluorophosphate and difluorophosphate are actually used as a nonaqueous electrolyte solution to fabricate a secondary battery, there are many cases in which the content therein decreases considerably even if the battery is disassembled and nonaqueous electrolyte solution is again extracted. Thus, a nonaqueous electrolyte solution that allows at least one of monofluorophosphate and/or difluorophosphate to be detected in the nonaqueous electrolyte solution that has been extracted from a battery is considered to be a nonaqueous electrolyte solution that contains these at a prescribed ratio defined in the present invention in the nonaqueous electrolyte solution.

In addition, examples of nitrile compounds include mononitriles such as acetonitrile, propionitrile, butyronitrile, valeronitrile, hexanenitrile, heptanenitrile, octanenitrile, nonanenitrile, decanenitrile, dodecanenitrile (lauronitrile), tridecanenitrile, tetradecanenitrile (myristonitrile), hexadecanenitrile, pentadecanenitrile, heptadecanenitrile, octadecanenitrile (stearonitrile), nonadecanenitrile and icosanenitrile; and, dinitriles such as malononitrile, succinonitrile, glutaronitrile, adiponitrile, pimelonitrile, suberonitrile, azelanitrile, sebaconitrile, undecanedinitrile, dodecanedinitrile, methylmalononitrile, ethylmalononitrile, isopropylmalononitrile, tert-butylmalononitrile, methylsuccinonitrile, 2,2-dimethylsuccinonitrile, 2,3-dimethylsuccinonitrile, trimethylsuccinonitrile, tetramethyl succinonitrile, 3,3'-oxydipropionitrile, 3,3'-thiodipropionitrile, 3,3'-(ethylenedioxy)dipropionitrile, 3,3'-(ethylenedithio)dipropionitrile, 1,2,3-propanetricarbonitrile, 1,3,5-pentanetricarbonitrile, 1,2,3-tris(2-cyanoethoxy)propane and tris(2-cyanoethyl)amine, and among these, lauronitrile, succinonitrile, glutaronitrile, adiponitrile and pimelonitrile are preferable.

These may be used alone or two or more types may be used in combination.

In the case the nonaqueous electrolyte solution contains a nitrile compound, the ratio thereof in the nonaqueous electrolyte solution is normally 0.001% by mass or more, preferably 0.01% by mass or more, more preferably 0.1% by mass or more and particularly preferably 0.2% by mass or more, and normally 10% by mass or less, preferably 5% by mass or less and more preferably 2% by mass or less.

Other examples include acid anhydrides such as succinic anhydride, maleic anhydride, phthalic anhydride and citraconic anhydride; carbonate compounds such as erythritan carbonate, spiro-bis-dimethylene carbonate, sulfur-containing compounds such as ethylene sulfite, 1,3-propane sultone, 1,3-propene sultone, 1,4-butane sulfone, methyl methanesulfonate, busulfane, sulfolane, sulfolene, dimethyl sulfone, diphenyl sulfone, divinyl sulfone, methyl phenyl sulfone, diethyl disulfide, dibutyl disulfide, N,N-dimethyl methanesulfonamide, N,N-diethyl methanesulfonamide and lithium fluorosulfonate; acetal compounds such as 3,9-divinyl-2,4,8,10-tetraoxa spiro [5.5]undecane; nitrogen-containing compounds such as 1-methyl-2-pyrrolidinone, 1-methyl-2-piperidone, 3-methyl-2-oxazolidinone, 1,3-dimethyl-2-imidazolidinone, N-methylsuccinimide, 4-trifluoromethyl phenyl isocyanate and 1,6-diisocyanatohexane; hydrocarbon compounds such as heptane, octane and cycloheptane; and, fluorine-containing aromatic compounds such as fluorobenzene, difluorobenzene, trifluorobenzene, benzotrifluoride, pentafluorobenzene and hexafluorobenzene.

One type of these assistants may be used alone or two or more types may be used in combination in an arbitrary combination and ratio. In the case of containing these assistants, although the concentration thereof is arbitrary provided it does not significantly impair the effects of the present invention, the concentration based on the total amount of nonaqueous electrolyte solution is normally 0.01% by mass or more, preferably 0.1% by mass or more and more preferably 0.2% by mass or more, and normally 5% by mass or less and preferably 2% by mass or less.

3-5. Gelling Agent

Although the nonaqueous electrolyte solution is normally present in a liquid state when used in the lithium secondary battery of the present invention, it may also be, for example, gelled by a polymer to form a semi-solid electrolyte. Although the polymer used for gelation is arbitrary, examples thereof include polyvinylidene fluoride, copolymers of polyvinylidene fluoride and hexafluoropropylene, polyethylene oxide, polyacrylate and polymethacrylate. Furthermore, one type of polymer used for gelation may be used alone or two or more types may be used in combination in an arbitrary combination and ratio.

In addition, in the case of using the nonaqueous electrolyte solution in the form of a semi-solid electrolyte, the ratio of nonaqueous electrolyte solution in the semi-solid electrolyte is arbitrary provided it does not significantly impair the effects of the present invention. The preferable range of the ratio of nonaqueous electrolyte solution to the total amount of semi-solid electrolyte is normally 30% by mass or more, preferably 50% by mass or more and more preferably 75% by mass or more, and normally 99.95% by mass or less, preferably 99% by mass or less and more preferably 98% by mass or less. Making the ratio of nonaqueous electrolyte solution 30% by mass or more is adequate in terms of charge/discharge efficiency and capacity, while as a result of making the ratio 99.95% by mass or less, the occurrence of leakage of electrolyte caused by increased difficulty in retaining electrolyte solution is inhibited.

3-6. Production Method of Nonaqueous Electrolyte Solution

The nonaqueous electrolyte solution of the present invention can be prepared by dissolving the previously described electrolyte, the compound of the present invention represented by the aforementioned general formula (1), and other additives used as necessary in the previously described nonaqueous solvent.

Furthermore, if water is present in the nonaqueous electrolyte solution, there is the potential for the occurrence of electrolysis of water, reaction between water and lithium metal and hydrolysis of the lithium salt, thereby making this undesirable. Thus, each component such as the nonaqueous solvent is preferably dehydrated in advance when preparing the nonaqueous electrolyte solution. More specifically, each component is preferably dehydrated until the moisture content thereof reaches a value of normally 50 ppm or less and particularly 20 ppm or less. Although the dehydration technique can be selected arbitrarily, examples thereof include heating under reduced pressure and passing through a molecular sieve.

4. Battery Constitution

The constitution of the nonaqueous electrolyte secondary battery of the present invention is similar to that of a conventionally known nonaqueous electrolyte secondary battery with the exception of the nonaqueous electrolyte solution, and normally has a form in which a positive electrode and negative electrode are laminated via a porous film (separator) impregnated with the nonaqueous electrolyte solution of the present invention, and the components are housed in a case (outer package). There are no particular limitations on the shape of the nonaqueous electrolyte secondary battery of the present invention, and may be cylindrical, square, laminated, coin-shaped or large-sized.

4-1. Nonaqueous Electrolyte Solution

The previously described nonaqueous electrolyte solution of the present invention is used as the nonaqueous electrolyte solution. Furthermore, other nonaqueous electrolyte solutions can be mixed with the nonaqueous electrolyte solution of the present invention within a range that does not deviate from the gist of the present invention.

4-2. Negative Electrode

The following provides a description of a negative electrode active material used in the negative electrode. There are no particular limitations on the negative electrode active material provided it is capable of electrochemically occluding and releasing lithium ions. Specific examples thereof include carbonaceous materials, alloy-based materials and lithium-containing metal compound oxide materials. One type of these materials may be used alone or two or more types may be used in combination in an arbitrary combination.

<Negative Electrode Active Material>

Examples of negative electrode active materials include carbonaceous materials, alloy-based materials and lithium-containing metal compound oxide materials.

Examples of carbonaceous materials include (1) natural graphite, (2) artificial graphite, (3) amorphous carbon, (4) carbon-coated graphite, (5) graphite-coated graphite, and (6) resin-coated graphite.

Examples of (1) natural graphite include scaly graphite, flaky graphite, soil graphite and/or graphite particles obtained by carrying out treatment such as spheronization or densification using these graphite materials as raw materials. Among these, spherical or ellipsoidal graphite obtained by subjecting to spheronization treatment is particularly preferable from the viewpoint of particle fillability and charge/discharge rate characteristics.

An apparatus that repeatedly subjects the particles to primarily impact force as well as other mechanical actions such as a compression, rubbing or shear force, and including particle interaction, can be used for the apparatus used for spheronization treatment. More specifically, a device is preferable that has a rotor installed with a large number of blades within a casing, and carries out spheronization treatment by imparting mechanical actions such as impact compression, rubbing or shear force to a carbon material introduced therein by rotating the rotor at a high speed. In addition, an apparatus having a mechanism that enables mechanical action to be repeatedly imparted by circulating the carbon material is preferable.

For example, in the case of carrying out spheronization treatment using the apparatus described above, the peripheral velocity of the rotating rotor is preferably 30 m/sec to 100 m/sec, more preferably 40 m/sec to 100 m/sec and even more preferably 50 m/sec to 100 m/sec. In addition, although the treatment can be carried out by simply passing the carbon substance through the apparatus, the carbon substance is preferably treated by allowing to circulate or remain inside the apparatus for 30 seconds or more, and more preferably treated by allowing to circulate or remain in the apparatus for 1 minute or more.

Examples of (2) artificial graphite include that produced by graphitizing an organic compound such as coal tar pitch, coal-based heavy oil, atmospheric residual oil, petroleum-based heavy oil, aromatic hydrocarbons, nitrogen-containing cyclic compounds, sulfur-containing cyclic compounds, polyphenylene, polyvinyl chloride, polyvinyl alcohol, polyacrylonitrile, polyvinyl butyral, natural polymers, polyphenylene sulfide, polyphenylene oxide, furfuryl alcohol resin, phenol-formaldehyde resin or imide resin at a temperature normally within the range of 2500° C. to 3200° C. followed by pulverizing and/or classifying as necessary. At this time, silicon-containing compounds, boron-containing compounds and the like can also be used as graphitization catalysts. In addition, another example of artificial graphite is that obtained by graphitizing mesocarbon microbeads separated in the heat treatment process of pitch. Moreover, another example is artificial graphite of granulated particles composed of primary particles. For example, an example is graphite particles in which flat particles have been aggregated or bound so that their orientation planes are non-parallel, which are obtained by mixing and graphitizing mesocarbon microbeads or a graphitizable carbonaceous material powders such as coke, a graphitizable binder such as tar or pitch, and a graphitization catalyst, followed by pulverizing as necessary.

Examples of (3) amorphous carbon include amorphous carbon particles obtained by one or more rounds of heat treatment over a temperature range at which graphitization does not occur (temperature range of 400° C. to 2200° C.) using as raw material a readily graphitizable carbon precursor such as tar or pitch, and amorphous carbon particles obtained by heat treatment using as raw material a non-graphitizable carbon precursor such as resin.

Examples of (4) carbon-coated graphite include a carbon-graphite complex obtained by mixing natural graphite and/or artificial graphite with a carbon precursor in the form of an organic compound such as tar, pitch or resin, followed by subjecting to one or more rounds of heat treatment within a range of 400° C. to 2300° C., using the resulting natural graphite and/or artificial graphite as core graphite, and coating the core graphite with amorphous carbon. The compound form may be that in which the entire surface or a portion thereof is coated, or a plurality of primary particles may be compounded using carbon derived from the aforementioned carbon precursor as a binder. In addition, a carbon-graphite complex can also be obtained by reacting benzene, toluene, methane, propane or a hydrocarbon-based gas of the volatile component of an aromatic system and the like with natural graphite and/or artificial graphite at a high temperature followed by depositing (CVD) carbon on the graphite surface.

Examples of (5) graphite-coated graphite include graphite-coated graphite in which a graphitized substance is coated over the entire or a portion of the surface of core graphite obtained by mixing natural graphite and/or artificial graphite with a carbon precursor of a readily graphitizable organic compound such as tar, pitch or resin followed by subjecting to one or more rounds of heat treatment over a temperature range of about 2400° C. to 3200° C., and using the resulting natural graphite and/or artificial graphite for the core graphite.

Examples of (6) resin-coated graphite include resin-coated graphite in which core graphite is coated with a resin and the like obtained by mixing natural graphite and/or artificial graphite with a resin and the like followed by drying at a temperature below 400° C. and using the resulting natural graphite and/or artificial graphite for the core graphite.

In addition, one type of the carbonaceous materials of (1) to (6) may be used alone or two or more types may be used in combination in an arbitrary combination and ratio.

Examples of organic compounds such as tar, pitch or resin used in (2) to (5) above include carbonizable organic compounds selected from the group consisting of petroleum-based heavy oil, direct liquefaction heavy oil, cracked petroleum heavy oil, aromatic hydrocarbons, N ring compounds, S ring compounds, polyphenylene, synthetic organic polymers, natural polymers, thermoplastic resins and thermosetting resins. In addition, raw material organic compounds may be used after dissolving in a low molecular weight organic solvent in order to adjust viscosity during mixing.

In addition, natural graphite subjected to spheronization treatment is preferable for the natural graphite and/or artificial graphite serving as the raw material of the core graphite.

There are no particular limitations on alloy-based materials used for the negative electrode active material, and may any of lithium alone, a metal alone or alloy that forms a lithium alloy, or an oxide, carbide, nitride, silicide, sulfide, phosphide or other compound thereof, provided it is able to occlude and release lithium. The metal alone or alloy that forms a lithium alloy is preferably a material that contains a metal or metalloid (namely, excluding carbon) element of group 13 or group 14, and is more preferably a metal alone of aluminum, silicon or tin or an alloy or compound containing these atoms. One type of these may be used alone or two or more types may be used in combination in an arbitrary combination and ratio.

<Physical Properties of Carbonaceous Materials>

In the case of using a carbonaceous material for the negative electrode active material, it is preferable to use a material having the physical properties indicated below.

(X-Ray Parameters)

The d value (interlayer spacing) of the lattice plane (002 plane) of the carbonaceous material as determined by X-ray diffraction according to the Gakushin method is normally 0.335 nm or more and normally 0.360 nm or less, preferably 0.350 nm or less and more preferably 0.345 nm or less. In addition, the crystallite size (Lc) of the carbonaceous material as determined by X-ray diffraction according to the Gakushin method is preferably 1.0 nm or more and more preferably 1.5 nm or more.

(Volume-Based Mean Particle Diameter)

The volume-based mean particle diameter of the carbonaceous material is the mean diameter (median diameter) based on volume as determined according to the laser diffraction scattering method, and is normally 1 µm or more, preferably 3 µm or more, more preferably 5 µm or more and particularly preferably 7 µm or more, and normally 100 µm or less, preferably 50 µm or less, more preferably 40 µm or less, even more preferably 30 µm or less and particularly preferably 25 µm or less.

If volume-based mean particle diameter is below the aforementioned range, irreversible capacity may increase leading to a loss of initial battery capacity. In addition, if the diameter exceeds the aforementioned range, there is increased susceptibility to the formation of an uneven coated surface when fabricating the electrode by coating, which is undesirable in terms of the battery fabrication process.

Volume-based mean particle diameter is measured by dispersing carbon powders in a 0.2% by mass aqueous solution (about 10 mL) of a surfactant in the form of polyoxyethylene (20) sorbitan monolaurate followed by measuring using a laser diffraction/scattering particle size analyzer (such as the Model LA-700 manufactured by Horiba, Ltd.). The median diameter determined in this measurement is defined as the volume-based mean particle diameter of a carbonaceous material of the present invention.

(Raman R Value)

The Raman R value of the carbonaceous material is the value measured by laser Raman spectroscopy, and is normally 0.01 or more, preferably 0.03 or more and more preferably 0.1 or more, and normally 1.5 or less, preferably 1.2 or less, even more preferably 1 or less, and particularly preferably 0.5 or less.

If the Raman R value is below the aforementioned range, crystallinity of the particle surfaces may become excessively high resulting in a shortage of sites where lithium enters between layers accompanying charging and discharging. Namely, charge acceptability may decrease. In addition, crystals may be easily oriented in the direction parallel to the electrode plate in the case of increasing the density of the negative electrode by pressing after coating onto a current collector, thereby leading to a decrease in load characteristics.

On the other hand, if the Raman R value exceeds the aforementioned range, crystallinity of the particle surfaces may decrease, reactivity with the nonaqueous electrolyte solution may increase, thereby leading to reduced efficiency and increased generation of gas.

Raman spectrum is measured using a Raman spectrometer (such as a Raman spectrometer manufactured by Jasco Corp.) by filling the sample into a measuring cell by allowing the sample to naturally drop therein, and irradiating the surface of the sample in the cell with argon ion laser light (or semiconductor laser light) while rotating the cell within a plane perpendicular to the laser light. Intensity IA of a peak PA in the vicinity of 1580 $cm^{-1}$ and intensity IB of a peak PB in the vicinity of 1360 $cm^{-1}$ are measured on the resulting Raman spectrum followed by calculation of the intensity ratio R thereof (R=IB/IA). The Raman R value calculated in this measurement is defined as the Raman R value of a carbonaceous material of the present invention.

In addition, the conditions used during the aforementioned Raman measurement are as indicated below.

Laser wavelength: Ar ion laser: 514.5 nm (semiconductor laser: 532 nm)

Measuring range: 1100 $cm^{-1}$ to 1730 $cm^{-1}$

Raman R value: Background processing

Smoothing processing: simple average, convolution: 5 points (BET Specific Surface Area)

The BET specific surface area of the carbonaceous material is the value of specific surface area measured using the BET method, and is normally 0.1 $m^2 \cdot g^{-1}$ or more, preferably 0.7 $m^2 \cdot g^{-1}$ or more, even more preferably 1.0 $m^2 \cdot g^{-1}$ or more and particularly preferably 1.5 $m^2 \cdot g^{-1}$ or more, and normally 100 $m^2 \cdot g^{-1}$ or less, preferably $m^2 \cdot g^{-1}$ or less, more preferably 15 $m^2 \cdot g^{-1}$ or less and particularly preferably 10 $m^2 \cdot g^{-1}$ or less.

If the value of BET specific surface area is below the aforementioned range, lithium acceptability during charging easily becomes poor, lithium easily precipitates on the electrode surface and there is the potential for a decrease in stability in the case of using as a negative electrode material. On the other hand, if this range is exceeded, reactivity with the nonaqueous electrolyte solution may increase when used as a negative electrode material, thereby resulting in increased generation of gas and making it difficult to obtain a preferable battery.

BET specific surface area is measured using a surface area measuring instrument (such as a fully automated surface area measuring system manufactured by Ohkura Riken Co., Ltd.) according to the nitrogen adsorption-BET 1-point method in accordance with the flowing gas method using a mixed gas of nitrogen and helium accurately adjusted to a relative pressure of nitrogen relative to atmospheric pressure of 0.3 after pre-drying the sample for 15 minutes at 350° C. in the presence of flowing nitrogen.

(Circularity)

In the case of measuring circularity as the degree of sphericity of the carbonaceous material, circularity is preferably within the range indicated below. Furthermore, circularity is defined as "circularity=(perimeter of an equivalent circle having the same area as the particle projected shape)/(actual perimeter of particle projected shape)", and is a theoretically true sphere when the value of circularity is 1.

The circularity of particles of the carbonaceous material having a particle diameter within the range of 3 μm to 40 m is preferably as close to 1 as possible and is preferably 0.1 or more, and in particular, is preferably 0.5 or more, more preferably 0.8 or more, even more preferably 0.85 or more, and particularly preferably 0.9 or more. High current density charging and discharging characteristics improve the greater the value of circularity. Thus, if circularity is below the aforementioned range, fillability of the negative electrode active material may decrease resulting in an increase in resistance between particles and a decrease in short-term, high current density charging and discharging characteristics.

Circularity is measured using a flow-type particle image analyzer (such as the FPIA manufactured by Sysmex Corp.). About 0.2 g of sample are dispersed in a 0.2% by mass aqueous solution (about 50 mL) of a surfactant in the form of polyoxyethylene (20) sorbitan monolaurate, and after irradiating the sample for 1 minute at an output of 60 W with ultrasonic waves having a frequency of 28 kHz, particles are measured over a particle diameter range of 3 μm to 40 μm while setting the detection range to 0.6 μm to 400 μm.

Although there are no particular limitations on the method used to improve circularity, particles that have been made to be spherical by subjecting to spheronization treatment are preferable since the shape of inter-particle gaps is uniform when using in an electrode body. Examples of spheronization treatment include a method in which particles are made to approach sphericity mechanically by imparting shear force and compressive force, and a mechanical/physical treatment method in which a plurality of microparticles are granulated by the adhesive force of a binder or the particles per se.

(Tap Density)

Tap density of the carbonaceous material is normally 0.1 g·cm$^{-3}$ or more, preferably 0.5 g·cm$^{-3}$ or more, more preferably 0.7 g·cm$^{-3}$ or more and particularly preferably 1 g·cm$^{-3}$ or more, and preferably 2 g·cm$^{-3}$ or less, more preferably 1.8 g·cm$^{-3}$ or less and particularly preferably 1.6 g·cm$^{-3}$ or less. If tap density is below the aforementioned range, it may be difficult to increase packing density in the case of using as a negative electrode and a high-capacity battery may be unable to be obtained. In addition, if the aforementioned range is exceeded, the number of gaps between particles in an electrode may be too small, thereby making it difficult to ensure conductivity between particles and making it difficult to obtain preferable battery properties.

Tap density is measured by passing the sample particles through a sieve having a mesh size of 300 μm and allowing the sample to drop onto a 20 cm$^3$ tapping cell to fill the sample to the upper edge of the cell, followed by tapping 1000 times at a stroke length of 10 mm using a powder density meter (such as the Tap Denser manufactured by Seishin Enterprise Co., Ltd.) and calculating tap density from the volume and sample mass at that time.

(Orientation Ratio)

Orientation ratio of the carbonaceous material is normally 0.005 or more, preferably 0.01 or more and more preferably 0.015 or more, and normally 0.67 or less. If the orientation ratio is below the aforementioned range, high-density charging and discharging characteristics may decrease. Furthermore, the upper limit of the aforementioned range is the theoretical upper limit value of the orientation ratio of the carbonaceous material.

Orientation ratio is measured by X-ray diffraction after compression molding the sample. 0.47 g of sample is filled into a molding machine having a diameter of 17 mm followed by compressing at 58.8 MN·m$^{-2}$ and measuring X-ray diffraction of the resulting compact by placing in a measurement sample holder so as to lie in the same plane as the sample holder using clay. The ratio represented by (110) diffraction peak intensity/(004) diffraction peak intensity is calculated from the peak intensity of (110) diffraction and (004) diffraction of the resulting carbon.

The conditions used when measuring X-ray diffraction are as indicated below. Furthermore, "2θ" indicates the angle of diffraction.

Target: Cu(Kα beam) graphite monochromator
Slit: Divergence slit=0.5 degrees
    Receiving slit=0.15 mm
    Scattering slit=0.5 degrees
Measuring Range and Step Angle/Measuring Time:
    (110) plane: 75 degrees≤2θ≤80 degrees 1 degree/60 seconds
    (004) plane: 52 degrees≤2θ≤57 degrees 1 degree/60 seconds (Aspect Ratio (Powder))

The aspect ratio of the carbonaceous material is normally 1 or more, and normally 10 or less, preferably 8 or less and more preferably 5 or less. If the aspect ratio exceeds the aforementioned range, streaking may occur when forming an electrode plate, a uniform coated surface may not be obtained and high current density charging and discharging characteristics may decrease. Furthermore, the lower limit of the aforementioned range is the theoretical lower limit value of the aspect ratio of the carbonaceous material.

Aspect ratio is measured by magnifying and observing particles of the carbonaceous material with a scanning electron microscope. Fifty arbitrary graphite particles are selected that have been immobilized on the end surface of metal having a thickness of 50 μm or less, and a stage having a sample immobilized thereon is then rotated and inclined for each particle, followed by measuring a diameter A corresponding to the maximum length of the carbonaceous material particles when observed three-dimensionally and a diameter B corresponding to the minimum length perpendicular thereto, and determining the average value of A/B.

(Coverage Rate)

The negative electrode active material of the present invention may be coated with a carbon substance or graphite substance. Among these, coating with an amorphous carbon substance is preferable from the viewpoint of acceptability of lithium ions, and the coverage rate thereof is normally 0.5% to 30%, preferably 1% to 25% and more preferably 2% to 20%. If this content rate is excessively large, the amorphous carbon portion of the negative electrode active material becomes large and reversible capacity when incorporating in a battery tends to become small. If the content ratio is excessively small, in addition to amorphous carbon sites not being uniformly coated with respect to the graphite particles serving as the core, solid granulation is not conducted, and particle diameter tends to be excessively small when pulverized after firing.

Furthermore, the content ratio (coverage rate) of carbides derived from an organic compound of the ultimately obtained negative electrode active material can be calculated using the following equation from the amount of negative electrode active material, the amount of organic compound, and the residual carbon ratio as measured according to the micro method in compliance with JIS K 2270.

Coverage rate of carbide derived from organic compound (%)=(mass of organic compound×residual carbon ratio×100)/{mass of negative electrode active material+(mass of organic compound×residual carbon ratio)}  Equation:

(Internal Porosity)

Internal porosity of the negative electrode active material is normally 1% or more, preferably 3% or more, more preferably 5% or more and even more preferably 7% or more. In addition, it is normally less than 50%, preferably 40% or less, more preferably 30% or less and even more preferably 20% or less. If this internal porosity is excessively small, the amount of liquid within the particles decreases and charging and discharging characteristics tend to become poor, while if internal porosity is excessively large, there is a shortage of inter-particle gaps in the case of forming into an electrode, and diffusion of electrolyte solution tends to be inadequate. In addition, substances that mitigate expansion and compression of metal particles capable of alloying with Li, such as amorphous carbon, graphite substances or resin, may be present in the gaps or gaps may be filled therewith.

<Metal Particles Capable of Alloying with Li>

Examples of techniques used to confirm that metal particles are capable of alloying with Li include identification of a metal particle phase by X-ray diffraction, observation of particle structure and elemental analysis with an electron microscope, and elemental analysis by fluorescent X-rays.

Although any conventionally known metal particles can be used for the metal particles capable of alloying with Li, the metal particles are preferably a metal selected from the group consisting of Fe, Co, Sb, Bi, Pb, Ni, Ag, Si, Sn, Al, Zr, Cr, P, S, V, Mn, Nb, Mo, Cu, Zn, Ge, In and Ti or a compound thereof from the viewpoint of capacity and cycle life. In addition, an alloy composed of two or more metals may be used, or the metal particles may be alloy particles formed by two or more metal elements. Among these, a metal selected from the group consisting of Si, Sn, As, Sb, Al, Zn and W or a compound thereof is preferable.

Examples of metal compounds include metal oxides, metal nitrides and metal carbides. In addition, an alloy composed of two or more metals may also be used.

Among these, Si or an Si compound is preferable from the viewpoint of increasing capacity. In the present description, Si or Si compounds are collectively referred to as Si compounds. Specific examples of Si compounds include $SiO_x$, $SiN_x$, $SiC_x$ and $SiZ_xO_y$ (wherein, Z represents C or N), and preferably $SiO_x$ when represented with a general formula. Although a this general formula $SiO_x$ is obtained by using silicon dioxide ($SiO_2$) and metal silicon (Si) as raw materials, the value of x thereof is normally such that $0 \leq x < 2$. $SiO_x$ has a large theoretical capacity in comparison with graphite, and amorphous Si or nano-sized Si crystals facilitate migration of alkaline ions such as lithium ions, thereby making it possible to obtain high capacity.

More specifically, the Si compound is $SiO_x$ wherein x is such that $0 \leq x < 2$, more preferably 0.2 to 1.8, even more preferably 0.4 to 1.6, and particularly preferably 0.6 to 1.4, with x=0 being exceptionally preferable. If within this range, simultaneous to realizing high capacity, irreversible capacity caused by bonding between Li and oxygen can be reduced.

Mean Particle Diameter (d50) of Metal Particles Capable of Alloying with Li

The mean particle diameter (d50) of metal particles capable of alloying with Li is normally 0.01 μm or more, preferably 0.05 μm or more, more preferably 0.1 μm or more and even more preferably 0.3 μm or more, and normally 10 μm or less, preferably 9 μm or less and more preferably 8 μm or less from the viewpoint of cycle life. If mean particle diameter (d50) is within the aforementioned range, volume expansion accompanying charging and discharging can be reduced and favorable cycle characteristics can be obtained while maintaining charge-discharge capacity.

Mean particle diameter (d50) is determined by a method such as laser diffraction/scattering particle size analysis.

BET Specific Surface Area of Metal Particles Capable of Alloying with Li

The specific surface area as determined according to the BET method of metal particles capable of alloying with Li is normally 0.5 m²/g to 60 m²/g and preferably 1 m²/g to 40 m²/g. If the specific surface area as determined according to the BET method of metal particles capable of alloying with Li is within the aforementioned range, battery charging and discharging efficiency and discharge capacity are high, migration of lithium during high-speed charging and discharging is accelerated, and rate characteristics are superior, thereby making this preferable.

Oxygen Content of Metal Particles Capable of Alloying with Li

Although there are no particular limitations thereon, the oxygen content of metal particles capable of alloying with Li is normally 0.01% by mass to 8% by mass and preferably 0.05% by mass to 5% by mass. Although the distribution state of oxygen within the particles may be such that oxygen may be present near the surface, present within the particles or uniformly present within the particles, oxygen is particularly preferably present near the surface. If the oxygen content of metal particles capable of alloying with Li is within the aforementioned range, strong bonding of Si and O inhibits volume expansion accompanying charging and discharging while also resulting in superior cycle characteristics, thereby making this preferable.

The negative electrode active material containing the metal particles capable of alloying with Li and graphite particles referred to in the present invention may refer to a mixture in which the metal particles capable of alloying with Li and the graphite particles are mixed in a state of mutually independent particles, or may be in the form of a complex in which the metal particles capable of alloying with Li are present on the surface or inside the graphite particles. In the present description, although there are no particular limitations thereon provided it contains metal particles capable of alloying with Li and a carbon substance, a complex (also referred to as composite particles) preferably refers to particles in which metal particles capable of alloying with Li and a carbon substance are integrated by physical and/or chemical bonds. In a more preferable mode thereof, the metal particles capable of alloying with Li and the carbon substance are in a state such that each solid component is present while dispersed within particles to a degree that they are at least present both on the surface of the composite particles and within the bulk material, and in order to integrate them by physical and/or chemical bonds, the carbon substance is present. In a more specific preferable mode, the negative electrode active material is a composite material that is at least composed of metal particles capable of alloying with Li and graphite particles, wherein graphite particles, and preferably natural graphite, are present within particles having a folded structure having a curved surface, and metal particles capable of alloying with Li are present in gaps within that folded structure having a curved surface. In addition, the gaps may be voids or a substance such as amorphous carbon, graphite substance or resin, which mitigates expansion and compression of metal particles capable of alloying with Li, may be present in the gaps.

Content Ratio of Metal Particles Capable of Alloying with Li

The content ratio of metal particles capable of alloying with Li to the total of metal particles capable of alloying with Li and graphite particles is normally 0.1% by mass or more, preferably 1% by mass or more, more preferably 2% by mass or more, even more preferably 3% by mass or more and particularly preferably 5% by mass or more. In addition, the content ratio is normally 99% by mass or less, preferably 50% by mass or less, more preferably 40% by mass or less, even more preferably 30% by mass or less, still more preferably 25% by mass or less, particularly preferably 15% by mass or less, and most preferably 10% by mass or less. If the content ratio is within this range, adequate capacity can be obtained, thereby making this preferable.

An alloy-based material negative electrode can be produced using any known method. More specifically, although examples of methods used to produce the negative electrode include a method in which the product obtained by adding a binder or conductive material to the aforementioned negative electrode active material is directly subjected to roll forming to obtain a sheet electrode, and a method in which the negative electrode active material is subjected to compression molding to obtain a pellet electrode, normally a method is used in which a thin layer film containing the aforementioned negative electrode active material (negative electrode active material layer) is formed by a technique such as coating, depositing, sputtering or plating on a current collector for the negative electrode (to also be referred to as a "negative electrode current collector"). In this case, a negative electrode active material layer is formed on a negative electrode current collector by adding a binder, thickener, conductive material, solvent and the like to the aforementioned negative electrode active material to form a slurry, coating this onto the negative electrode current collector and drying, followed by pressing to increase the density thereof.

Examples of materials of the negative electrode current collector include steel, copper alloy, nickel, nickel alloy and stainless steel. Among these, copper foil is preferable from the viewpoints of easy formation of a thin film and costs.

The thickness of the negative electrode current collector is normally 1 μm or more and preferably 5 μm or more, and normally 100 μm or less and preferably 50 m or less. If the negative electrode current collector is excessively thick, capacity of the overall battery may decrease excessively, while if it is excessively thin, it becomes difficult to handle.

Furthermore, the surface of the negative electrode current collector is preferably preliminarily subjected to roughening treatment in order to improve binding effects with the negative electrode active material layer formed on the surface. Examples of methods used to roughen the surface include blasting treatment, rolling using rollers having a rough surface, mechanical polishing methods comprising polishing the current collector surface with sandpaper adhered with abrasive particles, a whetstone, an emery buff or wire brush equipped with steel wires and the like, electrolytic polishing and chemical polishing.

In addition, a perforated negative electrode current collector in the form of expanded metal or perforated metal can also be used to improve energy density per unit mass of a battery by reducing the mass of the negative electrode current collector. This type of negative electrode current collector allows the mass thereof to be changed as desired by changing the aperture ratio thereof. In addition, in the case of forming a negative electrode active material layer on both sides of this type of negative electrode current collector, the negative electrode active material layer is less susceptible to separation due to the riveting effect of the perforations. However, in the case the aperture ratio becomes excessively high, contact area between the negative electrode active material layer and negative electrode current collector becomes small, thereby conversely resulting in a decrease in adhesive strength.

The slurry used to form the negative electrode active material layer is normally fabricated by adding a binder, thickener and the like to a negative electrode material. Furthermore, a "negative electrode material" in the present description refers to a material obtained by combining a negative electrode active material and a conductive material.

The content of negative electrode active material in the negative electrode material is normally 70% by mass or more and particularly preferably 75% by mass or more, and normally 97% by mass or less and particularly preferably 95% by mass or less. If the content of negative electrode active material is excessively low, the capacity of a secondary battery using the resulting negative electrode tends to be insufficient, while if the content is excessively high, electrical conductivity for use as a negative electrode tends to be difficult to secure due to the content of conducting agent being relatively insufficient. Furthermore, in the case of combining the use of two or more negative electrode active materials, the total amount of negative electrode active material is to satisfy the aforementioned range.

Examples of conductive materials used in the negative electrode include metal materials such as copper and nickel, and carbon materials such as graphite and carbon black. One type of these materials may be used alone or two or more types may be used in combination in an arbitrary combination and ratio. When a carbon material is used for the conductive material in particular, the carbon material also acts as an active material, thereby making this preferable. The content of conductive material in the negative electrode material is normally 3% by mass or more and particularly preferably 5% by mass or more, and normally 30% by mass or less and particularly preferably 25% by mass or less. If the content of conductive material is excessively low, electrical conductivity tends to be inadequate, while if the content is excessively high, since this results in a relative shortage of the content of negative electrode active material and the like, battery capacity and strength tend to decrease. Furthermore, in the case of combining the use of two or more conductive materials, the total amount of conductive material is to satisfy the aforementioned range.

Any binder can be used for the binder used in the negative electrode provided it is a material that is stable with respect to the solvent and electrolyte solution used during electrode production. Examples thereof include polyvinylidene fluoride, polytetrafluoroethylene, polyethylene, polypropylene, styrene-butadiene rubber, isoprene rubber, butadiene rubber, ethylene-acrylic acid copolymer and ethylene-methacrylic acid copolymer. One type of these may be used alone or two or more types may be used in combination in an arbitrary combination and ratio. The content of the binder based on 100 parts by mass of the negative electrode material is normally 0.5 parts by mass or more and particularly preferably 1 part by mass or more, and normally 10 parts by mass or less and particularly preferably 8 parts by mass or less. If the content of binder is excessively low, strength of the resulting negative electrode tends to be inadequate, while if the content is excessively high, since this results in a relative shortage in the content of negative electrode active material and the like, battery capacity and electrical conductivity tend to be inadequate. Furthermore, in the case of combining the use of two or more binders, the total amount of binder is to satisfy the aforementioned range.

Examples of thickeners used in the negative electrode include carboxymethyl cellulose, methyl cellulose, hydroxymethyl cellulose, ethyl cellulose, polyvinyl alcohol, oxidized starch, phosphorylated starch and casein. One type of these may be used alone or two or more types may be used in combination in an arbitrary combination and ratio. Although only required to be used as necessary, in the case of using a thickener, the content of thickener in the negative electrode active material layer is normally such that it is preferably used within the range of 0.5% by mass to 5% by mass.

The slurry for forming the negative electrode active material layer is prepared by mixing a conducting agent, binder and thickener as necessary into the aforementioned negative electrode active material and using an aqueous solvent or organic solvent as a dispersion medium. Although water is normally used for the aqueous solvent, an organic solvent, e.g., an alcohol such as ethanol or a cyclic amide such as N-methylpyrrolidone can also be used in combination therewith within a range of 30% by mass or less with respect to the water. In addition, examples of organic solvents normally include cyclic amides such as N-methylpyrrolidone, linear amides such as N,N-dimethylformamide and N,N-dimethylacetoamide, aromatic hydrocarbons such as anisole, toluene and xylene, and alcohols such as butanol and cyclohexanol, and among these, cyclic amides such as N-methylpyrrolidone and linear amides such as N,N-dimethylformamide and N,N-dimethylacetoamide are preferable. Furthermore, one type of these may be used alone or two or more types may be used in combination in an arbitrary combination and ratio.

The negative electrode active material layer is formed by coating the resulting slurry onto the aforementioned negative electrode current collector and drying followed by pressing. There are no particular limitations on the coating method and a known method can be used. There are also no particular limitations on the drying method, and a known method, such as air drying, heat drying and vacuum drying can be used.

<Constitution and Fabrication Method of Negative Electrode>

Any known method can be used to fabricate the negative electrode provided it does not significantly impair the effects of the present invention. For example, a negative electrode can be formed by adding a binder, solvent, and as necessary, a thickener, conducting material, filler or the like, to the negative electrode active material to form a slurry followed by coating this onto a current collector, drying and pressing.

In addition, in the case of using an alloy-based material, a method is also used in which a thin film layer containing the aforementioned negative electrode active material (negative electrode active material layer) is formed by a technique such as deposition, sputtering or plating.

(Electrode Density)

Although there are no particular limitations on the electrode structure when forming the negative electrode active material into an electrode, the density of the negative electrode active material present on the current collector is preferably 1 $g \cdot cm^{-3}$ or more, more preferably 1.2 $g \cdot cm^{-3}$ or more and particularly preferably 1.3 $g \cdot cm^{-3}$ or more, and preferably 2.2 $g \cdot cm^{-3}$ or less, more preferably 2.1 $g \cdot cm^{-3}$ or less, even more preferably 2.0 $g \cdot cm^{-3}$ or less and particularly preferably 1.9 $g \cdot cm^{-3}$ or less. If the density of the negative electrode active material present on the current collector exceeds the aforementioned range, negative electrode active material particles are destroyed, which may lead to an increase in initial irreversible capacity and exacerbation of high current density charging and discharging characteristics attributable to a decrease in permeability of the nonaqueous electrolyte solution into the vicinity of the interface between the current collector and negative electrode active material. In addition, if the density is below the aforementioned range, electrical conductivity between negative electrode active materials may decrease, battery resistance may increase and capacity per unit volume may decrease.

4-3. Positive Electrode

<Positive Electrode Active Material>

The following provides a description of the positive electrode active material (lithium-transition metal-based compound) used in the positive electrode.

<Lithium-Transition Metal-Based Compound>

A lithium-transition metal-based compound refers to a compound having a structure that enables desorption and insertion of Li ions, and examples thereof include sulfides, phosphate compounds and lithium-transition metal compound oxides. Examples of sulfides include compounds having a two-dimensional layered structure such as $TiS_2$ and $MoS_2$, and Chevrel compounds having a rigid, three-dimensional framework structure represented by the general formula $Me_xMo_6S_8$ (wherein, Me represents various types of transition metals including Pb, Ag and Cu). Examples of phosphate compounds include those categorized as having an olivine structure and typically represented by the formula $LiMePO_4$ (wherein, Me represents at least one transition metal), specific examples of which include $LiFePO_4$, $LiCoPO_4$, $LiNiPO_4$ and $LiMnPO_4$. Examples of lithium-transition metal compound oxides include those categorized as having a spinel structure enabling three-dimensional diffusion and those categorized as having a layered structure enabling two-dimensional diffusion of lithium ions. Those having a spinel structure are typically represented by the formula $LiMe_2O_4$ (wherein, Me represents at least one transition metal), and specific examples thereof include $LiMn_2O_4$, $LiCoMnO_4$, $LiNi_{0.5}Mn_{1.5}O_4$ and $LiCoVO_4$.

Those having a layered structure are typically represented by the formula $LiMeO_2$ (wherein, Me represents at least one transition metal), and specific examples thereof include $LiCoO_2$, $LiNiO_2$, $LiNi_{1-x}Co_xO_2$, $LiNi_{1-x-y}Co_xMn_yO_2$, $LiNi_{0.5}Mn_{0.5}O_2$, $Li_{1.2}Cr_{0.4}Mn_{0.4}O_2$, $Li_{1.2}Cr_{0.4}Ti_{0.4}O_2$ and $LiMnO_2$.

<Composition>

In addition, examples of lithium-containing transition metal compounds include lithium-transition metal-based compounds represented by the following compositional formula (D) or (E).

1) Case of a Lithium-Transition Metal-Based Compound Represented by the following Compositional Formula (D)

$$Li_{1+x}MO_2 \quad\quad\quad (D)$$

In the above formula, x is normally 0 to 0.5. M represents an element composed of Ni and Mn or Ni, Mn and Co, and the molar ratio of Mn/Ni is normally 0.1 to 5. The molar ratio of Ni/M is normally 0 to 0.5. The molar ratio of Co/M is normally 0 to 0.5. Furthermore, the lithium-rich portion represented by x may substitute on a transition metal site M.

Furthermore, in the aforementioned compositional formula (D), although the atomic ratio of the amount of oxygen is described as 2 for the sake of convenience, it may also have a certain degree of non-stoichiometry. In addition, x in the aforementioned compositional formula indicates the charged composition at the production stage of the lithium-transition metal-based compound. Normally, batteries available on the market undergo aging following battery assembly. Consequently, the amount of Li of the positive electrode may be deficient accompanying charging and discharging. In this case, x may be measured at −0.65 to 1 in terms of composition analysis of discharging the battery to 3 V.

In addition, firing the lithium-transition metal-based compound by carrying out high-temperature firing in a gaseous atmosphere containing oxygen results in superior battery properties since this enhances the crystallinity of the positive electrode active material.

Moreover, the lithium-transition metal-based compound represented by compositional formula (D) may also be in the form of a solid solution with $Li_2MO_3$ referred to as layer 213 as indicated in the following general formula (D').

$$\alpha Li_2MO_3 \cdot (1-\alpha)LiM'O_2 \quad (D')$$

In this general formula, a is a value that satisfies the relationship of $0<\alpha<1$.

M represents at least one metal element in which the average oxidation number is 4+, and specific examples thereof include at least one metal element selected from the group consisting of Mn, Zr, Ti, Ru, Re and Pt.

M' represents at least one metal element in which the average oxidation number is 3+, is preferably at least one metal element selected from the group consisting of V, Mn, Fe, Co and Ni, and is more preferably at least one metal element selected from the group consisting of Mn, Co and Ni.

2) Case of a Lithium-Transition Metal-Based Compound Represented by the following General Formula (E)

$$Li[Li_aM_bMn_{2-b-a}]O_{4+\delta} \quad (E)$$

In the above formula, M represents an element composed of at least one transition metal selected from Ni, Cr, Fe, Co, Cu, Zr, Al and Mg.

The value of b is normally 0.4 to 0.6.

If the value of b is within this range, energy density per unit mass is high in the lithium-transition metal-based compound.

In addition, the value of a is normally 0 to 0.3. In addition, a in the aforementioned compositional formula indicates the charged composition at the production stage of the lithium-transition metal-based compound. Normally, batteries available on the market undergo aging following battery assembly. Consequently, the amount of Li of the positive electrode may be deficient accompanying charging and discharging. In this case, a may be measured at −0.65 to 1 in terms of composition analysis of discharging the battery to 3 V.

If the value of a is within this range, favorable load characteristics are obtained without greatly impairing the energy density per unit mass in the lithium-transition metal-based compound.

Moreover, the value of δ is normally within the range of ±0.5.

If the value of δ is within this range, stability of the crystal structure is high and the cycle characteristics and high-temperature storage of a battery having an electrode fabricated using this lithium-transition metal-based compound are favorable.

The following provides a more detailed explanation of the chemical significance of the lithium composition in the composition of the lithium-transition metal-based compound in the form of a lithium-nickel-manganese-based compound oxide.

In order to determine the values of a and b in the compositional formula of the aforementioned lithium-transition metal-based compound, respective types of transition metals and lithium are analyzed with an inductively coupled plasma atomic emission spectrometer (TCP-AES) followed by determining the ratio of Li/Ni/Mn and then calculating the values of a and b.

From a structural viewpoint, lithium relating to a is thought to be inserted by substituting at the same transition metal site. Here, the average valence of M and manganese becomes larger than 3.5 according to the charge neutrality principle due to the lithium relating to a.

In addition, the aforementioned lithium-transition metal-based compound may also be substituted with fluorine and represented as $LiMn_2O_{4-x}F_{2x}$.

<Blending>

Specific examples of lithium-transition metal-based compounds having the aforementioned composition include $Li_{1+x}Ni_{0.5}Mn_{0.5}O_2$, $Li_{1+x}Ni_{0.5}Co_{0.10}Al_{0.05}O_2$, $Li_{1+x}Ni_{0.33}Mn_{0.33}Co_{0.33}O_2$, $Li_{1+x}Ni_{0.45}Mn_{0.45}Co_{0.1}O_2$, $Li_{1+x}Mn_{1.8}Al_{0.2}O_4$ and $Li_{1+x}Mn_{1.5}Ni_{0.5}O_4$. One type of these lithium-transition metal-based compounds may be used alone or two or more types may be used by blending.

<Heteroelement Introduction>

In addition, the lithium-transition metal-based compound may be introduced with a heteroelement. The heteroelement is selected from one or more of B, Na, Mg, Al, K, Ca, Ti, V, Cr, Fe, Cu, Zn, Sr, Y, Zr, Nb, Ru, Rh, Pd, Ag, In, Sb, Te, Ba, Ta, Mo, W, Re, Os, Ir, Pt, Au, Pb, La, Ce, Pr, Nd, Sm, Eu, Gd, Tb, Dy, Ho, Er, Tm, Yb, Lu, Bi, N, F, S, Cl, Br, I, As, Ge, P, Pb, Sb, Si and Sn. These heteroelements may be incorporated within the crystal structure of the lithium-transition metal-based compound or may be unevenly distributed as single substances or compounds on each particle surface or crystal grain boundary without being incorporated within the crystal structure of the lithium-transition metal-based compound.

[Positive Electrode for Lithium Secondary Battery]

A positive electrode for a lithium secondary battery is obtained by forming a positive electrode active material layer, containing the aforementioned lithium-transition metal-based compound powders for a positive electrode material of a lithium secondary battery and a binder, on a current collector.

The positive electrode active material layer is fabricated by pressing the product of dry-mixing a positive electrode material, binder, and a conductive material, thickener and the like used as necessary, and forming into a sheet onto a positive electrode current collector, or by dissolving or dispersing these materials in a liquid medium to obtain a slurry followed by coating onto a positive electrode current collector and drying.

A metal material such as aluminum, stainless steel, nickel plating, titanium, tantalum, and a carbon material such as carbon cloth or carbon paper is normally used for the material of the positive electrode current collector. In addition, examples of the shape thereof in the case of a metal material include a metal foil, metal cylinder, metal coil, metal plate, metal thin film, expanded metal, perforated metal and metal foam, while those in the case of a carbon material include a carbon plate, carbon thin film and carbon cylinder. Furthermore, the thin film may be suitably formed into the form of a mesh.

In the case of using a thin film for the positive electrode current collector, although the thickness thereof is arbitrary, normally it is preferably within a range of 1 µm to 100 mm. If the thickness is below the aforementioned range, there is the possibility of the strength of the thin film required for use as a current collector being insufficient, while on the other hand, if the thickness exceeds the aforementioned range, there is the possibility of handling being impaired.

Although there are no particular limitations on the binder used to produce the positive electrode active material layer provided it is a material that is stable with respect to the liquid medium used when producing the electrode in the case of a coating method, specific examples thereof include resin-based polymers such as polyethylene, polypropylene, polyethylene terephthalate, polymethyl methacrylate, aromatic polyamides, cellulose and nitrocellulose, rubber-like polymers such as styrene-butadiene rubber (SBR), acrylonitrile-butadiene rubber (NBR), fluorine-containing rubber, isoprene rubber, butadiene rubber and ethylene-propylene rubber, thermoplastic elastomer-like polymers such as styrene-butadiene-styrene block copolymers and hydrogenation products thereof, ethylene-propylene-diene ternary copolymers (EPDM), styrene-ethylene-butadiene-ethylene copolymers and styrene-isoprene-styrene block copolymers and hydrogenation products thereof, soft resin-like polymers such as syndiotactic 1,2-polybutadiene, polyvinyl acetate, ethylene-vinyl acetate copolymers and propylene-α-olefin copolymers, fluorine-based polymers such as polyvinylidene fluoride, polytetrafluoroethylene, fluorinated polyvinylidene fluoride and polytetrafluoroethylene-ethylene copolymers, and polymer compositions having ion conductivity of alkaline metal ions (particularly lithium ions). Furthermore, one type of these substances may be used alone or two or more types may be used in combination in an arbitrary combination and ratio.

The ratio of binder in the positive electrode active material layer is normally 0.1% by mass to 80% by mass. If the ratio of binder is excessively low, there is the possibility of mechanical strength of the positive electrode being insufficient preventing it from being able to retain the positive electrode active material while also causing exacerbation of battery performance such as cycle characteristics, and on the other hand, if the ratio of binder is excessively high, there is the possibility of this leading to a decrease in battery capacity and electrical conductivity.

A conductive material for enhancing electrical conductivity is normally contained in the positive electrode active material layer. There are no particular limitations on the type thereof, and specific examples include metal materials such as copper and nickel, and carbon materials such as graphite in the form of natural graphite and artificial graphite, carbon black in the form of acetylene black, and amorphous carbon in the form of needle coke. Furthermore, one type of these substances may be used alone or two or more types may be used in combination in an arbitrary combination and ratio. The ratio of conductive material in the positive electrode active material layer is normally 0.01% by mass to 50% by mass. If the ratio of conductive material is excessively low, electrical conductivity may be inadequate, while if the ratio is excessively high, battery capacity may decrease.

There are no particular limitations on the type of liquid medium for forming the slurry provided it is a solvent that is capable of dissolving or dispersing the positive electrode materials, i.e., the lithium-transition metal-based compound, binder, and the conductive material and thickener used as necessary, and both an aqueous solvent and organic solvent may be used. Examples of aqueous solvents include water and alcohol, while examples of organic solvents include N-methylpyrrolidone (NMP), dimethylformamide, dimethylacetoamide, methyl ethyl ketone, cyclohexanone, methyl acetate, methyl acrylate, diethyltriamine, N,N-dimethylaminopropylamine, ethylene oxide, tetrahydrofuran (THF), toluene, acetone, dimethyl ether, dimethylacetamide, hexamethylphosphoramide, dimethylsulfoxide, benzene, xylene, quinoline, pyridine, methylnaphthalene and hexane. In the case of using an aqueous solvent in particular, a dispersant is added together with thickener followed by forming into a slurry using SBR or other latex. Furthermore, one type of these solvents may be used alone or two or more types may be used in combination in an arbitrary combination and ratio.

The content ratio of the lithium-transition metal-based compound powders used for the positive electrode material in the positive electrode active material layer is normally 10% by mass to 99.9% by mass. If the ratio of lithium-transition metal-based compound powders in the positive electrode active material layer is excessively high, strength of the positive electrode tends to be inadequate, while if the ratio is excessively low, the resulting battery may be inadequate in terms of capacity.

In addition, the thickness of the positive electrode active material layer is normally about 10 am to 200 km.

The electrode density of the positive electrode after pressing is normally 2.2 g/cm$^3$ to 4.2 g/cm$^3$.

Furthermore, after obtaining the positive electrode active material layer by coating and drying, the positive electrode active material is preferably subjected to consolidation by roller pressing or the like in order to increase the packing density thereof.

A positive electrode for a lithium secondary battery can be prepared in this manner.

4-4. Separator

A separator is normally interposed between the positive electrode and negative electrode in order to prevent short-circuit. In this case, the nonaqueous electrolyte solution of the present invention is normally used by impregnating the separator with this solution.

There are no particular limitations on the material and shape of the separator, and a known separator can be arbitrarily employed provided it does not significantly impair the effects of the present invention. Among these, a material such as resin, glass fiber and an inorganic substance, which has been formed with a material that is stable with respect to the nonaqueous electrolyte solution of the present invention, is used, and a material in the form of a porous sheet or nonwoven fabric having superior liquid retention is used preferably.

Examples of resin and glass fiber separator materials used include polyolefins such as polyethylene and polypropylene, aromatic polyamides, polytetrafluoroethylene, polyether sulfone and glass filters. Among these, glass filters and polyolefins are preferable, and polyolefins are more preferable. One type of these materials may be used alone or two or more types may be used in combination in an arbitrary combination and ratio.

Although the thickness of the separator is arbitrary, it is normally 1 µm or more, preferably 5 µm or more and more preferably 10 μm or more, and normally 50 μm or less, preferably 40 μm or less and more preferably 30 μm or less. If the thickness of the separator is far below the aforementioned range, insulating properties and mechanical strength may decrease. If the thickness greatly exceeds the aforementioned range, not only battery performance such as rate characteristics, but also energy density in terms of the entire nonaqueous electrolyte secondary battery may decrease.

Moreover, although the porosity of the separator is arbitrary in the case of using a porous material such as a porous sheet or nonwoven fabric as the separator, it is normally 20% or more, preferably 35% or more and more preferably 45% or more, and normally 90% or less, preferably 85% or less and more preferably 75% or less. If porosity is far below the aforementioned range, film resistance may become excessively large which tends to cause exacerbation of rate characteristics. In addition, if porosity greatly exceeds the aforementioned range, mechanical strength and insulating properties of the separator tend to decrease.

In addition, although the average pore diameter of the separator is also arbitrary, it is normally 0.5 μm or less and preferably 0.2 μm or less, and normally 0.05 jam or more. If the average pore diameter exceeds the aforementioned range, there may be increased susceptibility to the occurrence of short-circuit. In addition, if the average pore diameter is below the aforementioned range, film resistance may become large and rate characteristics may decrease.

On the other hand, an oxide such as alumina and silicon dioxide, a nitride such as aluminum nitride and silicon nitride, and a sulfate such as barium sulfate and calcium sulfate is used as an inorganic material, and is used in the form of particles or fibers.

A thin film of a nonwoven fabric, woven fabric, microporous film and the like is used for the form of the separator. In the case of a thin film, that having a pore diameter of 0.01 μm to 1 μm and thickness of 5 μm to 50 μm is used preferably. In addition to the aforementioned independent thin films, a separator can be used that is obtained by forming a compound porous layer containing particles of the aforementioned inorganic material on the surface layer of the positive electrode and/or negative electrode using a resin binder. For example, alumina particles having a 90% particle diameter of less than 1 μm are made to form a porous layer on both sides of a positive electrode by using fluororesin as binder.

The characteristics of the separator in the nonaqueous electrolyte secondary battery can be determined using the Gurley value. The Gurley value refers to the difficulty at which air is able to pass through a film in the direction of film thickness, and since it is represented as the number of seconds required for 100 ml of air to pass through the film, a smaller value indicates greater ease of passage of air, while a larger value indicates greater difficulty of passage of air. Namely, a small value means that communication of the film in the direction of film thickness is favorable, while a large value means that communication of the film in the direction of film thickness is poor. Communication refers to the degree at which pores are connected in the direction of film thickness. If the Gurley value of the separator of the present invention is low, it can be used in various applications. For example, in the case of using as the separator of a nonaqueous lithium secondary battery, a low Gurley value means that lithium ions are able to easily move, resulting in superior battery performance and thereby making this preferable. Although the Gurley value of the separator is arbitrary, it is preferably 10 seconds/100 ml to 1000 seconds/100 ml, more preferably 15 seconds/100 ml to 800 seconds/100 ml, and even more preferably 20 seconds/100 ml to 500 seconds/100 ml. If the Gurley value is 1000 seconds/100 ml or less, electrical resistance is substantially low, thereby making it preferable for use as a separator.

4.5 Battery Design

<Electrode Group>

The electrode group has a layered structure in which the aforementioned separator is interposed between the aforementioned positive electrode plate and negative electrode plate, or has a structure in which the aforementioned positive electrode plate and negative electrode plate are wound in the form of a spiral with the aforementioned separator interposed there between. The proportion of the volume of the electrode group to the volume inside the battery (to be referred to as the electrode group occupancy rate) is normally 40% or more and preferably 50% or more, and normally 90% or less and preferably 80% or less.

If the battery group occupancy rate is below the aforementioned range, battery capacity becomes small. In addition, if the battery group occupancy rate exceeds the aforementioned range, there is a shortage of void space and members may expand or vapor pressure of liquid components of the electrolyte may increase as a result of the battery reaching a high temperature, thereby causing an increase in internal pressure which may lower repeated charge/discharge performance or various characteristics such as high-temperature storage characteristics of the battery, and ultimately result in activation of a gas release valve that releases internal pressure to the outside.

<Outer Package Case>

There are no particular limitations on the material of the outer package case provided it is a substance that is stable with respect to the nonaqueous electrolyte solution used. More specifically, metals such as nickel-plated steel plate, stainless steel, aluminum or aluminum alloy or magnesium alloy, or laminated films of resin and aluminum foil are used. From the viewpoint of reducing weight, a metal consisting of aluminum or aluminum alloy or a laminated film is used preferably.

Examples of outer package cases using metals include those having a sealed structure obtained by welding pieces of metal by laser welding, resistance welding or ultrasonic welding, and those having a caulked structure obtained by using the aforementioned metals with a resin gasket interposed there between. Examples of outer package cases using the aforementioned laminated film include those having a sealed structure obtained by thermal fusion bonding of corresponding resin layers. A resin differing from the resin used for the laminated film may be interposed between the aforementioned resin layers in order to enhance sealability. In particular, since resin and metal are joined in the case of employing a sealed structure obtained by thermal fusion bonding of resin layers via a current collector terminal, a resin having a polar group or a modified resin introduced with a polar group is preferably used as the resin.

<Protective Element>

A positive temperature coefficient (PTC), for which the resistance thereof increases during abnormal generation of heat or when an excessively large current flows, a temperature fuse, a thermistor or a valve that interrupts the flow of current to a circuit due to a sudden increase in battery internal pressure or internal temperature during abnormal generation of heat (current cutoff valve) and the like can be used as a protective element. An element that uses conditions such that it does not activate during normal use at high current is preferably selected for the aforementioned protective element, and more preferably a design is employed that does result in abnormal generation of heat or thermal runaway even a protective element is not present.

(Outer Package) The nonaqueous electrolyte secondary battery of the present invention is normally composed by housing the previously described nonaqueous electrolyte solution, negative electrode, positive electrode, separator and the like in an outer package. There are no particular limitations on this outer package, and a known outer package can be arbitrarily employed provided it does not significantly impair the effects of the present invention. More specifically, although the material of the outer package is arbitrary, nickel-plated iron, stainless steel, aluminum or alloys thereof, nickel, titanium and the like are normally used.

In addition, the shape of the outer package is also arbitrary, and may be cylindrical, square, laminated, coin-shaped or oversized.

EXAMPLES

Although the following provides a more detailed explanation of the present invention by indicating examples and comparative examples, the present invention is not limited to these examples. Examples and comparative examples based on the first embodiment of the present invention are indicated below.

Compounds used in the present examples that contain a structure represented by general formula (A) are indicated below.

[Chemical 29]

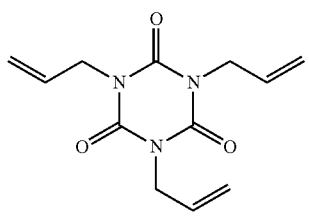

Triallyl isocyanurate (a)

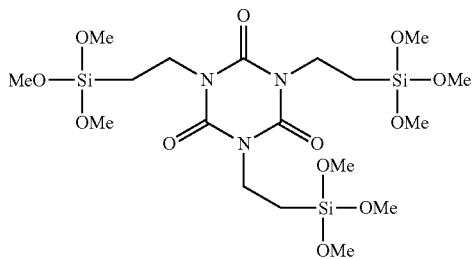

Tris[3-(trimethoxysilyl)propyl]isocyanurate (b)

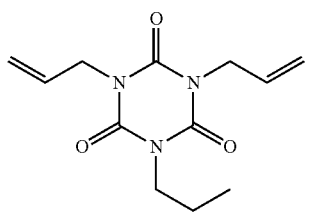

Diallyl propyl isocyanurate (i)

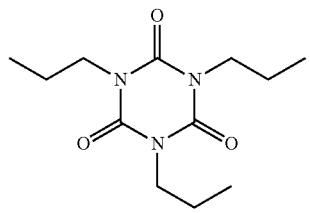

Tripropyl isocyanurate (j)

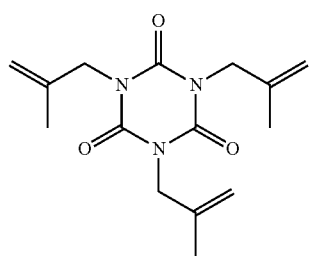

Trimethallyl isocyanurate (r)

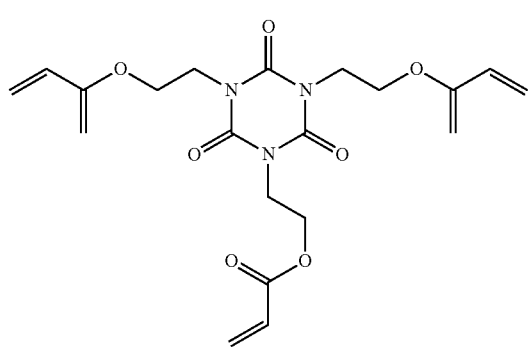

Tris(2-acryloxyloxyethyl) isocyanurate (s)

At least one type of compound selected from the group consisting of (1) nitrile compounds, isocyanate compounds, difluorophosphates, fluorosulfonates, lithium bis(fluorosulfonyl)imides and compound represented by general formula (B) used in the present examples are indicated below.

[Chemical 30]

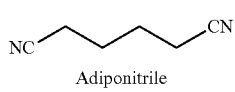

Adiponitrile (c)

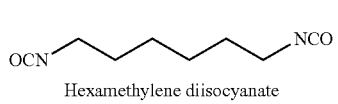

Hexamethylene diisocyanate (d)

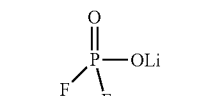

Lithium difluorophosphate (e)

-continued

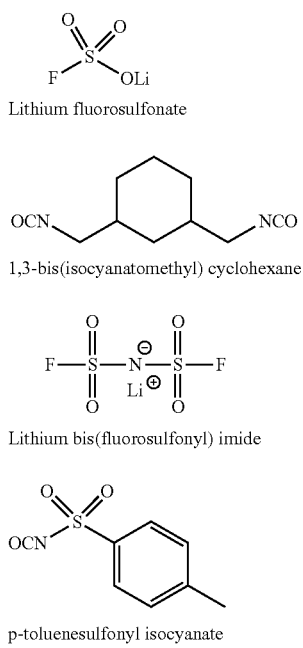

Lithium fluorosulfonate (f)

1,3-bis(isocyanatomethyl) cyclohexane (l)

Lithium bis(fluorosulfonyl) imide (m)

p-toluenesulfonyl isocyanate (n)

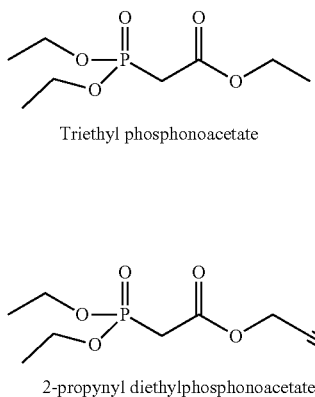

Triethyl phosphonoacetate (p)

2-propynyl diethylphosphonoacetate (q)

(2) The cyclic carbonate compound having a fluorine atom used in the present examples is shown below.

[Chemical 31]

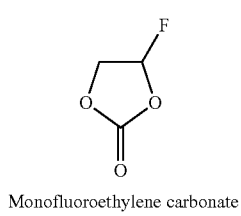

Monofluoroethylene carbonate (g)

Assistants (acid anhydride compounds: maleic anhydride, succinic anhydride, cyclic carbonate having a carbon-carbon unsaturated bond: vinylene carbonate) used in the present examples are shown below.

[Chemical 32]

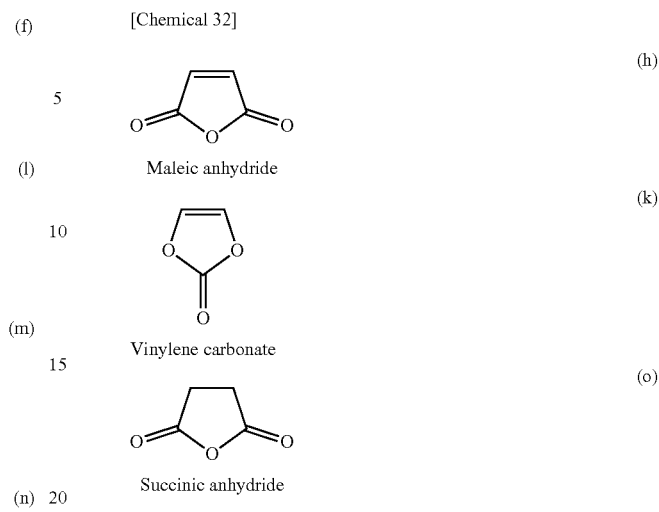

Maleic anhydride (h)

Vinylene carbonate (k)

Succinic anhydride (o)

Examples 1-1 to 1-6 and Comparative Examples 1-1 to 1-4

[Preparation of Nonaqueous Electrolyte Solutions]

Sufficiently dried $LiPF_6$ was dissolved at 1 mol/L (concentration in nonaqueous electrolyte solution) in a mixture of monofluoroethylene carbonate and ethyl methyl carbonate (EMC) (volume ratio: 2:8) under a dry argon atmosphere (to be referred to as Reference Electrolyte Solution 1). Compounds were added to Reference Electrolyte Solution 1 at the ratios described in the following Table 1 to prepare electrolyte solutions. However, Reference Electrolyte Solution 1 per se was used in Comparative Example 1-1.

[Fabrication of Positive Electrode]

94% by weight of a positive electrode active material in the form of lithium cobalt oxide ($LiCoO_2$), 3% by weight of a conductive material in the form of acetylene black and 3% by weight of a binder in the form of polyvinylidene fluoride (PVdF) were mixed in N-methylpyrrolidone solvent with a disperser to form a slurry. The slurry was then uniformly coated onto both sides of aluminum foil having a thickness of 21 μm and dried followed by pressing to obtain a positive electrode.

[Fabrication of Negative Electrode]

As negative electrode active materials, silicon powders and graphite powders were mixed with a binder followed by the addition of an N-methylpyrrolidone solution thereto and mixing with a disperser to form a slurry. The resulting slurry was uniformly coated onto a negative electrode current collector in the form of copper foil having a thickness of 20 μm to obtain a negative electrode followed by cutting out a piece of the active material having a width of 30 mm and length of 40 mm to obtain a negative electrode. Furthermore, this negative electrode was used after vacuum-drying for 12 hours at 60° C.

[Production of Nonaqueous Electrolyte Batteries (Laminated Type)]

The aforementioned positive electrode and negative electrode along with a separator made of polyolefin were laminated in the order of the negative electrode, separator and positive electrode. The battery element obtained in this manner was then wrapped with an aluminum laminated film followed by injecting the electrolyte solution to be subsequently described and vacuum-sealing to fabricate a sheet-like nonaqueous electrolyte secondary battery.

<Evaluation of Nonaqueous Electrolyte Secondary Batteries>
[High-Temperature Cycle Test]

After charging a nonaqueous electrolyte secondary battery in the form of a coin-shaped cell at a constant current equivalent to 0.05 C for 4 hours in a constant temperature bath at 25° C. (to be suitably referred to as "CC charging"), the battery was charged at a constant current of 0.2 C and constant voltage to 4.0 V (to be suitably referred to as "CC-CV charging"). Subsequently, the battery was discharged to 2.75 V at 0.2 C. Continuing, after CC-CV charging to 4.0 V at 0.2 C, the battery was discharged to 2.75 V at 0.2 C to stabilize the nonaqueous electrolyte secondary battery. Subsequently, after CC-CV charging to 4.2 V at 0.2 C, the battery was discharged to 2.75 V at 0.2 C to carry out initial conditioning.

Following initial conditioning, the cell was subjected to 200 cycles of a process consisting of CC-CV charging to 4.2 V at 0.5 C at 45° C. followed by discharging to 2.75 V at a constant current of 0.5 C in a constant temperature bath. The capacity after the 200th cycle was defined as the "200 cycle capacity". Here, 1 C represents the current value at which the reference capacity of the battery is discharged for 1 hour, and for example, 0.2 C refers to a current value equal to one-fifth that value.

The following Table 1 indicates the 200 cycle capacities standardized based on the value of Comparative Example 1-1. Values shown in parentheses in the table indicate percent by mass (wt %).

TABLE 1

| | Electrolyte Solution | Additive I | Additive II | Additive II | 200 Cycle Capacity (%) |
|---|---|---|---|---|---|
| Example 1-1 | 1M LiPF$_6$ MFEC/EMC = 2/8 | Compound (b) (0.5) | Compound (e) (0.5) | | 267 |
| Example 1-2 | | Compound (a) (0.5) | Compound (e) (0.5) | — | 273 |
| Example 1-3 | | Compound (a) (0.25) | Compound (h) (0.25) | Compound (e) (0.5) | 286 |
| Example 1-4 | | Compound (a) (0.25) | Compound (h) (0.25) | Compound (f) (0.5) | 241 |
| Example 1-5 | | Compound (a) (0.25) | Compound (e) (0.5) | — | 215 |
| Example 1-6 | | Compound (i) (0.5) | Compound (e) (0.5) | | 204 |
| Comparative Example 1-1 | | — | — | — | 100 |
| Comparative Example 1-2 | | — | Compound (h) (0.25) | — | 174 |
| Comparative Example 1-3 | | — | Compound (e) (0.5) | — | 177 |
| Comparative Example 1-4 | | — | Compound (f) (0.5) | — | 134 |

Examples 2-1 to 2-3 and Comparative Examples 2-1 to 2-4

[Preparation of Nonaqueous Electrolyte Solutions]

Sufficiently dried LiPF$_6$ was dissolved at 1 mol/L (concentration in nonaqueous electrolyte solution) in a mixture of EMC and compound (g) at the ratios shown in the following Table 2 under a dry argon atmosphere. Compounds were added thereto at the ratios described in the following Table 2 to prepare electrolyte solutions.

[Fabrication of Positive Electrode]

97% by mass of a positive electrode active material in the form of lithium cobalt oxide (LiCoO$_2$), 1.5% by mass of a conductive material in the form of acetylene black and 1.5% by mass of a binder in the form of polyvinylidene fluoride (PVdF) were mixed in N-methylpyrrolidone solvent with a disperser to form a slurry. The slurry was then uniformly coated onto both sides of aluminum foil having a thickness of 21 μm and dried followed by pressing to obtain a positive electrode.

[Fabrication of Negative Electrode]

A thickener and binder respectively in the form of 1 part by mass of an aqueous dispersion of sodium carboxymethyl cellulose (1% by mass concentration of sodium carboxymethyl cellulose) and 1 part by mass of an aqueous dispersion of styrene-butadiene rubber (50% by mass concentration of styrene-butadiene rubber) were added to 100 parts by mass of a negative electrode active material in the form of graphite powders followed by mixing with a disperser to form a slurry. This slurry was uniformly coated onto one side of copper foil having a thickness of 12 μm followed by drying and pressing to obtain a negative electrode.

[Production of Nonaqueous Electrolyte Batteries (Coin Type)]

The aforementioned positive electrode and negative electrode along with a nonaqueous electrolyte solution prepared in each of the examples and comparative examples were used to fabricate a coin-shaped cell according to the procedure described below. Namely, the positive electrode was housed in a stainless steel case also serving as a positive electrode conductor, and the negative electrode was placed thereon via a polyethylene separator impregnated with the electrolyte solution. The case and sealing plate also serving as a negative electrode conductor were sealed by caulking with an insulating gasket interposed therebetween to fabricate a coin-shaped cell.

[Battery Evaluation]

In a constant temperature bath at 25° C., after charging a nonaqueous electrolyte secondary battery of the coin-shaped cell at a constant current equivalent to 0.05 C for 6 hours (to be suitably referred to as "CC charging"), the battery was discharged to 3.00 V at 0.2 C and the value obtained from the resulting capacity by calculating [discharge capacity]/[charge capacity] was taken to be the initial efficiency. The battery was then charged at a constant current of 0.2 C and constant voltage to 4.1 V (to be suitably referred to as "CC-CV charging"). Subsequently, the battery was discharged to 3.00 V at 0.2 C to stabilize the nonaqueous electrolyte secondary battery. Subsequently, the battery was subjected to 3 cycles of a process consisting of CC-CV charging to 4.33 V at 0.2 C followed by discharging to 3.00 V at 0.2 C.

Here, 1 C represents the current value at which the reference capacity of the battery is discharged for 1 hour, and for example, 0.2 C refers to a current value equal to one-fifth that value.

[Evaluation of High-Temperature Storage Characteristics]

After CC-CV charging (cutoff at 0.05 C) the nonaqueous electrolyte battery following evaluation of initial capacity to 4.33 V at 0.2 C and 25° C., the battery was subjected to high-temperature storage under conditions of 85° C. for 24 hours. After adequately allowing the battery to cool, the battery was discharged to 3 V at 0.2 C and 25° C. followed by determination of capacity after evaluating high-temperature storage characteristics, and this capacity was defined as "residual capacity after high-temperature storage".

The following Table 2 indicates the initial efficiency, 0.2 C capacity and residual capacity after high-temperature storage testing standardized based on the values of Comparative Example 2-1.

adding (k) vinylene carbonate (VC) and (g) monofluoroethylene carbonate at 2.0% by mass each (to be referred to as Reference Electrolyte Solution 3-A). Compounds were added to the entire Reference Electrolyte Solution 3-A at the ratios described in the following Table 3 to prepare electrolyte solutions. However, Reference Electrolyte Solution 3-A per se was used in Comparative Example 3-A-1.

[Fabrication of Positive Electrode]

85% by mass of a positive electrode active material in the form of lithium-nickel-cobalt-manganese compound oxide (NMC), 10% by mass of a conductive material in the form of acetylene black and 5% by mass of a binder in the form of polyvinylidene fluoride (PVdF) were mixed in N-methylpyrrolidone solvent with a disperser to form a slurry. The slurry was then uniformly coated onto both sides of aluminum foil having a thickness of 21 µm and dried followed by pressing to obtain a positive electrode.

[Fabrication of Negative Electrode]

50 g of Si fine particles having a mean particle diameter of 0.2 µm were dispersed in 2000 g of flaky graphite having a mean particle diameter of 35 µm and then charged into a hybridization system (Nara Machinery Co., Ltd.) followed

TABLE 2

|  | Composition | | Battery Evaluation | | |
|---|---|---|---|---|---|
|  | Compound (a) (wt %) | Compound (g) (wt %) | Initial efficiency (%) | 0.2 C capacity (%) | Residual capacity after high-temperature storage (%) |
| Example 2-1 | 0.5 | 5 | 107 | 112 | 129 |
| Example 2-2 | 0.5 | 25 | 103 | 109 | 126 |
| Example 2-3 | 0.5 | 40 | 101 | 106 | 122 |
| Comparative Example 2-1 | 0.5 | 60 | 100 | 100 | 100 |
| Comparative Example 2-2 | 0.5 | 0 | 88 | 101 | 86 |
| Comparative Example 2-3 | 0 | 25 | 96 | 103 | 105 |
| Comparative Example 2-4 | 0 | 0 | 93 | 95 | 80 |

When Examples 2-1 to 2-3 are compared with Comparative Example 2-1, initial efficiency was determined to improve if the content of compound (g) with respect to the electrolyte solution is 50% by mass or less in comparison with Comparative Example 2-1 in which the content exceeds 50% by mass. When focusing on Comparative Example 2-2, since characteristics do not reach those of Examples 2-1 to 2-3 if compound (g) is not contained, containing a specific amount of compound (g) in the electrolyte solution was determined to be important. In addition, it was determined from Comparative Examples 2-2 and 2-3 that the addition of both compound (a) and compound (g) greatly improves characteristics since the characteristics thereof do not reach either the initial efficiency or initial capacity of Example 2-1 when compound (a) and compound (g) are respectively used alone. In addition, the same can be said with respect to residual capacity after high-temperature storage testing.

Examples 3-A-1 to 3-A-15 and Comparative Examples 3-A-1 to 3-A-5

[Preparation of Nonaqueous Electrolyte Solutions]

Sufficiently dried $LiPF_6$ was dissolved at 1 mol/L (concentration in nonaqueous electrolyte solution) in a mixture of ethylene carbonate and diethyl carbonate (DEC) (volume ratio: 3:7) under a dry argon atmosphere, followed by further by treating by circulating or retaining in the system for 180 seconds at a rotor rotating speed of 7000 rpm to obtain a complex of Si and graphite particles. The resulting complex was mixed with an organic compound in the form of coal tar pitch serving as a carbon substance so that the coverage rate after firing was 7.5% followed by kneading and dispersing with a twin screw kneader. The resulting dispersion was introduced into a firing furnace and fired for 3 hours at 1000° C. under of a nitrogen atmosphere. The resulting fired product was further pulverized with a hammer mill and passed through a sieve (45 µm) to fabricate a negative electrode active material. The elemental silicon content, mean particle diameter d50, tap density and specific surface area as measured according to the previously described methods were 2.0% by mass, 20 µm, 1.0 g/cm$^3$ and 7.2 m$^2$/g, respectively.

97.5 parts by mass of the negative electrode active material along with a thickener and binder respectively in the form of 1 part by mass of an aqueous dispersion of sodium carboxymethyl cellulose (1% by mass concentration of sodium carboxymethyl cellulose) and 1.5 parts by mass of an aqueous dispersion of styrene-butadiene rubber (50% by mass concentration of styrene-butadiene rubber) were added followed by mixing with a disperser to form a slurry. This slurry was uniformly coated onto one side of copper foil having a thickness of 10 μm followed by drying and pressing to obtain a negative electrode.

[Production of Nonaqueous Electrolyte Batteries (Laminated Type)]

The aforementioned positive electrode and negative electrode along with a separator made of polyolefin were laminated in the order of the negative electrode, separator and positive electrode. The battery element obtained in this manner was then wrapped with an aluminum laminated film followed by injecting the electrolyte solution to be subsequently described and vacuum-sealing to fabricate a sheet-like nonaqueous electrolyte secondary battery.

<Evaluation of Nonaqueous Electrolyte Secondary Batteries>

[High-Temperature Cycle Test]

A nonaqueous electrolyte secondary battery in the form of a laminated cell was charged to 4.0 V at a constant voltage and constant current at a current equivalent to 0.05 C. Subsequently, the battery was discharged to 2.5 V at 0.05 C. Continuing, after CC-CV charging to 4.0 V at 0.2 C, the battery was discharged to 2.5 V at 0.2 C to stabilize the nonaqueous electrolyte secondary battery. Subsequently, after CC-CV charging to 4.2 V at 0.2 C, the battery was discharged to 2.5 V at 0.2 C to carry out initial conditioning.

Following initial conditioning, the cell was subjected to 100 cycles of a process consisting of CC-CV charging to 4.2 V at 0.5 C followed by discharging to 2.5 V at a constant current of 0.5 C in a constant temperature bath at 45° C. The capacity after the 100th cycle was defined as the "100 cycle capacity". In addition, the thickness of the battery before and after cycling was measured. Changes in battery thickness accompanying cycling were defined as "battery swelling".

The following Table 3 indicates the 100 cycle capacities and battery swelling standardized based on the values of Comparative Example 3-A-1.

TABLE 3

| | Electrolyte Solution | Additive I (wt %) | Additive II (wt %) | Additive III (wt %) | Additive IV (wt %) | 100 Cycle Capacity (%) | Battery Swelling (%) |
|---|---|---|---|---|---|---|---|
| Example 3-A-1 | 1M LiPF$_6$ EC/DEC = 3/7 | Compound (a) (0.5) | — | — | — | 108 | 83 |
| Example 3-A-2 | VC (2.0 wt %) MFEC (2.0 wt %) | Compound (a) (0.5) | Compound (e) (0.5) | — | — | 116 | 76 |
| Example 3-A-3 | | Compound (a) (0.5) | — | Compound (d) (0.5) | — | 117 | 78 |
| Example 3-A-4 | | Compound (a) (0.5) | Compound (e) (0.5) | Compound (d) (0.5) | — | 127 | 70 |
| Example 3-A-5 | | Compound (a) (0.5) | — | Compound (l) (0.5) | — | 111 | 79 |
| Example 3-A-6 | | Compound (a) (0.5) | Compound (e) (0.5) | Compound (l) (0.5) | — | 121 | 73 |
| Example 3-A-7 | | Compound (a) (0.5) | — | — | Compound (o) (0.5) | 115 | 77 |
| Example 3-A-8 | | Compound (a) (0.5) | Compound (e) (0.5) | — | Compound (o) (0.5) | 124 | 72 |
| Example 3-A-9 | | Compound (a) (0.5) | Compound (m) (1.0) | — | — | 116 | 77 |
| Example 3-A-10 | | Compound (a) (0.5) | Compound (m) (3.0) | — | — | 125 | 69 |
| Example 3-A-11 | | Compound (a) (0.5) | Compound (m) (1.0) | Compound (l) (0.5) | — | 122 | 73 |
| Example 3-A-12 | | Compound (a) (0.5) | Compound (m) (3.0) | Compound (l) (0.5) | — | 128 | 67 |
| Example 3-A-13 | | Compound (a) (0.5) | — | — | — | 106 | 88 |
| Example 3-A-14 | | Compound (r) (0.5) | — | — | — | 103 | 86 |
| Example 3-A-15 | | Compound (j) (0.5) | — | — | — | 102 | 86 |
| Comparative Example 3-A-1 | | — | — | — | — | 100 | 100 |
| Comparative Example 3-A-2 | | — | Compound (e) (0.5) | — | — | 112 | 97 |
| Comparative Example 3-A-3 | | — | — | Compound (d) (0.5) | — | 103 | 95 |
| Comparative Example 3-A-4 | | — | — | Compound (l) (0.5) | — | 106 | 98 |
| Comparative Example 3-A-5 | | — | Compound (m) (1.0) | — | — | 110 | 94 |

Examples 3-B-1 and 3-B-2 and Comparative Examples 3-B-1 to 3-B-3

[Preparation of Nonaqueous Electrolyte Solutions]

Sufficiently dried LiPF$_6$ was dissolved at 1 mol/L (concentration in nonaqueous electrolyte solution) in a mixture of ethylene carbonate and diethyl carbonate (DEC) (volume ratio: 3:7) under a dry argon atmosphere (to be referred to as Reference Electrolyte Solution 3-B). Compounds were added to the entire Reference Electrolyte Solution 3-B at the ratios described in the following Table 4 to prepare electrolyte solutions. However, Reference Electrolyte Solution 3-B per se was used in Comparative Example 3-B-1.

[Fabrication of Positive Electrode]

85% by mass of a positive electrode active material in the form of lithium-nickel-cobalt-manganese compound oxide (NMC), 10% by mass of a conductive material in the form of acetylene black and 5% by mass of a binder in the form of polyvinylidene fluoride (PVdF) were mixed in N-methylpyrrolidone solvent with a disperser to form a slurry. The slurry was then uniformly coated onto both sides of aluminum foil having a thickness of 21 μm and dried followed by pressing to obtain a positive electrode.

[Fabrication of Negative Electrode]

50 g of Si fine particles having a mean particle diameter of 0.2 μm were dispersed in 2000 g of flaky graphite having a mean particle diameter of 35 μm and then charged into a hybridization system (Nara Machinery Co., Ltd.) followed by treating by circulating or retaining in the system for 180 seconds at a rotor rotating speed of 7000 rpm to obtain a complex of Si and graphite particles. The resulting complex was mixed with an organic compound in the form of coal tar pitch serving as a carbon substance so that the coverage rate after firing was 7.5% followed by kneading and dispersing with a twin screw kneader. The resulting dispersion was introduced into a firing furnace and fired for 3 hours at 1000° C. under a nitrogen atmosphere. The resulting fired product was further pulverized with a hammer mill and passed through a sieve (45 μm) to fabricate a negative electrode active material. The elemental silicon content, mean particle diameter d50, tap density and specific surface area as measured according to the previously described methods were 2.0% by mass, 20 μm, 1.0 g/cm³ and 7.2 m²/g, respectively.

97.5 parts by mass of the negative electrode active material along with a thickener and binder respectively in the form of 1 part by mass of an aqueous dispersion of sodium carboxymethyl cellulose (1% by mass concentration of sodium carboxymethyl cellulose) and 1.5 parts by mass of an aqueous dispersion of styrene-butadiene rubber (50% by mass concentration of styrene-butadiene rubber) were added followed by mixing with a disperser to form a slurry. This slurry was uniformly coated onto one side of copper foil having a thickness of 10 μm followed by drying and pressing to obtain a negative electrode.

[Production of Nonaqueous Electrolyte Batteries (Laminated Type)]

The aforementioned positive electrode and negative electrode along with a separator made of polyolefin were laminated in the order of the negative electrode, separator and positive electrode. The battery element obtained in this manner was then wrapped with an aluminum laminated film followed by injecting the electrolyte solution to be subsequently described and vacuum-sealing to fabricate a sheet-like nonaqueous electrolyte secondary battery.

<Evaluation of Nonaqueous Electrolyte Secondary Batteries>

[High-Temperature Cycle Test]

A nonaqueous electrolyte secondary battery in the form of a laminated cell was charged to 4.0 V at a constant voltage and constant current at a current equivalent to 0.05 C. Subsequently, the battery was discharged to 2.5 V at 0.05 C. Continuing, after CC-CV charging to 4.0 V at 0.2 C, the battery was discharged to 2.5 V at 0.2 C to stabilize the nonaqueous electrolyte secondary battery. Subsequently, after CC-CV charging to 4.2 V at 0.2 C, the battery was discharged to 2.5 V at 0.2 C to carry out initial conditioning.

Following initial conditioning, the cell was subjected to 100 cycles of a process consisting of CC-CV charging to 4.2 V at 0.5 C followed by discharging to 2.5 V at a constant current of 0.5 C in a constant temperature bath at 45° C. The capacity after the 100th cycle was defined as the "100 cycle capacity". In addition, the thickness of the battery before and after cycling was measured. Changes in battery thickness accompanying cycling were defined as "battery swelling".

The following Table 4 indicates the 100 cycle capacities and battery swelling standardized based on the values of Comparative Example 3-B-1.

TABLE 4

| | Electrolyte Solution | Additive I (wt %) | Additive II (wt %) | Additive III (wt %) | Additive IV (wt %) | 100 Cycle Capacity (%) | Battery Swelling (%) |
|---|---|---|---|---|---|---|---|
| Example 3-B-1 | 1M LiPF$_6$ EC/DEC = 3/7 | Compound (a) (0.5) | Compound (e) (0.5) | — | — | 278 | 59 |
| Example 3-B-2 | | Compound (a) (0.5) | Compound (e) (0.5) | Compound (d) (0.5) | Compound (g) (4.0) | 474 | 34 |
| Comparative Example 3-B-1 | | — | — | — | — | 100 | 100 |
| Comparative Example 3-B-2 | | Compound (a) (0.5) | — | — | — | 156 | 81 |
| Comparative Example 3-B-3 | | — | Compound (e) (0.5) | — | — | 267 | 61 |

Examples 4-1 to 4-7 and Comparative Examples 4-1 to 4-3

[Preparation of Nonaqueous Electrolyte Solutions]

Sufficiently dried LiPF$_6$ was dissolved at 1 mol/L (concentration in nonaqueous electrolyte solution) in a mixture of ethylene carbonate and diethyl carbonate (DEC) (volume ratio: 3:7) under a dry argon atmosphere followed by further adding vinylene carbonate (VC) and fluoroethylene carbonate in an amount of 2.0% by mass each (to be referred to as Reference Electrolyte Solution 4). Compounds were added to the entire Reference Electrolyte Solution 4 at the ratios described in the following Table 5 to prepare electrolyte solutions. However, Reference Electrolyte Solution 4 per se was used in Comparative Example 4-1.

[Fabrication of Positive Electrode]

85% by mass of a positive electrode active material in the form of lithium-nickel-cobalt-manganese compound oxide (NMC), 10% by mass of a conductive material in the form of acetylene black and 5% by mass of a binder in the form of polyvinylidene fluoride (PVdF) were mixed in N-methylpyrrolidone solvent with a disperser to form a slurry. The slurry was then uniformly coated onto both sides of aluminum foil having a thickness of 21 μm and dried followed by pressing to obtain a positive electrode.

[Fabrication of Negative Electrode]

50 g of Si fine particles having a mean particle diameter of 0.2 μm were dispersed in 2000 g of flaky graphite having a mean particle diameter of 35 μm and then charged into a hybridization system (Nara Machinery Co., Ltd.) followed by treating by circulating or retaining in the system for 180 seconds at a rotor rotating speed of 7000 rpm to obtain a complex of Si and graphite particles. The resulting complex was mixed with an organic compound in the form of coal tar pitch serving as a carbon substance so that the coverage rate after firing was 7.5% followed by kneading and dispersing with a twin screw kneader. The resulting dispersion was introduced into a firing furnace and fired for 3 hours at 1000° C. under a nitrogen atmosphere. The resulting fired product was further pulverized with a hammer mill and passed through a sieve (45 μm) to fabricate a negative electrode active material. The elemental silicon content, mean particle diameter d50, tap density and specific surface area as measured according to the previously described methods were 2.0% by mass, 20 μm, 1.0 g/cm$^3$ and 7.2 m$^2$/g, respectively.

97.5 parts by mass of the negative electrode active material along with a thickener and binder respectively in the form of 1 part by mass of an aqueous dispersion of sodium carboxymethyl cellulose (1% by mass concentration of sodium carboxymethyl cellulose) and 1.5 parts by mass of an aqueous dispersion of styrene-butadiene rubber (50% by mass concentration of styrene-butadiene rubber) were added followed by mixing with a disperser to form a slurry. This slurry was uniformly coated onto one side of copper foil having a thickness of 10 μm followed by drying and pressing to obtain a negative electrode.

[Production of Nonaqueous Electrolyte Batteries (Laminated Type)]

The aforementioned positive electrode and negative electrode along with a separator made of polyolefin were laminated in the order of the negative electrode, separator and positive electrode. The battery element obtained in this manner was then wrapped with an aluminum laminated film followed by injecting the electrolyte solution to be subsequently described and vacuum-sealing to fabricate a sheet-like nonaqueous electrolyte secondary battery.

<Evaluation of Nonaqueous Electrolyte Secondary Batteries>

[High-Temperature Cycle Test]

A nonaqueous electrolyte secondary battery in the form of a laminated cell was charged at a constant voltage and constant current to 4.0 V at a current equivalent to 0.05 C. Subsequently, the battery was discharged to 2.5 V at 0.05 C. Continuing, after CC-CV charging to 4.0 V at 0.2 C, the battery was discharged to 2.5 V at 0.2 C, CC-CV charged to 4.2 V at 0.2 C, and discharged to 2.5 V at 0.2 C to stabilize the nonaqueous electrolyte secondary battery. Subsequently, after CC-CV charging to 4.3 V at 0.2 C, the battery was discharged to 2.5 V at 0.2 C to carry out initial conditioning.

Following initial conditioning, the cell was subjected to high-temperature storage under conditions of 60° C. for 168 hours. After adequately allowing the battery to cool, the battery was immersed in an ethanol bath followed by measuring its volume and determining the amount of gas generated from the change in volume before and after storage testing, and this amount was defined as the "storage gas generation". In addition, the battery was discharged to 2.5 V at 0.2 C and 25° C. followed by determination of capacity after evaluating high-temperature storage characteristics, and this capacity was defined as "post-storage 0.2 C capacity".

The following Table 5 indicates the storage gas generation and post-storage 0.2 C capacities standardized based on the values of Comparative Example 4-1.

TABLE 5

| | Electrolyte Solution | Additive I (wt %) | Additive II (wt %) | Additive III (wt %) | Additive IV (wt %) | Additive V (wt %) | Additive VI (wt %) | Storage Gas Generation (%) | Post-Storage 0.2 C Capacity (%) |
|---|---|---|---|---|---|---|---|---|---|
| Example 4-1 | 1M LiPF$_6$ EC/DEC = 3/7 | Compound (k) (2.0) | Compound (g) (2.0) | Compound (a) (0.5) | — | — | — | 41 | 102 |
| Example 4-2 | | Compound (k) (2.0) | Compound (g) (2.0) | Compound (a) (0.5) | Compound (e) (0.5) | — | — | 35 | 104 |
| Example 4-3 | | Compound (k) (2.0) | Compound (g) (2.0) | Compound (a) (0.5) | — | Compound (d) (0.5) | — | 27 | 105 |
| Example 4-4 | | Compound (k) (2.0) | Compound (g) (2.0) | Compound (a) (0.5) | Compound (e) (0.5) | Compound (d) (0.5) | — | 10 | 105 |
| Example 4-5 | | — | Compound (g) (4.0) | Compound (a) (0.5) | Compound (e) (0.5) | Compound (d) (0.5) | — | 7 | 106 |
| Example 4-6 | | Compound (k) (2.0) | Compound (g) (2.0) | Compound (a) (0.5) | — | — | Compound (o) (0.5) | 33 | 105 |
| Example 4-7 | | Compound (k) (2.0) | Compound (g) (2.0) | Compound (a) (0.5) | Compound (e) (0.5) | — | Compound (o) (0.5) | 25 | 106 |
| Comparative Example 4-1 | | Compound (k) (2.0) | Compound (g) (2.0) | — | — | — | — | 100 | 100 |

TABLE 5-continued

| | Electrolyte Solution | Additive I (wt %) | Additive II (wt %) | Additive III (wt %) | Additive IV (wt %) | Additive V (wt %) | Additive VI (wt %) | Storage Gas Generation (%) | Post-Storage 0.2 C Capacity (%) |
|---|---|---|---|---|---|---|---|---|---|
| Comparative Example 4-2 | | Compound (k) (2.0) | Compound (g) (2.0) | — | Compound (e) (0.5) | — | — | 66 | 101 |
| Comparative Example 4-3 | | Compound (k) (2.0) | Compound (g) (2.0) | — | — | Compound (d) (0.5) | — | 41 | 101 |

Example 5-1 and Comparative Example 5-1

[Preparation of Nonaqueous Electrolyte Solutions]

Sufficiently dried $LiPF_6$ was dissolved at 1.2 mol/L (concentration in nonaqueous electrolyte solution) in a mixture of ethylene carbonate, ethyl methyl carbonate and diethyl carbonate (DEC) (volume ratio: 3:4:3) under a dry argon atmosphere followed by further adding (k) vinylene carbonate (VC), (g) monofluoroethylene carbonate and (c) adiponitrile in an amount of 2.5% by mass, 1.0% by mass and 1.0% by mass, respectively (to be referred to as Reference Electrolyte Solution 5). Compounds were added to the entire Reference Electrolyte Solution 5 at the ratios described in the following Table 6 to prepare electrolyte solutions. However, Reference Electrolyte Solution 5 per se was used in Comparative Example 5-1.

[Fabrication of Positive Electrode]

97% by mass of a positive electrode active material in the form of lithium cobalt oxide ($LiCoO_2$), 1.5% by mass of a conductive material in the form of acetylene black and 1.5% by mass of a binder in the form of polyvinylidene fluoride (PVdF) were mixed in N-methylpyrrolidone solvent with a disperser to form a slurry. The slurry was then uniformly coated onto both sides of aluminum foil having a thickness of 21 μm and dried followed by pressing to obtain a positive electrode.

[Fabrication of Negative Electrode]

A thickener and binder respectively in the form of 1 part by mass of an aqueous dispersion of sodium carboxymethyl cellulose (1% by mass concentration of sodium carboxymethyl cellulose) and 1 part by mass of an aqueous dispersion of styrene-butadiene rubber (50% by mass concentration of styrene-butadiene rubber) were added to 98 parts by mass of a negative electrode active material in the form of graphite powders followed by mixing with a disperser to form a slurry. This slurry was uniformly coated onto one side of copper foil having a thickness of 12 μm followed by drying and pressing to obtain a negative electrode.

[Production of Nonaqueous Electrolyte Batteries (Laminated Type)]

The aforementioned positive electrode and negative electrode along with a separator made of polyolefin were laminated in the order of the negative electrode, separator, positive electrode, separator and negative electrode. The battery element obtained in this manner was then wrapped with an aluminum laminated film followed by injecting the electrolyte solution to be subsequently described and vacuum-sealing to fabricate a sheet-like nonaqueous electrolyte secondary battery.

<Evaluation of Nonaqueous Electrolyte Secondary Batteries>

[Continuous Charging Test]

Following initial capacity evaluation, a continuous charging test was carried out by subjecting the nonaqueous electrolyte battery to CC-CV charging to 4.38 V at 0.2 C and 60° C. (cutoff at 168 hours). Subsequently, after adequately allowing the battery to cool, the battery was immersed in an ethanol bath followed by measuring its volume and determining the "continuous charging gas generation" from the change in volume before and after continuous charging.

The following Table 6 indicates the continuous charging gas generation standardized based on the value of Comparative Example 5-1.

TABLE 6

| | Electrolyte Solution | Additive I | Continuous Charging Gas Generation (%) |
|---|---|---|---|
| Example 5-1 | 1.2M $LiPF_6$ EC/EMC/DEC = 3/4/3 + Compound (k) (1.5) + Compound (g) (1.0) + Compound (c) (1.0) | Compound (a) (0.5) | 65 |
| Comparative Example 5-1 | | — | 100 |

Example 6-1 and Comparative Example 6-1

[Preparation of Nonaqueous Electrolyte Solutions]

Sufficiently dried $LiPF_6$ was dissolved at 1.0 mol/L (concentration in nonaqueous electrolyte solution) in a mixture of ethylene carbonate and diethyl carbonate (DEC) (volume ratio: 3:7) under a dry argon atmosphere, followed by further adding (k) vinylene carbonate (VC) and (g) monofluoroethylene carbonate in an amount of 2.0% by mass each (to be referred to as Reference Electrolyte Solution 6). Compounds were added to the entire Reference Electrolyte Solution 6 at the ratios described in the following Table 7 to prepare electrolyte solutions. However, Reference Electrolyte Solution 6 per se was used in Comparative Example 6.

[Fabrication of Positive Electrode]

97% by mass of a positive electrode active material in the form of lithium cobalt oxide ($LiCoO_2$), 1.5% by mass of a conductive material in the form of acetylene black and 1.5% by mass of a binder in the form of polyvinylidene fluoride (PVdF) were mixed in N-methylpyrrolidone solvent with a disperser to form a slurry. The slurry was then uniformly coated onto both sides of aluminum foil having a thickness of 21 μm and dried followed by pressing to obtain a positive electrode.

[Fabrication of Negative Electrode]

A thickener and binder respectively in the form of 1 part by mass of an aqueous dispersion of sodium carboxymethyl cellulose (1% by mass concentration of sodium carboxymethyl cellulose) and 1 part by mass of an aqueous dispersion of styrene-butadiene rubber (50% by mass concentration of styrene-butadiene rubber) were added to 98 parts by mass of a negative electrode active material in the form of graphite powders followed by mixing with a disperser to form a slurry. This slurry was uniformly coated onto one side of copper foil having a thickness of 12 μm followed by drying and pressing to obtain a negative electrode.

[Production of Nonaqueous Electrolyte Batteries (Laminated Type)]

The aforementioned positive electrode and negative electrode along with a separator made of polyolefin were laminated in the order of the negative electrode, separator, positive electrode, separator and negative electrode. The battery element obtained in this manner was then wrapped with an aluminum laminated film followed by injecting the electrolyte solution to be subsequently described and vacuum-sealing to fabricate a sheet-like nonaqueous electrolyte secondary battery.

<Evaluation of Nonaqueous Electrolyte Secondary Batteries>

[Evaluation of Discharging Storage Characteristics]

Following initial capacity evaluation, the nonaqueous electrolyte battery was subjected to CC-CV charging (0.05 C cutoff) to 3.0 V at 0.2 C and 25° C. Subsequently, the battery was subjected to high-temperature storage under conditions of 60° C. for 168 hours. Voltage before and after storage was measured and the difference thereof was used to determine the "voltage change after discharging storage (mV)". After adequately allowing the battery to cool, the battery was immersed in an ethanol bath followed by measuring its volume and determining the amount of gas generated from the change in volume before and after storage testing, and this amount was defined as the "storage gas generation".

[Charging Storage Test]

After initial capacity evaluation, the cell was again subjected to CC-CV charging to 4.35 V at 0.2 C followed by subjecting to high-temperature storage under conditions of 85° C. for 24 hours. After adequately allowing the battery to cool, the battery was immersed in an ethanol bath followed by measuring its volume and determining the amount of gas generated from the change in volume before and after storage testing, and this amount was defined as the "charging storage gas generation". The following Table 7 indicates the voltage changes after discharging storage, discharge storage gas generation and charging storage gas generation standardized based on the values of Comparative Example 6-1.

TABLE 7

| | Comparative Example 6-1 1.0M LiPF$_6$ EC/DEC = 3/7 + VC (2) + MFEC (2) | | | | | |
|---|---|---|---|---|---|---|
| | Additive 1 | Additive 2 | Additive 3 | Voltage Change after Discharging Storage (mV) | Storage Gas Generation (%) | Charging Storage Gas Generation (%) |
| Example 6-1 | Compound (a) (0.5) | — | — | 34.0 | Not detected | 1.04 |
| Example 6-2 | Compound (p) (1.0) | Compound (a) (0.5) | — | 131.9 | Not detected | 0.51 |
| Example 6-3 | Compound (p) (1.0) | Compound (a) (0.5) | Compound (l) (0.5) | 87.5 | Not detected | 0.46 |
| Example 6-4 | Compound (q) (1.0) | Compound (a) (0.5) | — | 110.9 | 0.15 | 0.36 |
| Comparative Example 6-1 | — | — | — | 83.6 | 1.00 | 1.00 |
| Comparative Example 6-2 | Compound (p) (1.0) | — | — | 484.1 | 1.74 | 0.26 |
| Comparative Example 6-3 | Compound (q) (1.0) | — | — | 312.9 | 2.81 | 0.27 |

Examples 7-1 and 7-2 and Comparative Examples 7-1 and 7-2

[Preparation of Nonaqueous Electrolyte Solutions]

Sufficiently dried LiPF$_6$ was dissolved at 1.2 mol/L (concentration in nonaqueous electrolyte solution) in a mixture of ethylene carbonate, ethyl methyl carbonate and diethyl carbonate (DEC) (volume ratio: 3:4:3) under a dry argon atmosphere followed by further adding (g) monofluoroethylene carbonate in an amount of 5.0% by mass (to be referred to as Reference Electrolyte Solution 7). Compounds were added to the entire Reference Electrolyte Solution 7 at the ratios described in the following Table 8 to prepare electrolyte solutions. However, Reference Electrolyte Solution 7 per se was used in Comparative Example 7-1.

[Fabrication of Positive Electrode]

97% by mass of a positive electrode active material in the form of lithium cobalt oxide (LiCoO$_2$), 1.5% by mass of a conductive material in the form of acetylene black and 1.5% by mass of a binder in the form of polyvinylidene fluoride (PVdF) were mixed in N-methylpyrrolidone solvent with a disperser to form a slurry. The slurry was then uniformly coated onto both sides of aluminum foil having a thickness of 21 μm and dried followed by pressing to obtain a positive electrode.

[Fabrication of Negative Electrode]

A thickener and binder respectively in the form of 1 part by mass of an aqueous dispersion of sodium carboxymethyl cellulose (1% by mass concentration of sodium carboxymethyl cellulose) and 1 part by mass of an aqueous dispersion of styrene-butadiene rubber (50% by mass concentration of styrene-butadiene rubber) were added to 98 parts by mass of a negative electrode active material in the form of natural graphite powders followed by mixing with a disperser to form a slurry. This slurry was uniformly coated onto one side of copper foil having a thickness of 12 µm followed by drying and pressing to obtain a negative electrode.

[Production of Nonaqueous Electrolyte Batteries (Laminated Type)]

The aforementioned positive electrode and negative electrode along with a separator made of polyolefin were laminated in the order of the negative electrode, separator, positive electrode, separator and negative electrode. The battery element obtained in this manner was then wrapped with an aluminum laminated film followed by injecting the electrolyte solution to be subsequently described and vacuum-sealing to fabricate a sheet-like nonaqueous electrolyte secondary battery.

<Evaluation of Nonaqueous Electrolyte Secondary Batteries>

[Initial Capacity]

After charging the nonaqueous electrolyte secondary battery in the form of a laminated cell at a constant current for 6 hours at a current equivalent to 0.05 C, the battery was discharged to 3.0 V at 0.2 C in a constant temperature bath at 25° C. The battery was then CC-CV charged to 4.1 V at 0.2 C. Subsequently, the battery was aged under conditions of 45° C. for 72 hours. Subsequently, the battery was discharged to 3.0 V at 0.2 C to stabilize the nonaqueous electrolyte secondary battery. Moreover, after CC-CV charging to 4.35 V at 0.2 C, the battery was discharged to 3.0 V at 0.5 C and the discharge capacity thereof was defined as the "initial capacity".

[Storage Test]

After initial capacity evaluation, the cell was again subjected to CC-CV charging to 4.35 V at 0.2 C followed by subjecting to high-temperature storage under conditions of 60° C. for 168 hours. After adequately allowing the battery to cool, the battery was immersed in an ethanol bath followed by measuring its volume and determining the amount of gas generated from the change in volume before and after storage testing, and this amount was defined as the "storage gas generation". Subsequently, the battery was discharged to 3.0 V at 0.2 C and 25° C. followed by again carrying out CC-CV charging to 4.35 V at 0.2 C, discharging to 3.0 V at 0.5 C, and defining the discharge capacity thereof to be "post-storage capacity".

The following Table 8 indicates the initial capacities, amounts of post-storage gas and post-storage capacities standardized based on the values of Comparative Example 7-1

Example 8-1 and Comparative Example 8-1

[Preparation of Nonaqueous Electrolyte Solutions]

Sufficiently dried $LiPF_6$ was dissolved at 1.2 mol/L (concentration in nonaqueous electrolyte solution) in a mixture of ethylene carbonate, ethyl methyl carbonate and diethyl carbonate (DEC) (volume ratio: 3:4:3) under a dry argon atmosphere followed by further adding (g) monofluoroethylene carbonate in an amount of 5.0% by mass (to be referred to as Reference Electrolyte Solution 8). Compounds were added to the entire Reference Electrolyte Solution 8 at the ratios described in the following Table 9 to prepare electrolyte solution. However, Reference Electrolyte Solution 8 per se was used in Comparative Example 8-1.

[Fabrication of Positive Electrode]

97% by mass of a positive electrode active material in the form of lithium cobalt oxide ($LiCoO_2$), 1.5% by mass of a conductive material in the form of acetylene black and 1.5% by mass of a binder in the form of polyvinylidene fluoride (PVdF) were mixed in N-methylpyrrolidone solvent with a disperser to form a slurry. The slurry was then uniformly coated onto both sides of aluminum foil having a thickness of 21 µm and dried followed by pressing to obtain a positive electrode.

[Fabrication of Negative Electrode]

A thickener and binder respectively in the form of 1 part by mass of an aqueous dispersion of sodium carboxymethyl cellulose (1% by mass concentration of sodium carboxymethyl cellulose) and 1 part by mass of an aqueous dispersion of styrene-butadiene rubber (50% by mass concentration of styrene-butadiene rubber) were added to 98 parts by mass of a negative electrode active material in the form of natural graphite powders followed by mixing with a disperser to form a slurry. This slurry was uniformly coated onto one side of copper foil having a thickness of 12 m followed by drying and pressing to obtain a negative electrode.

[Production of Nonaqueous Electrolyte Batteries (Laminated Type)]

The aforementioned positive electrode and negative electrode along with a separator made of polyolefin were laminated in the order of the negative electrode, separator, positive electrode, separator and negative electrode. The battery element obtained in this manner was then wrapped with an aluminum laminated film followed by injecting the electrolyte solution to be subsequently described and vacuum-sealing to fabricate a sheet-like nonaqueous electrolyte secondary battery.

TABLE 8

Comparative Example 7-1 1.2M $LiPF_6$ EC/EMC/DEC = 3/4/3 + MFEC (5)

| | Additive 1 | Additive 2 | Initial Capacity/% | Storage Gas Generation/% | Post-Storage Capacity/% |
|---|---|---|---|---|---|
| Example 7-1 | Compound (a) (0.15) | — | 100.2 | 71.6 | 103.6 |
| Example 7-2 | Compound (a) (0.15) | Compound (l) (0.3) | 100.5 | 57.9 | 112.9 |
| Comparative Example 7-1 | — | — | 100.0 | 100.0 | 100.0 |
| Comparative Example 7-2 | — | Compound (l) (0.3) | 100.5 | 76.8 | 101.6 |

<Evaluation of Nonaqueous Electrolyte Secondary Batteries>

[Initial Rate Characteristics]

After charging the nonaqueous electrolyte secondary battery in the form of a laminated cell at a constant current for 6 hours at a current equivalent to 0.05 C, the battery was discharged to 3.0 V at 0.2 C in a constant temperature bath at 25° C. The battery was then CC-CV charged to 4.1 V at 0.2 C. Subsequently, the battery was aged under conditions of 45° C. for 72 hours. Subsequently, the battery was discharged to 3.0 V at 0.2 C to stabilize the nonaqueous electrolyte secondary battery. Moreover, after CC-CV charging to 4.35 V at 0.2 C, the battery was discharged to 3.0 V at 0.2 C and 1.0 C and the capacity ratio (1.0 C capacity/0.2 C capacity) thereof was defined as "initial rate characteristics".

[Post-Storage Rate Characteristics]

After initial capacity evaluation, the cell was again subjected to CC-CV charging to 4.35 V at 0.2 C followed by subjecting to high-temperature storage under conditions of 60° C. for 168 hours. Subsequently, the battery was discharged to 3.0 V at 0.2 C and 25° C., and after again subjecting to CC-CV charging to 4.35 V at 0.2 C, the battery was discharged to 3.0 V at 0.2 C and 1.0 C, and the capacity ratio (1.0 C capacity/0.2 C capacity) thereof was defined as "post-storage rate characteristics".

The following Table 9 indicates the initial rate characteristics and post-storage rate characteristics standardized based on the values of Comparative Example 8-1.

TABLE 9

| Comparative Example 8-1 1.2M $LiPF_6$ EC/EMC/DEC = 3/4/3 + MFEC (5) | | | |
|---|---|---|---|
| | Additive 1 | Initial Rate Characteristics/% | Post-Storage Rate Characteristics/% |
| Example 8-1 | Compound (r) (0.3) | 105.4 | 153.4 |
| Comparative Example 8-1 | — | 100.0 | 100.0 |

Examples 9-1 and 9-2 and Comparative Examples 9-1 to 9-4

[Preparation of Nonaqueous Electrolyte Solutions]

Sufficiently dried $LiPF_6$ was dissolved at 1 mol/L (concentration in nonaqueous electrolyte solution) in a mixture of ethylene carbonate and diethyl carbonate (DEC) (volume ratio: 3:7) under a dry argon atmosphere, followed by further adding (k) vinylene carbonate (VC) and (g) monofluoroethylene carbonate in an amount of 2.0% by mass each (to be referred to as Reference Electrolyte Solution 9). Compounds were added to the entire Reference Electrolyte Solution 9 at the ratios described in the following Table 10 to prepare electrolyte solutions. However, Reference Electrolyte Solution 9 per se was used in Comparative Example 9-1.

[Fabrication of Positive Electrode]

85% by mass of a positive electrode active material in the form of nickel-cobalt-manganese compound oxide (NMC), 10% by mass of a conductive material in the form of acetylene black and 5% by mass of a binder in the form of polyvinylidene fluoride (PVdF) were mixed in N-methylpyrrolidone solvent with a disperser to form a slurry. The slurry was then uniformly coated onto both sides of aluminum foil having a thickness of 21 m and dried followed by pressing to obtain a positive electrode.

[Fabrication of Negative Electrode]

50 g of Si fine particles having a mean particle diameter of 0.2 μm were dispersed in 2000 g of flaky graphite having a mean particle diameter of 35 μm and then charged into a hybridization system (Nara Machinery Co., Ltd.) followed by treating by circulating or retaining in the system for 180 seconds at a rotor rotating speed of 7000 rpm to obtain a complex of Si and graphite particles. The resulting complex was mixed with an organic compound in the form of coal tar pitch serving as a carbon substance so that the coverage rate after firing was 7.5% followed by kneading and dispersing with a twin screw kneader. The resulting dispersion was introduced into a firing furnace and fired for 3 hours at 1000° C. under a nitrogen atmosphere. The resulting fired product was further pulverized with a hammer mill and passed through a sieve (45 μm) to fabricate a negative electrode active material. The elemental silicon content, mean particle diameter d50, tap density and specific surface area as measured according to the previously described methods were 2.0% by mass 20 ram, 1.0 g/cm$^3$ and 7.2 m$^2$/g, respectively.

97.5 parts by mass of the negative electrode active material along with a thickener and binder respectively in the form of 1 part by mass of an aqueous dispersion of sodium carboxymethyl cellulose (1% by mass concentration of sodium carboxymethyl cellulose) and 1.5 parts by mass of an aqueous dispersion of styrene-butadiene rubber (50% by mass concentration of styrene-butadiene rubber) were added followed by mixing with a disperser to form a slurry. This slurry was uniformly coated onto one side of copper foil having a thickness of 10 μm followed by drying and pressing to obtain a negative electrode.

[Production of Nonaqueous Electrolyte Batteries (Laminated Type)]

The aforementioned positive electrode and negative electrode along with a separator made of polyolefin were laminated in the order of the negative electrode, separator and positive electrode. The battery element obtained in this manner was then wrapped with an aluminum laminated film followed by injecting the electrolyte solution to be subsequently described and vacuum-sealing to fabricate a sheet-like nonaqueous electrolyte secondary battery.

<Evaluation of Nonaqueous Electrolyte Secondary Batteries>

[High-Temperature Storage Test]

The nonaqueous electrolyte secondary battery in the form of a laminated cell was charged at a constant current and constant voltage to 4.0 V at a current equivalent to 0.05 C in a constant temperature bath at 25° C. Subsequently, the battery was discharged to 2.5 V at 0.05 C. Continuing, after CC-CV charging to 4.0 V at 0.2 C, the battery was discharged to 2.5 V at 0.2 C, and after subjecting to CC-CV charging to 4.2 V at 0.2 C, the battery was discharged to 2.5 V at 0.2 C to stabilize the nonaqueous electrolyte secondary battery. Subsequently, after CC-CV charging to 4.3 V at 0.2 C, the battery was discharged to 2.5 V at 0.2 C to carry out initial conditioning.

After initial conditioning, the cell was subjected to high-temperature storage under conditions of 60° C. for 168 hours. After adequately allowing the battery to cool, the battery was immersed in an ethanol bath followed by measuring its volume and determining the amount of gas generated from the change in volume before and after storage testing, and this amount was defined as the "storage gas generation". In addition, the battery was discharged to 2.5 V at 0.2 C and 25° C. followed by determination of capacity after evaluating high-temperature storage characteristics, and this capacity was defined as "post-storage 0.2 C capacity".

[High-Temperature Cycle Test]

Following initial conditioning, the cell was subjected to 100 cycles of a process consisting of CC-CV charging to 4.2 V at 0.5 C followed by discharging to 2.5 V at a constant current of 0.5 C in a constant temperature bath at 45° C. The capacity after the 100th cycle was defined as the "100 cycle capacity".

The following Table 10 indicates the of post-storage gas generation, post-storage 0.2 C capacities and 100 cycle capacities standardized based on the values of Comparative Example 9-1.

[Chemical 33]

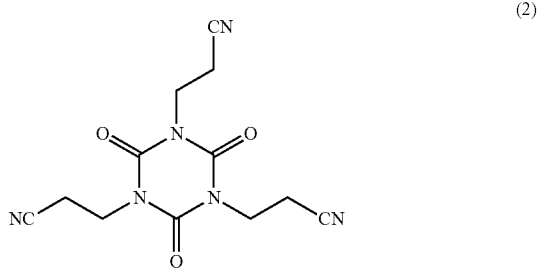

(2)

TABLE 10

|  | Electrolyte Solution | Additive I (wt %) | Additive II (wt %) | Additive III (wt %) | Additive IV (wt %) | Additive V (wt %) | Storage Gas Generation (%) | Post-Storage 0.2 C Capacity (%) | 100 Cycle Capacity (%) |
|---|---|---|---|---|---|---|---|---|---|
| Example 9-1 | 1M LiPF$_6$ EC/DEC = 3/7 | Compound (k) (2.0) | Compound (g) (2.0) | Compound (a) (0.5) | — | — | 41 | 102 | 106 |
| Example 9-2 |  | Compound (k) (2.0) | Compound (g) (2.0) | Compound (a) (0.5) | Compound (n) (2.0) | — | 77 | 98 | 114 |
| Example 9-3 |  | Compound (k) (2.0) | Compound (g) (2.0) | Compound (a) (0.5) | Compound (n) (2.0) | Compound (l) (0.5) | 61 | 99 | 119 |
| Comparative Example 9-1 |  | Compound (k) (2.0) | Compound (g) (2.0) | — | — | — | 100 | 100 | 100 |
| Comparative Example 9-2 |  | Compound (k) (2.0) | Compound (g) (2.0) | — | Compound (n) (2.0) | — | 176 | 94 | 114 |
| Comparative Example 9-3 |  | Compound (k) (2.0) | Compound (g) (2.0) | — | — | Compound (l) (0.5) | 66 | 100 | 103 |

Examples 10-1 to 10-4 and Comparative Examples 10-1 to 10-3

The following indicates examples and comparative examples based on the second embodiment of the present invention.

[Preparation of Nonaqueous Electrolyte Solutions]

Sufficient dried LiPF$_6$ was added at 1 mol/L to a mixture of ethylene carbonate, dimethyl carbonate and ethyl methyl carbonate (volume ratio: 3:3:4) under a dry argon atmosphere followed by dissolving the various types of compounds in the combinations of compounds shown in Table-1 to the concentrations shown therein to prepare nonaqueous electrolyte solutions of the examples and comparative examples.

Furthermore, VC in the table refers to vinylene carbonate, while Compound (2) and Compound (16) refer to the compounds indicated below.

-continued

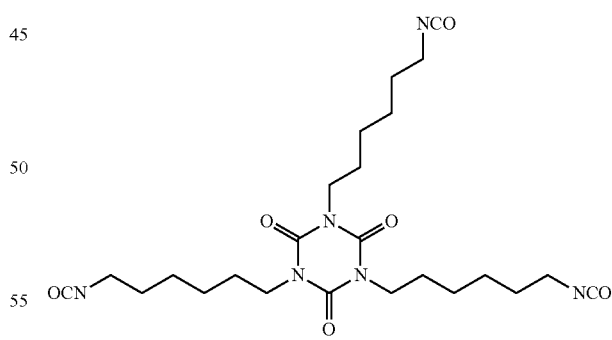

(16)

[Fabrication of Positive Electrode]

94% by mass of a positive electrode active material in the form of lithium cobalt oxide (LiCoO$_2$), 3% by mass of a conductive material in the form of acetylene black and 3% by mass of a binder in the form of polyvinylidene fluoride (PVdF) were mixed in N-methylpyrrolidone solvent to form a slurry. The resulting slurry was coated onto both sides of aluminum foil having a thickness of 12 μm and dried so that the coated amount was 50 mg per cm$^2$, followed by rolling to a thickness of 85 m with a press and cutting out a piece thereof into active materials having a width of 30 mm and length of 40 mm for use as a positive electrode. The fabricated positive electrode was used after vacuum-drying for 12 hours at 80° C.

[Fabrication of Negative Electrode]

54.2 parts by mass of an N-methylpyrrolidone solution containing 12 parts by mass of polyvinylidene fluoride and 50 parts by mass of N-methylpyrrolidone were added to negative electrode active materials consisting of non-carbon materials, in the form of 73.2 parts by mass of silicon and 8.1 parts by mass of copper, and artificial graphite powders (KS-6, Timcal Graphite & Carbon Corp.) followed by mixing with a disperser to form a slurry. The resulting slurry was uniformly coated onto a negative electrode current collector in the form of copper foil having a thickness of 18 m to obtain a negative electrode followed by pressing to an electrode density of 1.5 g·cm$^{-3}$ and cutting out a piece thereof into active materials having a width of 30 mm and length of 40 mm to obtain a negative electrode (silicon alloy negative electrode). Furthermore, this negative electrode was used after vacuum-drying for 12 hours at 60° C.

[Production of Nonaqueous Electrolyte Batteries]

The aforementioned positive electrode and negative electrode along with a separator made of polyolefin were laminated in the order of the negative electrode, separator, positive electrode, separator and negative electrode to prepare a battery element. After inserting the battery element obtained in this manner into a pouch composed of laminated aluminum coated on both sides of the aluminum (thickness: 40 am) with a resin layer while allowing the terminals of the positive and negative electrodes to protrude therethrough, 0.4 mL of nonaqueous electrolyte solution were injected into the pouch followed by vacuum-sealing to fabricate a sheet-like battery. Moreover, the sheet-like battery was pressed between glass plates in order to enhance adhesion between electrodes.

<Evaluation of Nonaqueous Electrolyte Secondary Batteries>

[High-Temperature Storage Test]

The aforementioned sheet-like battery was stabilized by charging and discharging at 25° C. for several cycles at a constant current equivalent to 0.2 C using a charge end voltage of 4.33 V and discharge end voltage of 3 V. Subsequently, after charging at a constant current and constant voltage to 4.33 V (0.05 C cutoff), a high-temperature storage test was carried out under conditions of 85° C. for 1 day. Resistance after storage was evaluated by measuring impedance before and after this high-temperature storage. In addition, the ratio of discharge capacity after storage to discharge capacity before storage was evaluated as capacity residual rate (%). The results are shown in Table 11.

TABLE 11

|  | Compound (concentration) | Other Compounds | Post-storage resistance (Ω) | Capacity residual rate (%) |
| --- | --- | --- | --- | --- |
| Example 10-1 | Compound (2) (0.1 wt %) | — | 12.4 | 68.9 |
| Example 10-2 | Compound (2) (0.3 wt %) | — | 12.3 | 70.4 |
| Example 10-3 | Compound (2) (0.3 wt %) | VC (1 wt %) | 10.9 | 84.6 |
| Example 10-4 | Compound (2) (1 wt %) | VC (1 wt %) | 10.4 | 84.7 |

TABLE 11-continued

|  | Compound (concentration) | Other Compounds | Post-storage resistance (Ω) | Capacity residual rate (%) |
| --- | --- | --- | --- | --- |
| Comparative Example 10-1 | — | — | 12.8 | 64.9 |
| Comparative Example 10-2 | — | VC (1 wt %) | 14.6 | 81.3 |
| Comparative Example 10-3 | Compound (16) (0.3 wt %) | VC (1 wt %) | 14.4 | 79.9 |

Resistance after storage decreased in Examples 10-1 and 10-2, which used electrolyte solutions containing a compound represented by general formula (1) of the present invention, in contrast to Comparative Example 10-1, which used an electrolyte solution that did not contain a compound represented by general formula (1) of the present invention.

In addition, capacity residual rate improved in Examples 10-1 and 10-2, which used electrolyte solutions containing a compound represented by general formula (1) of the present invention, in contrast to Comparative Example 1, which used an electrolyte solution that did not contain a compound represented by general formula (1) of the present invention.

On the basis thereof, a compound represented by general formula (1) of the present invention can be said to have the effects of inhibiting increases in resistance and inhibiting decreases in capacity in a charged state.

In addition, in the case of containing vinylene carbonate as well, post-storage resistance decreased in Examples 10-3 and 10-4, which used electrolyte solutions containing a compound represented by general formula (1) of the present invention, in contrast to Comparative Example 10-2, which used an electrolyte solution that did not contain a compound represented by general formula (1) of the present invention. On the other hand, in Comparative Example 10-3, which used an electrolyte solution containing compound (16) containing —NCO instead of a compound represented by general formula (1) of the present invention, although post-storage resistance decreased with respect to Comparative Example 10-2, that effect was small.

In addition, capacity residual rate improved in Examples 10-3 and 10-4, which used electrolyte solutions containing a compound represented by general formula (1) of the present invention, in contrast to Comparative Example 10-2, which used an electrolyte solution that did not contain a compound represented by general formula (1) of the present invention. On the other hand, capacity residual rate decreased in Comparative Example 10-3, which used an electrolyte solution containing compound (16), with respect to Comparative Example 10-2.

On the basis of the above, a compound represented by general formula (1) of the present invention can be said to have the effects of inhibiting increases in resistance and inhibiting decreases in capacity during high-temperature storage in a charged state.

INDUSTRIAL APPLICABILITY

According to the nonaqueous electrolyte solution of the present invention, capacity deterioration and cycle characteristics during high-temperature storage of a nonaqueous electrolyte battery can be improved. Consequently, the nonaqueous electrolyte solution can be preferably used in all fields, such as electronic devices, in which nonaqueous electrolyte secondary batteries are used.

According to the nonaqueous electrolyte solution of the present invention, in addition to inhibiting generation of gas and inhibiting battery deterioration when using a battery in a high-temperature environment by inhibiting degradation of the electrolyte solution of a nonaqueous electrolyte secondary battery, a nonaqueous electrolyte secondary battery can be produced that has high capacity and demonstrates high energy density and superior cycle characteristics. Thus, the nonaqueous electrolyte solution can be preferably used in various fields, such as electronic devices, in which nonaqueous electrolyte secondary batteries are used.

There are no particular limitations on the applications of the nonaqueous electrolyte solution and nonaqueous electrolyte secondary battery of the present invention, and they can be used in various known applications. Specific examples of those applications include laptop computers, electronic book players, cell phones, portable facsimile machines, portable copiers, portable printers, portable audio players, compact video cameras, liquid crystal televisions, handy cleaners, transceivers, electronic organizers, electronic calculators, memory cards, portable tape recorders, radios, backup power supplies, automobiles, motorcycles, power-assisted bicycles, bicycles, lighting fixtures, toys, video game machines, watches, power tools, strobe lights and cameras.

There are no particular limitations on the applications of the nonaqueous electrolyte solution for a secondary battery and the nonaqueous electrolyte secondary battery of the present invention, and they can be used in various known applications. Specific examples thereof include power supplies for portable electronic devices such as laptop computers, pen input system personal computers, mobile personal computers, electronic book players, cell phones, video game machines, portable facsimile machines, portable copiers, portable printers, stereo headphones, video movies, liquid crystal televisions, handy cleaners, portable CDs, minidiscs, transceivers, electronic organizers, electronic calculators, memory cards, portable tape recorders, radios and power tools, large-scale power supply systems for vehicles such as hybrid vehicles, electric vehicles, power-assisted motorcycles or power-assisted bicycles, home-use power supply systems used for the purpose of equalizing the electrical power load, and stationary large-scale power supply systems such as backup power supplies.

The invention claimed is:

1. A nonaqueous electrolyte solution, comprising:
an electrolyte, and
a nonaqueous solvent,
wherein the nonaqueous electrolyte solution contains a compound represented by general formula (A) in an amount of 0.01% by mass to 10.0% by mass based on the total amount of the nonaqueous electrolyte solution, and (1) 0.01% by mass to 10.0% by mass based on the total amount of the nonaqueous electrolyte solution of a difluorophosphate;
wherein formula (A) is:

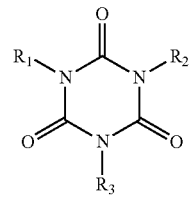

(A)

wherein $R_1$ to $R_3$ represent an allyl group or a methylallyl group.

2. The nonaqueous electrolyte solution according to claim 1, wherein the nonaqueous electrolyte solution further contains at least one compound selected from the group consisting of a cyclic carbonate having a carbon-carbon unsaturated bond, an acid anhydride, a vinyl sulfonate ester, an aromatic compound having 12 carbon atoms or less and a linear carboxylate ester.

3. The nonaqueous electrolyte solution according to claim 1, further comprising fluoroethylene carbonate of 0.01% by mass to 50.0% by mass based on the total amount of the nonaqueous electrolyte solution.

4. A nonaqueous electrolyte secondary battery comprising:
a positive electrode capable of occluding and releasing lithium ions,
a negative electrode capable of occluding and releasing lithium ions, and
the nonaqueous electrolyte solution according to claim 1.

5. The nonaqueous electrolyte secondary battery according to claim 4, wherein the negative electrode active material of the negative electrode capable of occluding and releasing lithium ions has carbon as a constituent element thereof.

6. The nonaqueous electrolyte secondary battery according to claim 5, wherein the negative electrode active material of the negative electrode capable of occluding and releasing lithium ions has silicon (Si) or tin (Sn) as a constituent element thereof.

7. The nonaqueous electrolyte secondary battery according to claim 6, wherein the negative electrode active material of the negative electrode capable of occluding and releasing lithium ions is a mixture or complex of particles having silicon (Si) or tin (Sn) as a constituent element thereof and graphite particles.

* * * * *